(12) United States Patent
Cole et al.

(10) Patent No.: US 11,371,490 B2
(45) Date of Patent: *Jun. 28, 2022

(54) OCEAN THERMAL ENERGY CONVERSION POWER PLANT

(71) Applicant: The Abell Foundation, Inc., Baltimore, MD (US)

(72) Inventors: Barry R. Cole, Mineral, VA (US); Jonathan M. Ross, Arnold, MD (US); Andrew Rekret, Toronto (CA); Henry Sibenaller, Greensburg, PA (US); William Schulz, Manassas, VA (US); Russ Krull, Centreville, VA (US); Laurence Jay Shapiro, Fair Lawn, NJ (US)

(73) Assignee: The Abell Foundation, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,907

(22) Filed: Nov. 23, 2020

(65) Prior Publication Data

US 2021/0231110 A1 Jul. 29, 2021

Related U.S. Application Data

(63) Continuation of application No. 15/789,293, filed on Oct. 20, 2017, now Pat. No. 10,844,848, which is a
(Continued)

(51) Int. Cl.
*F03G 7/05* (2006.01)
*F16L 1/15* (2006.01)
(Continued)

(52) U.S. Cl.
CPC ............... *F03G 7/05* (2013.01); *F01K 13/00* (2013.01); *F01K 25/10* (2013.01); *F16L 1/15* (2013.01);
(Continued)

(58) Field of Classification Search
CPC ...... F16L 3/00; F16L 9/22; F03G 7/04; B23P 11/00
(Continued)

(56) References Cited

U.S. PATENT DOCUMENTS 517,192 A 3/1894 Prior
1,004,151 A 9/1911 Daniels
(Continued)

FOREIGN PATENT DOCUMENTS

CN 1192260 9/1998
CN 1673527 9/2005
(Continued)

OTHER PUBLICATIONS

Avery, William H. et al., "Renewable Energy From the Ocean—A Guide to OTEC", *The John's Hopkins University—Applied Physics Laboratory Series in Science and Engineering* (1994).
(Continued)

*Primary Examiner* — Shafiq Mian
(74) *Attorney, Agent, or Firm* — Fish & Richardson P.C.

(57) ABSTRACT

An offshore power generation structure comprising a submerged portion having a first deck portion comprising an integral multi-stage evaporator system, a second deck portion comprising an integral multi-stage condensing system, a third deck portion housing power generation equipment, cold water pipe; and a cold water pipe connection.

12 Claims, 27 Drawing Sheets

Related U.S. Application Data continuation of application No. 13/011,619, filed on Jan. 21, 2011, now Pat. No. 9,797,386, which is a continuation-in-part of application No. 12/691,655, filed on Jan. 21, 2010, now Pat. No. 9,086,057, which is a continuation-in-part of application No. 12/691,663, filed on Jan. 21, 2010, now Pat. No. 8,899,043.

(60) Provisional application No. 61/297,242, filed on Jan. 21, 2010.

(51) Int. Cl.
  *F16L 9/22* (2006.01)
  *F16L 3/00* (2006.01)
  *F01K 13/00* (2006.01)
  *F01K 25/10* (2006.01)

(52) U.S. Cl.
  CPC  *F16L 3/00* (2013.01); *F16L 9/22* (2013.01); *F01K 25/106* (2013.01); *Y02E 10/30* (2013.01); *Y10T 29/49826* (2015.01)

(58) Field of Classification Search
  USPC ...... 114/230.1; 441/133; 405/171, 166, 168; 166/341, 343, 348; 285/11, 145.3, 190, 285/275, 288.1
  See application file for complete search history.

(56) References Cited

U.S. PATENT DOCUMENTS

| | | |
|---|---|---|
| 2,038,172 A | 4/1936 | Haley |
| 2,049,371 A | 7/1936 | Haley |
| 2,263,182 A | 11/1941 | MacPherson |
| 2,648,217 A | 8/1953 | Gladville |
| 2,827,774 A | 3/1958 | Dunkelman |
| 2,900,175 A | 8/1959 | McGuffey |
| 3,042,080 A | 7/1962 | Dosker |
| 3,095,014 A | 6/1963 | Dosker |
| 3,246,689 A | 4/1966 | Remde et al. |
| 3,312,056 A | 4/1967 | Lagelbauer |
| 3,368,614 A | 2/1968 | Anderson |
| 3,502,141 A | 3/1970 | Allen |
| 3,524,476 A | 8/1970 | Thomas |
| 3,538,955 A | 11/1970 | Anderson |
| 3,558,439 A | 1/1971 | Anderson |
| 3,599,589 A | 8/1971 | Busey |
| 3,795,103 A | 3/1974 | Anderson |
| 3,805,515 A | 4/1974 | Zener |
| 3,837,308 A | 9/1974 | Harvey et al. |
| 3,873,137 A | 3/1975 | Yamaguchi |
| 3,995,160 A | 11/1976 | Zener |
| 4,002,200 A | 1/1977 | Raskin |
| 4,006,619 A | 2/1977 | Anderson |
| 4,014,279 A | 3/1977 | Pearson |
| 4,019,333 A | 4/1977 | Karsan |
| 4,030,301 A | 6/1977 | Anderson |
| 4,036,286 A | 7/1977 | Anderson et al. |
| 4,048,943 A | 9/1977 | Gerwick, Jr. |
| 4,055,145 A | 10/1977 | Mager et al. |
| 4,087,975 A | 5/1978 | Owens |
| 4,089,324 A | 5/1978 | Tjaden |
| 4,120,520 A | 10/1978 | Ahlstone |
| 4,127,005 A | 11/1978 | Osborne |
| 4,131,159 A | 12/1978 | Long |
| 4,139,054 A | 2/1979 | Anderson |
| 4,176,863 A | 12/1979 | Wetmore |
| 4,179,781 A | 12/1979 | Long |
| 4,189,647 A | 2/1980 | Wittig |
| 4,201,263 A | 5/1980 | Anderson |
| 4,209,061 A | 6/1980 | Schwemin |
| 4,209,991 A | 7/1980 | Anderson |
| 4,210,819 A | 7/1980 | Wittig et al. |
| 4,210,820 A | 7/1980 | Wittig |
| 4,229,868 A | 10/1980 | Kretzinger |
| 4,231,312 A | 11/1980 | Person |
| 4,231,420 A | 11/1980 | Anderson |
| 4,234,269 A | 11/1980 | Person et al. |
| 4,254,626 A | 3/1981 | Anderson |
| 4,260,181 A | 4/1981 | Curtin |
| 4,265,301 A | 5/1981 | Anderson |
| 4,281,614 A | 8/1981 | McNary et al. |
| 4,282,834 A | 8/1981 | Anderson |
| 4,290,631 A | 9/1981 | Anderson |
| 4,300,598 A | 11/1981 | Royer |
| 4,301,375 A | 11/1981 | Anderson |
| 4,311,012 A | 1/1982 | Finley |
| 4,312,288 A | 1/1982 | Finsterwalder |
| 4,334,965 A | 6/1982 | Wu |
| 4,346,561 A | 8/1982 | Kalina |
| 4,350,014 A | 9/1982 | Sanchez et al. |
| 4,358,225 A | 11/1982 | van der Pot et al. |
| 4,363,570 A | 12/1982 | van der Pot |
| 4,384,459 A | 5/1983 | Johnston |
| 4,417,446 A | 11/1983 | Nakamoto et al. |
| 4,434,112 A | 2/1984 | Pollock |
| 4,456,070 A | 6/1984 | Watkins |
| 4,470,722 A | 9/1984 | Gregow |
| 4,497,342 A | 2/1985 | Wenzel et al. |
| 4,540,053 A | 9/1985 | Baugh |
| 4,548,043 A | 10/1985 | Kalina |
| 4,550,936 A | 11/1985 | Haeber |
| 4,578,953 A | 4/1986 | Krieger et al. |
| 4,603,553 A | 8/1986 | Ridgway |
| 4,628,212 A | 12/1986 | Uehara et al. |
| 4,700,543 A | 10/1987 | Krieger et al. |
| 4,749,032 A | 6/1988 | Rosman et al. |
| 4,753,554 A | 6/1988 | Jeter |
| 4,808,034 A | 2/1989 | Birch |
| 4,823,867 A | 4/1989 | Pollard et al. |
| 4,871,017 A | 10/1989 | Cesaroni |
| 5,057,217 A | 10/1991 | Lutz et al. |
| 5,076,354 A | 12/1991 | Nishishita |
| 5,101,890 A | 4/1992 | Aoki et al. |
| 5,104,263 A | 4/1992 | Shibahara et al. |
| 5,123,772 A | 6/1992 | Anderson |
| 5,339,760 A | 8/1994 | Korsgaard |
| 5,423,575 A | 6/1995 | Parks |
| 5,441,489 A | 8/1995 | Utsumi et al. |
| 5,513,494 A | 5/1996 | Flynn |
| 5,555,838 A | 9/1996 | Bergman |
| 5,582,691 A | 12/1996 | Flynn et al. |
| 5,656,345 A | 8/1997 | Strand et al. |
| 5,769,155 A | 6/1998 | Ohadi et al. |
| 5,947,642 A | 9/1999 | Teixeira et al. |
| 5,983,624 A | 11/1999 | Anderson |
| 5,992,893 A | 11/1999 | Watkins |
| 6,035,938 A | 3/2000 | Watkins |
| 6,106,024 A | 8/2000 | Herman |
| 6,167,693 B1 | 1/2001 | Anderson |
| 6,293,734 B1 | 9/2001 | Thomas et al. |
| 6,298,663 B1 | 10/2001 | Bronicki |
| 6,301,872 B1 | 10/2001 | Anderson |
| 6,347,912 B1 | 2/2002 | Thomas |
| 6,406,223 B1 | 6/2002 | Thomas |
| 6,422,316 B1 | 7/2002 | Schutz |
| 6,451,204 B1 | 9/2002 | Anderson |
| 6,472,614 B1 | 10/2002 | Dupont et al. |
| 6,481,197 B2 | 11/2002 | Anderson |
| 6,536,527 B2 | 3/2003 | Munk |
| 6,553,752 B2 | 4/2003 | Anderson |
| 6,558,084 B2 | 5/2003 | Moog et al. |
| 6,634,853 B1 | 10/2003 | Anderson |
| 6,663,343 B1 | 12/2003 | Anderson |
| 6,718,901 B1 | 4/2004 | Abbott et al. |
| 6,843,278 B2 | 1/2005 | Espinasse |
| 6,848,863 B2 | 2/2005 | Karayaka et al. |
| 7,066,284 B2 | 6/2006 | Wylie |
| 7,197,999 B2 | 4/2007 | Murray |
| 7,243,716 B2 | 7/2007 | Denniel et al. |
| 7,328,578 B1 | 2/2008 | Saucedo |
| 7,431,623 B1 | 10/2008 | Saucedo et al. |
| 7,472,742 B2 | 1/2009 | Kumar et al. |

(56) References Cited

U.S. PATENT DOCUMENTS

| | | | |
|---|---|---|---|
| 7,600,569 B2 | 10/2009 | Routeau et al. | |
| 7,735,321 B2 | 6/2010 | Howard | |
| 7,735,322 B2 * | 6/2010 | Kuo | F03G 7/05 60/641.7 |
| 7,749,464 B2 | 7/2010 | Sakakura | |
| 7,882,703 B2 | 2/2011 | Pellen | |
| 7,900,452 B2 | 3/2011 | Howard et al. | |
| 7,959,480 B2 | 6/2011 | Lindblade | |
| 8,025,834 B2 | 9/2011 | Miller et al. | |
| 8,043,027 B2 | 10/2011 | Duroch | |
| 8,070,388 B2 | 12/2011 | Thomas | |
| 8,070,389 B2 | 12/2011 | Ayers et al. | |
| 8,083,902 B2 | 12/2011 | Al-Garni et al. | |
| 8,096,589 B2 | 1/2012 | De Aquino et al. | |
| 8,100,150 B2 | 1/2012 | Jung et al. | |
| 8,117,843 B2 | 2/2012 | Howard et al. | |
| 8,123,226 B2 | 2/2012 | Bell et al. | |
| 8,146,362 B2 | 4/2012 | Howard et al. | |
| 8,146,894 B2 * | 4/2012 | Hills | B01F 27/1132 261/86 |
| 8,152,949 B2 | 4/2012 | Bailey et al. | |
| 8,172,481 B2 | 5/2012 | Luppi | |
| 8,182,176 B2 | 5/2012 | Bailey et al. | |
| 8,250,847 B2 | 8/2012 | Rapp et al. | |
| 8,256,469 B2 | 9/2012 | Felix-Henry | |
| 8,282,315 B2 | 10/2012 | Espinasse | |
| 8,286,516 B2 | 10/2012 | Routeau et al. | |
| 8,353,162 B2 | 1/2013 | Nagurny | |
| 8,424,307 B2 | 4/2013 | Hsu et al. | |
| 8,444,182 B2 | 5/2013 | Kuo et al. | |
| 8,484,972 B2 | 7/2013 | Lau | |
| 8,540,012 B2 | 9/2013 | Nagurny et al. | |
| 8,561,406 B2 | 10/2013 | Kalina | |
| 8,567,194 B2 | 10/2013 | Bailey et al. | |
| 8,572,967 B1 | 11/2013 | Cowden et al. | |
| 8,578,714 B2 | 11/2013 | Nagurny et al. | |
| 8,584,462 B2 | 11/2013 | Kalina | |
| 8,740,583 B2 * | 6/2014 | Pollack | B63B 35/44 417/423.3 |
| 8,899,043 B2 | 12/2014 | Krull et al. | |
| 9,086,057 B2 | 7/2015 | Rekret et al. | |
| 9,664,306 B2 | 5/2017 | Cole | |
| 9,797,386 B2 | 10/2017 | Cole et al. | |
| 10,844,848 B2 * | 11/2020 | Cole | F01K 25/10 |
| 2001/0036387 A1 | 11/2001 | Richter | |
| 2001/0045286 A1 | 11/2001 | Pallini | |
| 2002/0009336 A1 | 1/2002 | Munk | |
| 2002/0168232 A1 | 11/2002 | Xu et al. | |
| 2003/0172758 A1 | 9/2003 | Anderson | |
| 2003/0221603 A1 | 12/2003 | Horton | |
| 2005/0155749 A1 | 7/2005 | Memory et al. | |
| 2006/0200064 A1 | 9/2006 | Gross | |
| 2006/0231344 A1 | 10/2006 | Drzewiecki | |
| 2007/0028626 A1 | 2/2007 | Chen | |
| 2007/0289303 A1 | 12/2007 | Prueitt | |
| 2008/0025799 A1 | 1/2008 | Kawasaki | |
| 2008/0295517 A1 | 12/2008 | Howard et al. | |
| 2009/0013690 A1 | 1/2009 | Marshall | |
| 2009/0077969 A1 | 3/2009 | Prueitt | |
| 2009/0158987 A1 | 6/2009 | Ramachandran et al. | |
| 2009/0178722 A1 | 7/2009 | Howard | |
| 2009/0183862 A1 | 7/2009 | Benezech | |
| 2009/0217664 A1 | 9/2009 | Rapp et al. | |
| 2009/0294110 A1 | 12/2009 | Foust | |
| 2009/0301088 A1 | 12/2009 | Kuo et al. | |
| 2009/0308582 A1 | 12/2009 | Nagurny et al. | |
| 2010/0106071 A1 | 4/2010 | Wallenberg | |
| 2010/0139272 A1 | 6/2010 | Howard et al. | |
| 2010/0180924 A1 | 7/2010 | Bailey et al. | |
| 2010/0275597 A1 | 11/2010 | Kuo | |
| 2011/0079375 A1 | 4/2011 | Nagurny et al. | |
| 2011/0120636 A1 | 5/2011 | Bailey et al. | |
| 2011/0127022 A1 | 6/2011 | Eller et al. | |
| 2011/0147009 A1 | 6/2011 | Dupal | |
| 2011/0173978 A1 | 7/2011 | Rekret et al. | |
| 2011/0173979 A1 | 7/2011 | Krull et al. |
| 2011/0272864 A1 | 11/2011 | Miller et al. |
| 2011/0293379 A1 | 12/2011 | Halkyard et al. |
| 2012/0011849 A1 | 1/2012 | Cole et al. |
| 2012/0043755 A1 | 2/2012 | Van Ryzin et al. |
| 2012/0073291 A1 | 3/2012 | Shapiro et al. |
| 2012/0080164 A1 | 4/2012 | Nagurny et al. |
| 2012/0080175 A1 | 4/2012 | Levings et al. |
| 2012/0125561 A1 | 5/2012 | Levings et al. |
| 2012/0167813 A1 | 7/2012 | Lambrakos et al. |
| 2012/0183356 A1 | 7/2012 | Risi et al. |
| 2012/0186781 A1 | 7/2012 | Dreyer et al. |
| 2012/0195690 A1 | 8/2012 | Luo et al. |
| 2012/0199335 A1 | 8/2012 | Maurer |
| 2012/0201611 A1 | 8/2012 | Flores, Sr. et al. |
| 2012/0207600 A1 | 8/2012 | Harris et al. |
| 2012/0216737 A1 | 8/2012 | Luo et al. |
| 2012/0234597 A1 | 9/2012 | Madden |
| 2012/0241040 A1 | 9/2012 | Fogg |
| 2012/0257931 A1 | 10/2012 | Tkaczyk et al. |
| 2013/0037601 A1 | 2/2013 | Eller et al. |
| 2013/0153171 A1 | 6/2013 | Nagurny et al. |
| 2013/0160446 A1 | 6/2013 | Paya Diaz |
| 2014/0014199 A1 | 1/2014 | Edwards |
| 2014/0059825 A1 | 3/2014 | Riggs |
| 2014/0096519 A1 | 4/2014 | Hermant et al. |
| 2014/0096520 A1 | 4/2014 | Paya Diaz |
| 2015/0040563 A1 | 2/2015 | Krull et al. |
| 2015/0322928 A1 | 11/2015 | Rekret et al. |
| 2018/0187658 A1 | 7/2018 | Cole et al. |

FOREIGN PATENT DOCUMENTS

| | | |
|---|---|---|
| CN | 101539347 | 9/2009 |
| CN | 201301785 | 9/2009 |
| EP | 0908382 | 4/1999 |
| EP | 1 788 335 | 5/2007 |
| FR | 2442761 | 6/1980 |
| JP | S55-067080 | 8/1978 |
| JP | 55-001479 | 1/1980 |
| JP | 55-032896 | 3/1980 |
| JP | S55-083689 | 6/1980 |
| JP | 57-157004 | 9/1982 |
| JP | S60-095102 | 6/1985 |
| JP | 61-149507 | 7/1986 |
| JP | S63-021366 | 1/1988 |
| JP | H02-005766 | 1/1990 |
| JP | H02-115973 | 9/1990 |
| JP | 02-271080 | 11/1990 |
| JP | 05-288481 | 11/1993 |
| JP | 05-340342 | 12/1993 |
| JP | H10-137877 | 5/1998 |
| JP | H11-337286 | 12/1999 |
| JP | 2002-267272 | 9/2002 |
| JP | 2005195192 | 7/2005 |
| JP | 2006336873 | 12/2006 |
| JP | 2007-518053 | 7/2007 |
| JP | 2014-526168 | 10/2014 |
| KR | 10-0143540 | 8/1998 |
| KR | 2009-0119118 | 11/2009 |
| KR | 10-2010-0074435 | 7/2010 |
| KR | 10-1936276 | 1/2019 |
| WO | WO 90/01659 | 2/1990 |
| WO | WO 96/07028 | 3/1996 |
| WO | WO 2004031676 | 4/2004 |
| WO | WO 2007/064572 | 6/2007 |
| WO | WO 2008042893 | 4/2008 |
| WO | WO 2011/035943 | 3/2011 |
| WO | WO 2011/091295 | 7/2011 |

OTHER PUBLICATIONS

Choi, Jin Hwan, "Notification of Transmittal of the International Search Report and the Written Opinion of the International Searching Authority, or the Declaration", International Application No. PCT/US2011/022115, dated Nov. 18, 2011 (10 pages).

English translation; JP 61-149507; Jul. 1986; 12 pp.

(56) References Cited

OTHER PUBLICATIONS

EP Office Action in European Appln. No. 11735259.1-1008, dated Sep. 27, 2019, 5 pages.
Han, Joong Sub, "International Search Report", International Application No. PCT/US2012/050941, dated Feb. 27, 2013 (3 pages).
Han, Joong Sub, "International Search Report", International Application No. PCT/US2013/065098, dated Jan. 21, 2014 (3 pages).
Han, Joong Sub, "Written Opinion of the International Searching Authority", International Application No. PCT/US2012/050941, dated Feb. 27, 2013 (5 pages).
Han, Joong Sub, "Written Opinion of the International Searching Authority", International Application No. PCT/US2013/065098, dated Jan. 21, 2014 (6 pages).
Japan Patent Office, Notice of Reasons for Rejection in JP Appl. No. 2013-519829 dated Mar. 31, 2015, 12 pages.
Japan Patent Office, Notice of Reasons for Rejection issued in JP Appl. No. 2012-550166 dated Dec. 9, 2014 (8 pages).
Kang, Tack Jung, "International Search Report", International Application No. PCT/US2011/044015, dated Mar. 22, 2012 (3 pages).
Kang, Tack Jung, "Written Opinion of the International Searching Authority", International Application No. PCT/US2011/044015, dated Mar. 22, 2012 (4 pages).
KR Office Action in Korean Appln. No. 10-2020-7031631, dated Dec. 10, 2020, 4 pages (with English translation).
Lindner, Nora, Notification Concerning Transmittal of International Preliminary Report on Patentability (Chapter I of the Patent Cooperation Treaty), International Application No. PCT/US2011/044015, dated Jan. 24, 2013 (6 pages).
Lindner, Nora, "Notification Concerning Transmittal of International Preliminary Report on Patentability (Chapter I of the Patent Cooperation Treaty)", International Application No. PCT/US2011/022115, dated Jul. 24, 2012 (7 pages).
Nakamura, Yukari, "International Preliminary Report on Patentability (Chapter I of the Patent Cooperation Treaty)", International Application No. PCT/US2012/050954, dated Feb. 18, 2014, (7 pages).
Nickitas-Etienee, Athina, "International Preliminary Report on Patentability (Chapter I of the Patent Cooperation Treaty)", International Application No. PCT/US2012/050941, dated Feb. 18, 2014 (7 pages).
State Intellectual Property Office of the People's Republic of China, The First Office Action issued in CN 2011800152121 dated Sep. 23, 2014 (5 pages).
State Intellectual Property Office of the People's Republic of China, The Second Office Action issued in CN 201180015212.1 dated Mar. 18, 2015, 7 pages.
Sun, Kim, "International Search Report", International Application No. PCT/US2012/050933, dated Feb. 15, 2013 (3 pages).
Sun, Kim, "International Search Report", International Application No. PCT/US2012/050954, dated Feb. 15, 2013 (3 pages).
Sun, Kim, "Written Opinion of the International Searching Authority", International Application No. PCT/US2012/050933, dated Feb. 15, 2013 (5 pages).
Sun, Kim, "Written Opinion of the International Searching Authority", International Application No. PCT/US2012/050954, dated Feb. 15, 2013 (5 pages).
Supplementary European Search Report for EP Appl. No. 12823372.3 dated Feb. 27, 2015, 5 pages.
Supplementary European Search Report in European Application No. 11735259.1, dated Dec. 8, 2017, 4 pages (with English translation).
USPTO Final Office Action; dated Apr. 2, 2014; U.S. Appl. No. 13/209,865; Ex. Dounis; 36 pp.
USPTO Final Office Action; dated Dec. 19, 2013; U.S. Appl. No. 13/183,047; Ex. Harris; 10 pp.
USPTO Final Office Action; dated Feb. 20, 2015; U.S. Appl. No. 12/691,655; Ex. Leo; 14 pp.
USPTO Final Office Action; dated Mar. 31. 2014; U.S. Appl. No. 12/691,655; Ex. Nguyen; 13 pp.
USPTO Final Office Action; dated Oct. 25, 2013; U.S. Appl. No. 13/011,619; Ex. Mian; 16 pp.
USPTO Final Office Action; dated Oct. 9, 2013; U.S. Appl. No. 13/209,944; Ex. Wan; 19 pp.
USPTO Non-Final Office Action; dated Jun. 18, 2014; U.S. Appl. No. 13/209,944; Ex. Leo; 14 pp.
USPTO Non-Final Office Action; dated Jun. 6, 2014; U.S. Appl. No. 13/011,619;Ex. Mian; 17 pp.
USPTO Office Action, dated Apr. 26, 2013; U.S. Appl. No. 13/209,893; Ex. Wan; 31 pp.
USPTO Office Action, dated Apr. 3, 2015, U.S. Appl. No. 13/209,893, Ex. Wan, 7pp.
USPTO Office Action; dated Apr. 26, 2013; U.S. Appl. No. 13/183,047; Ex. Harris, 22 pp.
USPTO Office Action; dated Apr. 5, 2013; U.S. Appl. No. 12/691,655; Ex. Nguyen; 13 pp.
USPTO Office Action; dated Feb. 8, 2013; U.S. Appl. No. 13/011,619; Ex. Mian; 33 pp.
USPTO Office Action; dated Feb. 25, 2014; U.S. Appl. No. 13/209,865; Ex. Nguyen; 7 pp.
USPTO Office Action; dated Jul. 1, 2013; U.S. Appl. No. 13/209,865; Ex. Dounis; 36 pp.
USPTO Office Action; dated Mar. 29, 2013; U.S. Appl. No. 12/691,663; Ex. Nguyen; 12 pp.
USPTO Office Action; dated May 20, 2014; U.S. Appl. No. 12/691,655; Ex. Wan; 21 pp.
USPTO Office Action; dated Sep. 16, 2013; U.S. Appl. No. 12/691,655; Ex. Nguyen; 10 pp.

* cited by examiner

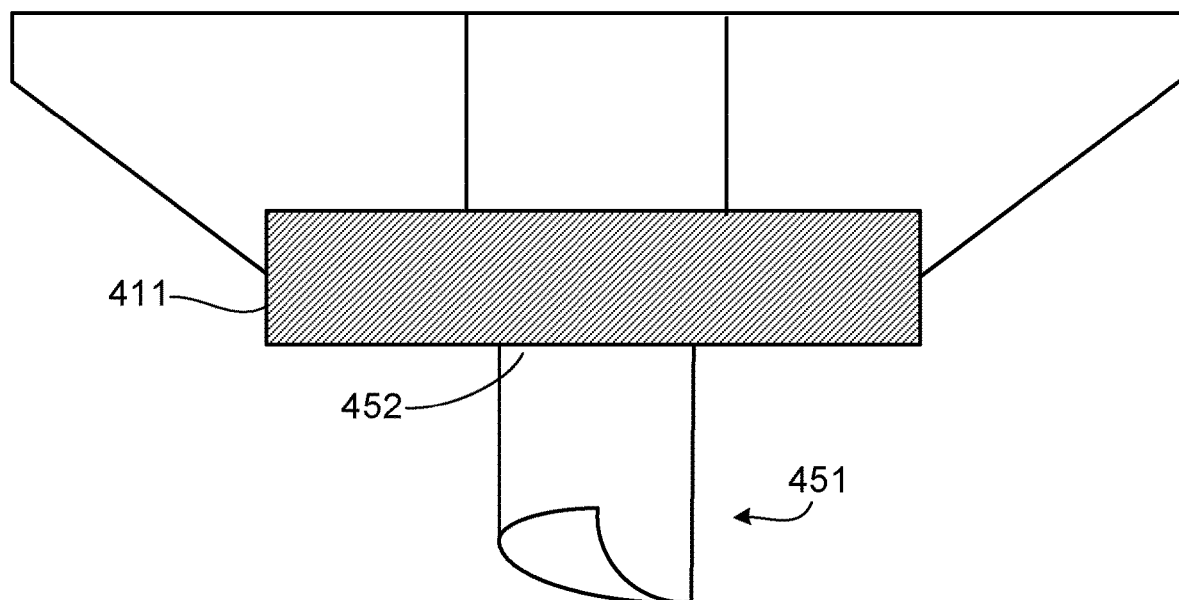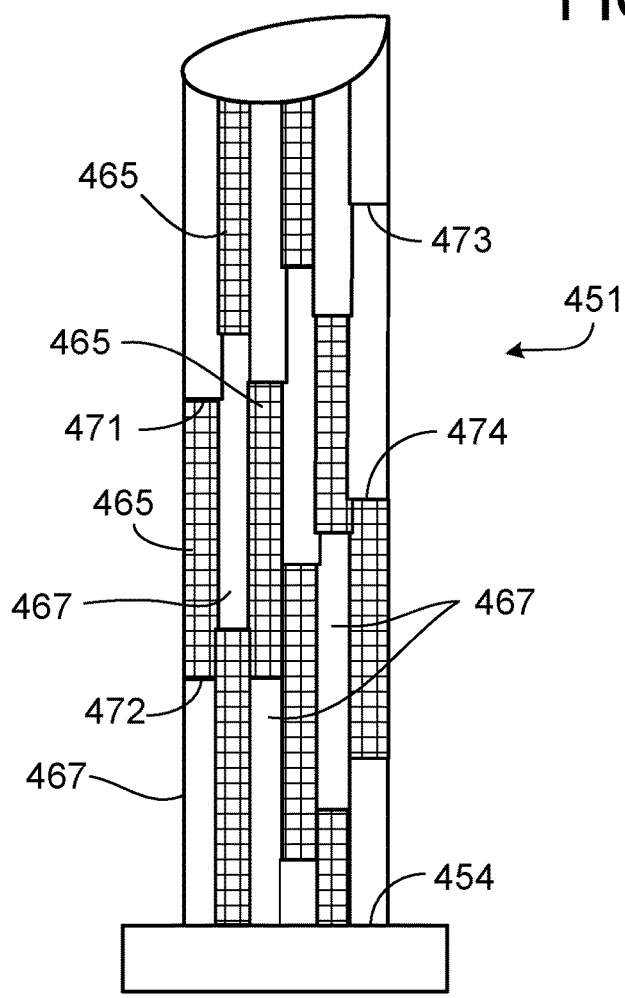
FIG. 4

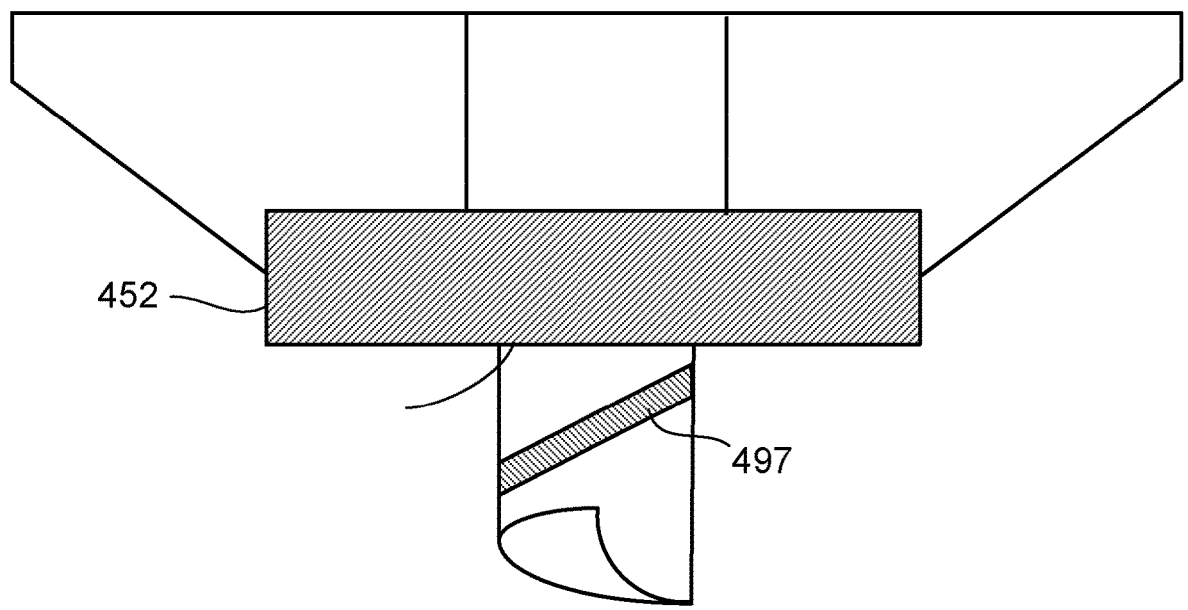
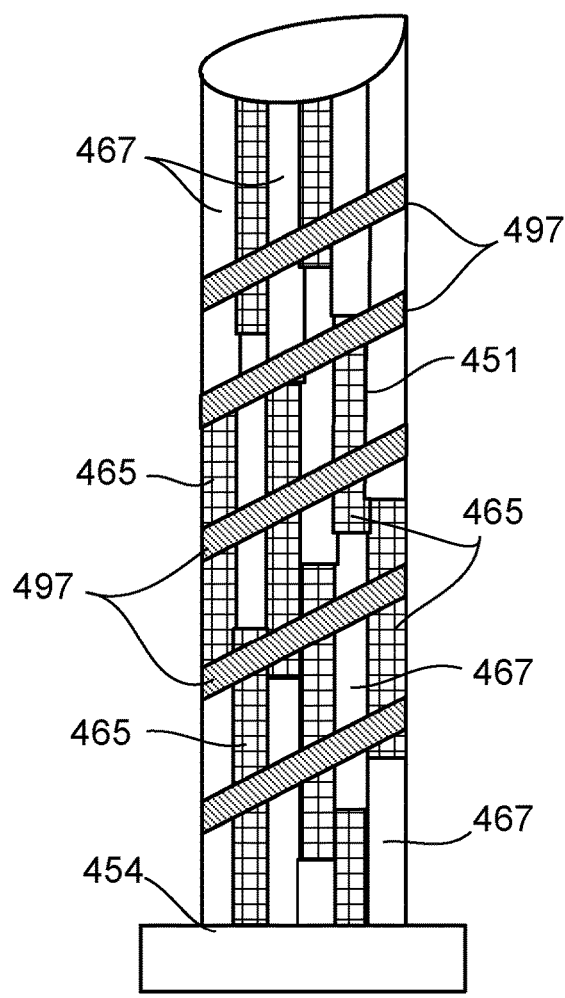
FIG. 10

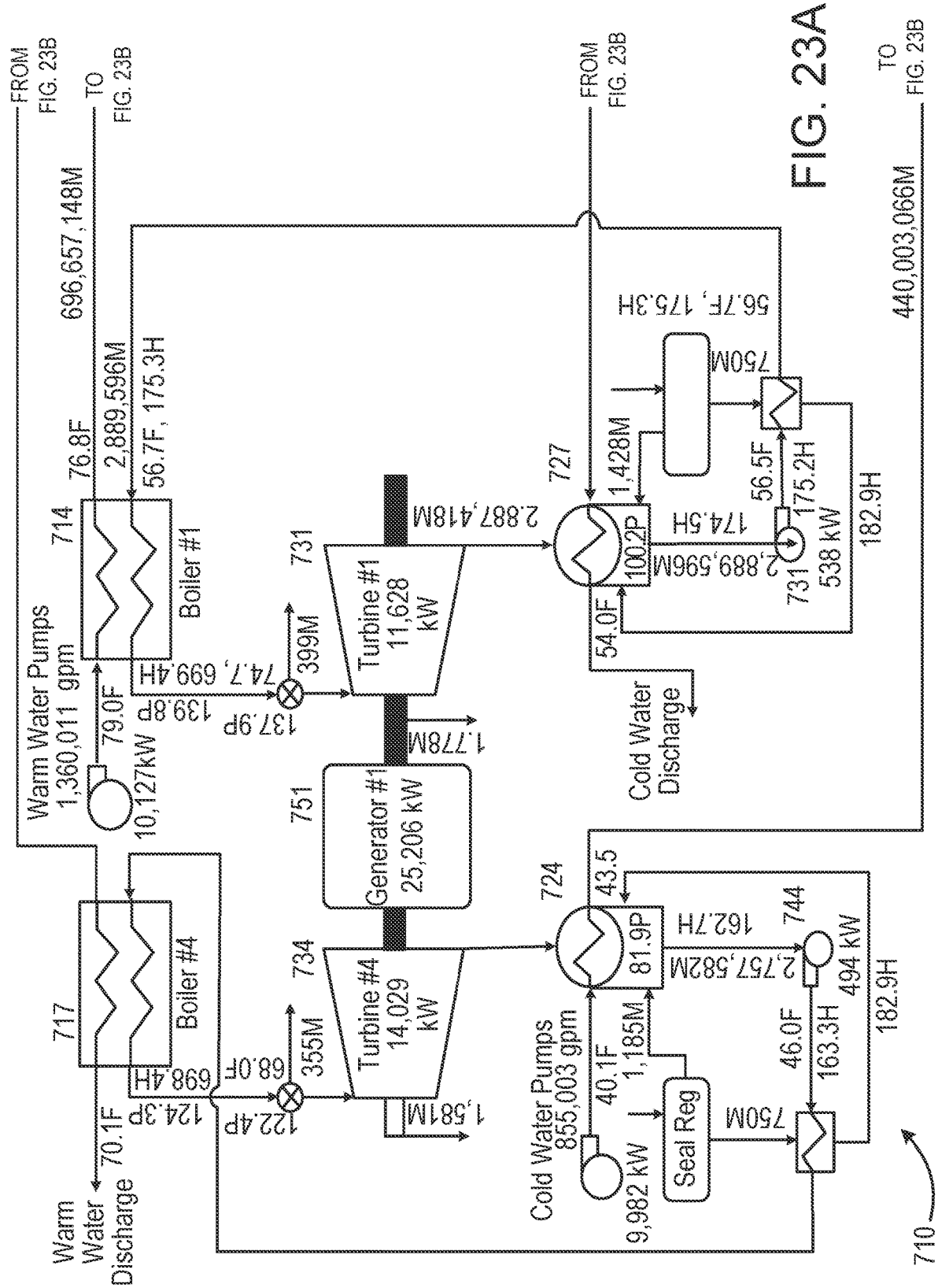

OCEAN THERMAL ENERGY CONVERSION POWER PLANT

CROSS-REFERENCE TO RELATED APPLICATIONS

This application is a continuation application of and claims priority to U.S. application Ser. No. 15/789,293, filed Oct. 20, 2017, which is a continuation application of U.S. application Ser. No. 13/011,619, filed Jan. 21, 2011, now U.S. Pat. No. 9,797,386, and claims priority to U.S. Provisional Application Ser. No. 61/297,242, filed Jan. 21, 2010, and U.S. application Ser. No. 12/691,655, filed Jan. 21, 2010, now U.S. Pat. No. 9,086,057 and U.S. application Ser. No. 12/691,663, filed Jan. 21, 2010, now U.S. Pat. No. 8,899,043. The contents of each application is incorporated herein by reference in their entirety.

TECHNICAL FIELD

This invention relates to ocean thermal energy conversion power plants and more specifically to floating, minimum heave platform, multi-stage heat engine, ocean thermal energy conversion power plants.

BACKGROUND

Energy consumption and demand throughout the world has grown at an exponential rate. This demand is expected to continue to rise, particularly in developing countries in Asia and Latin America. At the same time, traditional sources of energy, namely fossil fuels, are being depleted at an accelerating rate and the cost of exploiting fossil fuels continues to rise. Environmental and regulatory concerns are exacerbating that problem.

Solar-related renewable energy is one alternative energy source that may provide a portion of the solution to the growing demand for energy. Solar-related renewable energy is appealing because, unlike fossil fuels, uranium, or even thermal "green" energy, there are few or no climatic risks associated with its use. In addition, solar related energy is free and vastly abundant.

Ocean Thermal Energy Conversion ("OTEC") is a manner of producing renewable energy using solar energy stored as heat in the oceans' tropical regions. Tropical oceans and seas around the world offer a unique renewable energy resource. In many tropical areas (between approximately 20° north and 20° south latitude) the temperature of the surface sea water remains nearly constant. To depths of approximately 100 ft the average surface temperature of the sea water varies seasonally between 75° and 85° F. or more. In the same regions, deep ocean water (between 2500 ft and 4200 ft or more) remains a fairly constant 40° F. Thus, the tropical ocean structure offers a large warm water reservoir at the surface and a large cold water reservoir at depth, with a temperature difference between the warm and cold reservoirs of between 35° to 45° F. This temperature difference remains fairly constant throughout the day and night, with small seasonal changes.

The OTEC process uses the temperature difference between surface and deep sea tropical waters to drive a heat engine to produce electrical energy. OTEC power generation was identified in the late 1970's as a possible renewable energy source having a low to zero carbon footprint for the energy produced. An OTEC power plant, however, has a low thermodynamic efficiency compared to more traditional, high pressure, high temperature power generation plants.

For example, using the average ocean surface temperatures between 80° and 85° F. and a constant deep water temperature of 40° F., the maximum ideal Carnot efficiency of an OTEC power plant will be 7.5 to 8%. In practical operation, the gross power efficiency of an OTEC power system has been estimated to be about half the Carnot limit, or approximately 3.5 to 4.0%. Additionally, analysis performed by leading investigators in the 1970's and 1980's, and documented in "Renewable Energy from the Ocean, a Guide to OTEC" William Avery and Chih Wu, Oxford University Press, 1994 (incorporated herein by reference), indicates that between one quarter to one half (or more) of the gross electrical power generated by an OTEC plant operating with a ΔT of 40° F. would be required to run the water and working fluid pumps and to supply power to other auxiliary needs of the plant. On this basis, the low overall net efficiency of an OTEC power plant converting the thermal energy stored in the ocean surface waters to net electric energy has not been a commercially viable energy production option.

An additional factor resulting in further reductions in overall thermodynamic efficiency is the loss associated with providing necessary controls on the turbine for precise frequency regulation. This introduces pressure losses in the turbine cycle that limit the work that can be extracted from the warm sea water.

This low OTEC net efficiency compared with efficiencies typical of heat engines that operate at high temperatures and pressures has led to the widely held assumption by energy planners that OTEC power is too costly to compete with more traditional methods of power production.

Indeed, the parasitic electrical power requirements are particularly important in an OTEC power plant because of the relatively small temperature difference between the hot and cold water. To achieve maximum heat transfer between the warm sea water and the working fluid, and between the cold sea water and the working fluid large heat exchange surface areas are required, along with high fluid velocities. Increasing any one of these factors can significantly increases the parasitic load on the OTEC plant, thereby decreasing net efficiency. An efficient heat transfer system that maximizes the energy transfer in the limited temperature differential between the sea water and the working fluid would increase the commercial viability of an OTEC power plant.

In addition to the relatively low efficiencies with seemingly inherent large parasitic loads, the operating environment of OTEC plants presents design and operating challenges that also decrease the commercial viability of such operations. As previously mentioned, the warm water needed for the OTEC heat engine is found at the surface of the ocean, to a depth of 100 ft or less. The constant source of cold water for cooling the OTEC engine is found at a depth of between 2700 ft and 4200 ft or more. Such depths are not typically found in close proximity to population centers or even land masses. An offshore power plant is required.

Whether the plant is floating or fixed to an underwater feature, a long cold water intake pipe of 2000 ft or longer is required. Moreover, because of the large volume of water required in commercially viable OTEC operations, the cold water intake pipe requires a large diameter (typically between 6 and 35 feet or more). Suspending a large diameter pipe from an offshore structure presents stability, connection and construction challenges which have previously driven OTEC costs beyond commercial viability.

Additionally, a pipe having significant length to diameter ratio that is suspended in a dynamic ocean environment can be subjected to temperature differences and varying ocean currents along the length of the pipe. Stresses from bending and vortex shedding along the pipe also present challenges. And surface influences such as wave action present further challenges with the connection between the pipe and floating platform. A cold water pipe intake system having desirable performance, connection, and construction consideration would increase the commercial viability of an OTEC power plant.

Environmental concerns associated with an OTEC plant have also been an impediment to OTEC operations. Traditional OTEC systems draw in large volumes of nutrient rich cold water from the ocean depths and discharge this water at or near the surface. Such discharge can effect, in a positive or adverse manner, the ocean environment near the OTEC plant, impacting fish stocks and reef systems that may be down current from the OTEC discharge.

SUMMARY

Aspects of the present invention are directed to a power generation plant utilizing ocean thermal energy conversion processes.

Further Aspects of the invention relate to an offshore OTEC power plant having improved overall efficiencies with reduced parasitic loads, greater stability, lower construction and operating costs, and improved environmental footprint. Other aspects include large volume water conduits that are integral with the floating structure. Modularity and compartmentation of the multi-stage OTEC heat engine reduces construction and maintenance costs, limits off-grid operation and improves operating performance. Still further aspects provide for a floating platform having integrated heat exchange compartments and provides for minimal movement of the platform due to wave action. The integrated floating platform may also provide for efficient flow of the warm water or cool water through the multi-stage heat exchanger, increasing efficiency and reducing the parasitic power demand. Aspects of the invention can promote an environmentally neutral thermal footprint by discharging warm and cold water at appropriate depth/temperature ranges. Energy extracted in the form of electricity reduces the bulk temperature to the ocean.

Still further aspects of the invention relate to a cold water pipe for use with an offshore OTEC facility, the cold water pipe being an offset staved, continuous pipe. An aspect relates to a pipe that comprises an elongate tubular structure having an outer surface, a top end and a bottom end. The tubular structure comprises a plurality of first and second staved segments, each stave segment has a top portion and a bottom portion, wherein the top portion of the second stave segment is offset from the top portion of the first staved segment.

A further aspect relates to a pipe comprising a ribbon or a strake at least partially wound around the pipe on the outside surface of the tubular structure. The ribbon or strake can be circumferentially wound around the outer surface of the top portion of the pipe, the middle portion of the pipe, or the lower portion of the pipe. The ribbon or strake can be circumferentially wound around the entire length of the pipe. The ribbon or strake can be a be attached so as to lay substantially flat against the outer surface of the pipe. The ribbon or strake can be attached so as to protrude outwardly from the outer surface of the pipe. The ribbon or strake can be made of the same or different material as the pipe. The ribbon or strake can be adhesively bonded to the outer surface of the pipe, mechanically bounded to the outer surface of the pipe, or use a combination of mechanical and adhesive bonds to attach to the outer surface of the pipe.

Further aspects of the invention relate to an offset staved pipe wherein each stave segment further comprises a tongue on a first side and a groove on a second side for mating engagement with an adjacent stave segment. The offset stave pipe can include a positive locking system to mechanical couple a first side of one stave to the second side of a second stave. Stave can be joined vertically from the top portion of one stave to the bottom portion of an adjacent stave using biscuit joinery. In an alternative embodiment, the top portion of a stave and the bottom portion of a stave can each include a joining void, such that when the top portion of a first stave is joined with the bottom portion of a second stave, the joining voids align. A flexible resign can be injected into the aligned joining voids. The flexible resign can be used to fill gaps in any joined surfaces. In aspects of the invention the flexible resign is a methacrylate adhesive.

Individual staves of the current invention can be of any length. In aspects each stave segment is between 20 feet and 90 feet measured from the bottom portion to the top portion of the stave. Stave segments can be sized to be shipped by standard inter-modal container. Individual stave segments can be between 10 inches and 80 inches wide. Each stave segment can be between 1 inch and 24 inches thick.

In aspects of the invention stave segments can be pull-truded, extruded, or molded. Stave segments can comprise polyvinyl chloride (PVC), chlorinated polyvinyl chloride (CPVC), fiber reinforced plastic (FRP), reinforced polymer mortar (RPMP), polypropylene (PP), polyethylene (PE), cross-linked high-density polyethylene (PEX), polybutylene (PB), acrylonitrile butadiene styrene (ABS); polyester, fiber reinforced polyester, vinyl ester, reinforced vinyl ester, concrete, ceramic, or a composite of one or more thereof.

In further aspects of the invention, a stave segment can comprise at least one internal void. Then at least one void can be filled with water, polycarbonate foam, or syntactic foam.

In aspects of the invention, the pipe is a cold water intake pipe for an OTEC power plant.

A still further aspect of the invention relates to an offshore power generation structure comprising a submerged portion, the submerged portion further comprises: a heat exchange portion; a power generation portion; and a cold water pipe comprising a plurality of offset first and second stave segments.

Yet another aspect of the invention relates to a method of forming a cold water pipe for use in an OTEC power plant, the method comprises: forming a plurality of first and second stave segments joining alternating first and second stave segments such that the second stave segments are offset from the first stave segments to form a continuous elongated tube.

A further aspect of the invention relates to a submerged vertical pipe connection comprising: a floating structure having a vertical pipe receiving bay, wherein the receiving bay has a first diameter; a vertical pipe for insertion into the pipe receiving bay, the vertical pipe having a second diameter smaller than the first diameter of the pipe receiving bay; a partially spherical or arcuate bearing surface; and one or more movable detents, pinions or lugs operable with the bearing surface, wherein the detents define a diameter that is different than the first or second diameter when in contact with the bearing surface.

An additional aspect of the invention relates to a method of connecting a submerged vertical pipe to a floating platform comprising: a floating structure having a vertical pipe receiving bay, wherein the pipe receiving bay has a first diameter, providing a vertical pipe having a top end portion that has a second diameter that is less than the first diameter; inserting the top end portion of the vertical pipe into the receiving bay; providing a bearing surface for supporting the vertical pipe; extending one or more detents such that the one or more detents have a diameter that is different from the first or second diameters; contacting the one or more detents with the bearing surface to suspend the vertical pipe from the floating structure.

In aspects of the invention the one or more detents can be integral to the vertical pipe. The one or more detents can be integral to the receiving bay. The one or more detents comprise a first retracted position that defines a diameter less than the first diameter. The one or more detents comprise an extended position that defines a diameter greater than the first diameter. A bearing surface is integral to the pipe receiving bay and operable with the one or more detents. The bearing surface can comprise a spherical bearing surface. The one or more detents further comprise a mating surface configured to contact the bearing surface. The one or more detents further comprise a mating surface configured to contact the spherical bearing surface. The spherical bearing surface and the mating surface facilitate relative motion between the vertical pipe and the floating structure.

In still further aspects the one or more detents comprise a first retracted position that defines a diameter greater than the second diameter. The one or more detents comprise an extended position that defines a diameter less than the second diameter. A bearing surface is integral to the vertical pipe and operable with the one or more detents.

Aspects can include a drive for extending or retracting the detents, the drive being a hydraulically controlled drive, a pneumatically controlled drive; a mechanically controlled drive, an electrically controlled drive, or an electro-mechanically controlled drive.

Further aspects can include a pipe receiving bay including a first angled pipe mating surface; and a vertical pipe comprising a second angled pipe mating surface, wherein the first and second angled pipe mating surfaces are configured to cooperatively guide the vertical pipe during insertion of the vertical pipe into the pipe receiving bay.

In still further aspects, a static interface between the cold water pipe and the lower portion of the spar is provided comprising a receiving bay having a tapered lower surface and a contact pad for sealable engagement with a tapered collar surface of a cold water pipe lifting collar.

In an exemplary method of connecting a cold water pipe to a lower portion of a spar, the method provides the steps comprising: connecting lifting and retention cables to an upper portion of a cold water pipe, wherein the cold water pipe upper portion comprises a lifting collar having a tapered connecting surface, drawing the cold water pipe into a spar receiving bay using the lifting and retention cables, wherein the receiving bay comprises a tapered surface for receiving the cold water pipe upper portion and a contact pad; causing the tapered connecting surface of the cold water pipe to make a sealable contact with the contact pad of the receiving bay, and mechanically fixing the lifting cables to maintain the sealable contact between the connecting surface and the contact pad.

In yet a further aspect, a cold water pipe is provided for static connection to the lower portion of a spar, wherein the cold water pipe comprises a first longitudinal portion and a second longitudinal portion; the first longitudinal portion being connected to the lower portion of the spar and the second longitudinal portion being more flexible than the first longitudinal portion. In some aspect a third longitudinal portion can be included in the cold water pipe that is less flexible than the second longitudinal portion. The third longitudinal portion can be more flexible then the first longitudinal portion. The third longitudinal portion can comprise 50% or more of the length of the cold water pipe. The first longitudinal portion can comprise 10% or less of the length of the cold water pipe. The second longitudinal portion can comprise between 1% and 30% of the length of the cold water pipe. The second longitudinal portion can allow for deflection of the third longitudinal portion of the cold water pipe of between 0.5 degrees and 30 degrees.

Further aspects of the invention relate to a floating, minimal heave OTEC power plant having an optimized multi-stage heat exchange system, wherein the warm and cold water supply conduits and heat exchanger cabinets are structurally integrated into the floating platform or structure of the power plant.

Still further aspects include a floating ocean thermal energy conversion power plant. A minimal heave structure, such as a spar, or modified semi-submersible offshore structure may comprise a first deck portion having structurally integral warm sea water passages, multi-stage heat exchange surfaces, and working fluid passages, wherein the first deck portion provides for the evaporation of the working fluid. A second deck portion is also provided having structurally integral cold sea water passages, multi-stage heat exchange surfaces, and working fluid passages, wherein the second deck portion provides a condensing system for condensing the working fluid from a vapor to a liquid. The first and second deck working fluid passages are in communication with a third deck portion comprising one or more vapor turbine driven electric generators for power generation.

In one aspect, an offshore power generation structure is provided comprising a submerged portion. The submerged portion further comprises a first deck portion comprising an integral multi-stage evaporator system, a second deck portion comprising an integral multi-stage condensing system; a third deck portion housing power generation and transformation equipment; a cold water pipe and a cold water pipe connection.

In a further aspect, the first deck portion further comprises a first stage warm water structural passage forming a high volume warm water conduit. The first deck portion also comprises a first stage working fluid passage arranged in cooperation with the first stage warm water structural passage to warm a working fluid to a vapor. The first deck portion also comprises a first stage warm water discharge directly coupled to a second stage warm water structural passage. The second stage warm water structural passage forms a high volume warm water conduit and comprises a second stage warm water intake coupled to the first stage warm water discharge. The arrangement of the first stage warm water discharge to the second stage warm water intake provides minimal pressure loss in the warm water flow between the first and second stage. The first deck portion also comprises a second stage working fluid passage arranged in cooperation with the second stage warm water structural passage to warm the working fluid to a vapor. The first deck portion also comprises a second stage warm water discharge.

In a further aspect, the submerged portion further comprises a second deck portion comprising a first stage cold water structural passage forming a high volume cold water conduit. The first stage cold water passage further comprises a first stage cold water intake. The second deck portion also comprises a first stage working fluid passage in communication with the first stage working fluid passage of the first deck portion. The first stage working fluid passage of the second deck portion in cooperation with the first stage cold water structural passage cools the working fluid to a liquid. The second deck portion also comprises a first stage cold water discharge directly coupled to a second stage cold water structural passage forming a high volume cold water conduit. The second stage cold water structural passage comprises a second stage cold water intake. The first stage cold water discharge and the second stage cold water intake are arranged to provide minimal pressure loss in the cold water flow from the first stage cold water discharge to the second stage cold water intake. The second deck portion also comprises a second stage working fluid passage in communication with the second stage working fluid passage of the first deck portion. The second stage working fluid passage in cooperation with the second stage cold water structural passage cool the working fluid within the second stage working fluid passage to a liquid. The second deck portion also comprises a second stage cold water discharge.

In a further aspect, the third deck portion may comprise a first and second vapor turbine, wherein the first stage working fluid passage of the first deck portion is in communication with the first turbine and the second stage working fluid passage of the first deck portion is in communication with the second turbine. The first and second turbine can be coupled to one or more electric generators.

In still further aspects, an offshore power generation structure is provided comprising a submerged portion, the submerged portion further comprises a four stage evaporator portion, a four stage condenser portion, a four stage power generation portion, a cold water pipe connection, and a cold water pipe.

In one aspect the four stage evaporator portion comprises a warm water conduit including, a first stage heat exchange surface, a second stage heat exchange surface, a third stage heat exchange surface, and fourth stage heat exchange surface. The warm water conduit comprises a vertical structural member of the submerged portion. The first, second, third and fourth heat exchange surfaces are in cooperation with first, second, third and fourth stage portions of a working fluid conduit, wherein a working fluid flowing through the working fluid conduit is heated to a vapor at each of the first, second, third, and fourth stage portions.

In one aspect the four stage condenser portion comprises a cold water conduit including, a first stage heat exchange surface, a second stage heat exchange surface, a third stage heat exchange surface, and fourth stage heat exchange surface. The cold water conduit comprises a vertical structural member of the submerged portion. The first, second, third and fourth heat exchange surfaces are in cooperation with first, second, third and fourth stage portions of a working fluid conduit, wherein a working fluid flowing through the working fluid conduit is heated to a vapor at each of the first, second, third, and fourth stage portions, with lower a lower ΔT at each successive stage.

In yet another aspect, first, second, third and fourth stage working fluid conduits of the evaporator portion are in communication with a first, second, third and fourth vapor turbine, wherein the evaporator portion first stage working fluid conduit is in communication with a first vapor turbine and exhausts to the fourth stage working fluid conduit of the condenser portion.

In yet another aspect, first, second, third and fourth stage working fluid conduits of the evaporator portion are in communication with a first, second, third and fourth vapor turbine, wherein the evaporator portion second stage working fluid conduit is in communication with a second vapor turbine and exhausts to the third stage working fluid conduit of the condenser portion.

In yet another aspect, first, second, third and fourth stage working fluid conduits of the evaporator portion are in communication with a first, second, third and fourth vapor turbine, wherein the evaporator portion third stage working fluid conduit is in communication with a third vapor turbine and exhausts to the second stage working fluid conduit of the condenser portion.

In yet another aspect, first, second, third and fourth stage working fluid conduits of the evaporator portion are in communication with a first, second, third and fourth vapor turbine, wherein the evaporator portion fourth stage working fluid conduit is in communication with a fourth vapor turbine and exhausts to the first stage working fluid conduit of the condenser portion.

In still a further aspect, a first electrical generator is driven by the first turbine, the fourth turbine, or a combination of the first and fourth turbine.

In still a further aspect, a second electrical generator is driven by the second turbine, the third turbine, or a combination of both the second and third turbine.

Additional aspects of the invention can incorporate one or more of the following features: the first and fourth turbines or the second and third turbines produce between 9 MW and 60 MW of electrical power; the first and second turbines produce approximately 55 MW of electrical power; the first and second turbines form one of a plurality of turbine-generator sets in an Ocean Thermal Energy Conversion power plant; the first stage warm water intake is free of interference from the second stage cold water discharge; the first stage cold water intake is free of interference from the second stage warm water discharge; the working fluid within the first or second stage working fluid passages comprises a commercial refrigerant. The working fluid comprises ammonia, propylene, butane, R-134, or R-22; the working fluid in the first and second stage working fluid passages increases in temperature between 12° F. and 24° F.; a first working fluid flows through the first stage working fluid passage and a second working fluid flows through the second stage working fluid passage, wherein the second working fluid enters the second vapor turbine at a lower temperature than the first working fluid enters the first vapor turbine; the working fluid in the first and second stage working fluid passages decreases in temperature between 12° F. and 24° F.; a first working fluid flows through the first stage working fluid passage and a second working fluid flows through the second stage working fluid passage, wherein the second working fluid enters the second deck portion at a lower temperature than the first working fluid enters the second deck portion.

Further aspects of the invention can also incorporate one or more of the following features: the warm water flowing within the first or second stage warm water structural passage comprises: warm sea water, geo-thermally heated water, solar heated reservoir water; heated industrial cooling water, or a combination thereof; the warm water flows between 500,000 and 6,000,000 gpm; the warm water flows at 5,440,000 gpm; the warm water flows between 300,000,000 lb/hr and 1,000,000,000 lb/hr; the warm water flows at 2,720,000 lb/hr; the cold water flowing within the first or second stage cold water structural passage comprises: cold sea water, cold fresh water, cold subterranean water or a combination thereof; the cold water flows between 250,000 and 3,000,000 gpm; the cold water flows at 3,420,000 gpm; the cold water flows between 125,000,000 lb/hr and 1,750,000,000 lb/hr; the cold water flows at 1,710,000 lb/hr.

Aspects of the invention can also incorporate one or more of the following features: the offshore structure is a minimal heave structure; the offshore structure is a floating spar structure; the offshore structure is a semi-submersible structure.

A still further aspect of the invention can include a high-volume, low-velocity heat exchange system for use in an ocean thermal energy conversion power plant, comprising: a first stage cabinet that further comprises a first water flow passage for heat exchange with a working fluid; and a first working fluid passage; and a second stage cabinet coupled to the first stage cabinet, that further comprises a second water flow passage for heat exchange with a working fluid and coupled to the first water flow passage in a manner to minimize pressure drop of water flowing from the first water flow passage to the second water flow passage; and a second working fluid passage. The first and second stage cabinets comprise structural members of the power plant.

In one aspect, water flows from the first stage cabinet to the second stage cabinet and the second stage cabinet is beneath the first stage cabinet evaporator. In another aspect, water flows from the first stage cabinet to the second stage cabinet and the second stage cabinet is above the first stage cabinet in the condensers and below the first stage cabinet in the evaporators.

Aspects of the invention may have one or more of the following advantages: a continuous offset staved cold water pipe is lighter than segmented pipe construction; a continuous offset staved cold water pipe has less frictional losses than a segmented pipe; individual staves can be sized for easy transportation to the OTEC plant operational site; staves can be constructed to desired buoyancy characteristics; OTEC power production requires little to no fuel costs for energy production; the low pressures and low temperatures involved in the OTEC heat engine reduce component costs and require ordinary materials compared to the high-cost, exotic materials used in high pressure, high temperature power generation plants; plant reliability is comparable to commercial refrigeration systems, operating continuously for several years without significant maintenance; reduced construction times compared to high pressure, high temperature plants; and safe, environmentally benign operation and power production. Additional advantages may include, increased net efficiency compared to traditional OTEC systems, lower sacrificial electrical loads; reduced pressure loss in warm and cold water passages; modular components; less frequent off-grid production time; minimal heave and reduced susceptibility to wave action; discharge of cooling water below surface levels, intake of warm water free from interference from cold water discharge.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 illustrates an offset staved pipe of an OTEC structure of the present invention.

FIG. 10 illustrates an offset staved cold water pipe incorporating a reinforcing strake of the present invention.

FIGS. 23A-B illustrate an exemplary OTEC heat engine of the present invention.

Like reference symbols in the various drawings indicate like elements unless otherwise indicated.

DETAILED DESCRIPTION

This invention relates to electrical power generation using Ocean Thermal Energy Conversion (OTEC) technology. Aspects of the invention relate to a floating OTEC power plant having improved overall efficiencies with reduced parasitic loads, greater stability, lower construction and operating costs, and improved environmental footprint over previous OTEC power plants. Other aspects include large volume water conduits that are integral with the floating structure. Modularity and compartmentation of the multi-stage OTEC heat engine reduces construction and maintenance costs, limits off-grid operation and improves operating performance. Still further aspects provide for a floating platform having integrated heat exchange compartments and provides for minimal movement of the platform due to wave action. The integrated floating platform may also provide for efficient flow of the warm water or cool water through the multi-stage heat exchanger, increasing efficiency and reducing the parasitic power demand. Aspects of the invention promote a neutral thermal footprint by discharging warm and cold water at appropriate depth/temperature ranges. Energy extracted in the form of electricity reduces the bulk temperature to the ocean.

OTEC is a process that uses heat energy from the sun that is stored in the Earth's oceans to generate electricity. OTEC utilizes the temperature difference between the warmer, top layer of the ocean and the colder, deep ocean water. Typically this difference is at least 36° F. (20° C.). These conditions exist in tropical areas, roughly between the Tropic of Capricorn and the Tropic of Cancer, or even 20° north and south latitude. The OTEC process uses the temperature difference to power a Rankine cycle, with the warm surface water serving as the heat source and the cold deep water serving as the heat sink. Rankine cycle turbines drive generators which produce electrical power.

Figure 1:
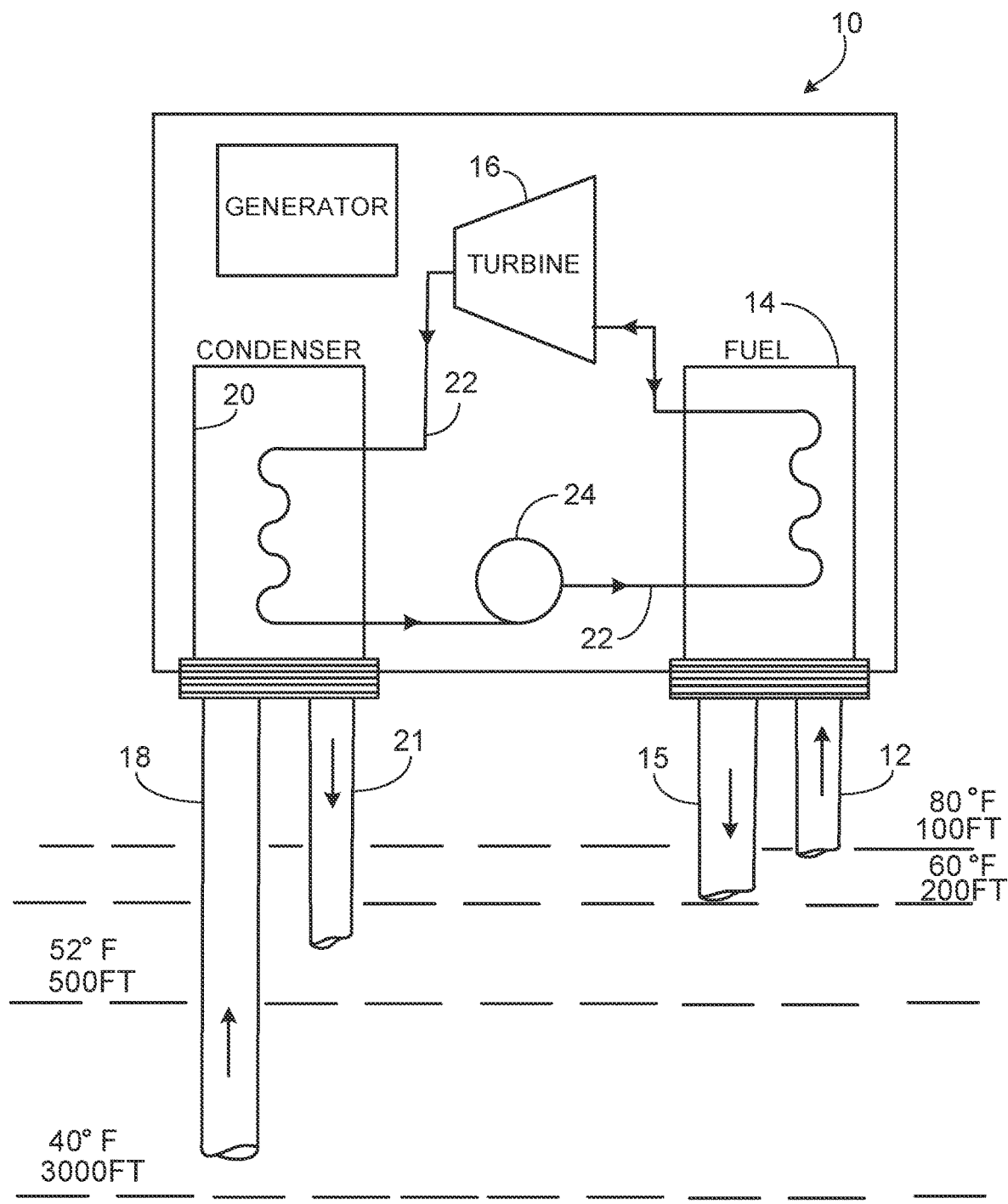
FIG. 1 illustrates an exemplary prior-art OTEC heat engine.

FIG. 1 illustrates a typical OTEC Rankine cycle heat engine 10 which includes warm sea water inlet 12, evaporator 14, warm sea water outlet 15, turbine 16, cold sea water inlet 18, condenser 20, cold sea water outlet 21, working fluid conduit 22 and working fluid pump 24.

In operation, heat engine 10 can use any one of a number of working fluids, for example commercial refrigerants such as ammonia. Other working fluids can include propylene, butane, R-22 and R-134a. Other commercial refrigerants can be used. Warm sea water between approximately 75° and 85° F., or more, is drawn from the ocean surface or just below the ocean surface through warm sea water inlet 12 and in turn warms the ammonia working fluid passing through evaporator 14. The ammonia boils to a vapor pressure of approximately 9.3 atm. The vapor is carried along working fluid conduit 22 to turbine 16. The ammonia vapor expands as it passes through the turbine 16, producing power to drive an electric generator 25. The ammonia vapor then enters condenser 20 where it is cooled to a liquid by cold sea water drawn from a deep ocean depth of approximately 3000 ft. The cold sea water enters the condenser at a temperature of approximately 40° F. The vapor pressure of the ammonia working fluid at the temperature in the condenser 20, approximately 51° F., is 6.1 atm. Thus, a significant pressure difference is available to drive the turbine 16 and generate electric power. As the ammonia working fluid condenses, the liquid working fluid is pumped back into the evaporator 14 by working fluid pump 24 via working fluid conduit 22.

The heat engine 10 of FIG. 1 is essentially the same as the Rankine cycle of most steam turbines, except that OTEC differs by using different working fluids and lower temperatures and pressures. The heat engine 10 of the FIG. 1 is also similar to commercial refrigeration plants, except that the OTEC cycle is run in the opposite direction so that a heat source (e.g., warm ocean water) and a cold heat sink (e.g., deep ocean water) are used to produce electric power.

Figure 2:
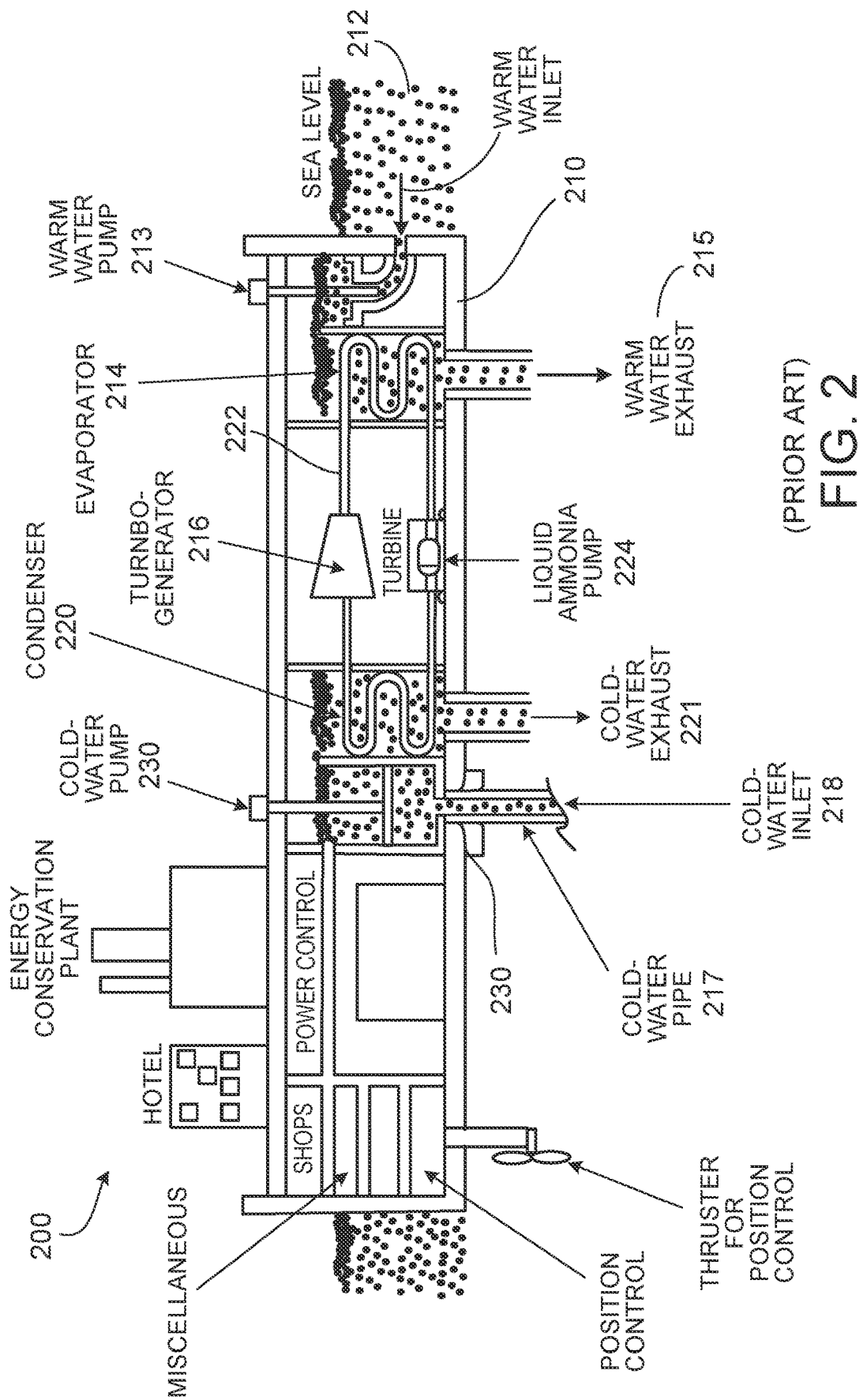
FIG. 2 illustrates an exemplary prior-art OTEC power plant.

FIG. 2 illustrates the typical components of a floating OTEC facility 200, which include: the vessel or platform 210, warm sea water inlet 212, warm water pump 213, evaporator 214, warm sea water outlet 215, turbine-generator 216, cold water pipe 217, cold sea water inlet 218, cold water pump 219, condenser 220, cold sea water outlet 221, working fluid conduit 22, working fluid pump 224, and pipe connections 230. OTEC facility 200 can also include electrical generation, transformation and transmission systems, position control systems such as propulsion, thrusters, or mooring systems, as well as various auxiliary and support systems (for example, personnel accommodations, emergency power, potable water, black and grey water, fire fighting, damage control, reserve buoyancy, and other common shipboard or marine systems.).

Implementations of OTEC power plants utilizing the basic heat engine and system of FIGS. 1 and 2 have a relatively low overall efficiency of 3% or below. Because of this low thermal efficiency, OTEC operations require the flow of large amounts of water through the power system per kilowatt of power generated. This in turn requires large heat exchangers having large heat exchange surface areas in the evaporator and condensers.

Such large volumes of water and large surface areas require considerable pumping capacity in the warm water pump 213 and cold water pump 219, reducing the net electrical power available for distribution to a shore-based facility or on board industrial purposes. Moreover, the limited space of most surface vessels, does not easily facilitate large volumes of water directed to and flowing through the evaporator or condenser. Indeed, large volumes of water require large diameter pipes and conduits. Putting such structures in limited space requires multiple bends to accommodate other machinery. And the limited space of typical surface vessels or structures does not easily facilitate the large heat exchange surface area required for maximum efficiency in an OTEC plant. Thus the OTEC systems and vessel or platform have traditional been large and costly. This has lead to an industry conclusion that OTEC operations are a high cost, low yield energy production option when compared to other energy production options using higher temperatures and pressures.

Aspects of the invention address technical challenges in order to improve the efficiency of OTEC operations and reduce the cost of construction and operation.

The vessel or platform 210 requires low motions to minimize dynamic forces between the cold water pipe 217 and the vessel or platform 210 and to provide a benign operating environment for the OTEC equipment in the platform or vessel. The vessel or platform 210 should also support cold and warm water inlet (218 and 212) volume flows, bringing in sufficient cold and warm water at appropriate levels to ensure OTEC process efficiency. The vessel or platform 210 should also enable cold and warm water discharge via cold and warm water outlets (221 and 215) well below the waterline of vessel or platform 210 to avoid thermal recirculation into the ocean surface layer. Additionally, the vessel or platform 210 should survive heavy weather without disrupting power generating operations.

The OTEC heat engine 10 should utilize a highly efficient thermal cycle for maximum efficiency and power production. Heat transfer in boiling and condensing processes, as well as the heat exchanger materials and design, limit the amount of energy that can be extracted from each pound of warm seawater. The heat exchangers used in the evaporator 214 and the condenser 220 require high volumes of warm and cold water flow with low head loss to minimize parasitic loads. The heat exchangers also require high coefficients of heat transfer to enhance efficiency. The heat exchangers can incorporate material and design that may be tailored to the warm and cold water inlet temperatures to enhance efficiency. The heat exchanger design should use a simple construction method with minimal amounts of material to reduce cost and volume.

Figure 3:
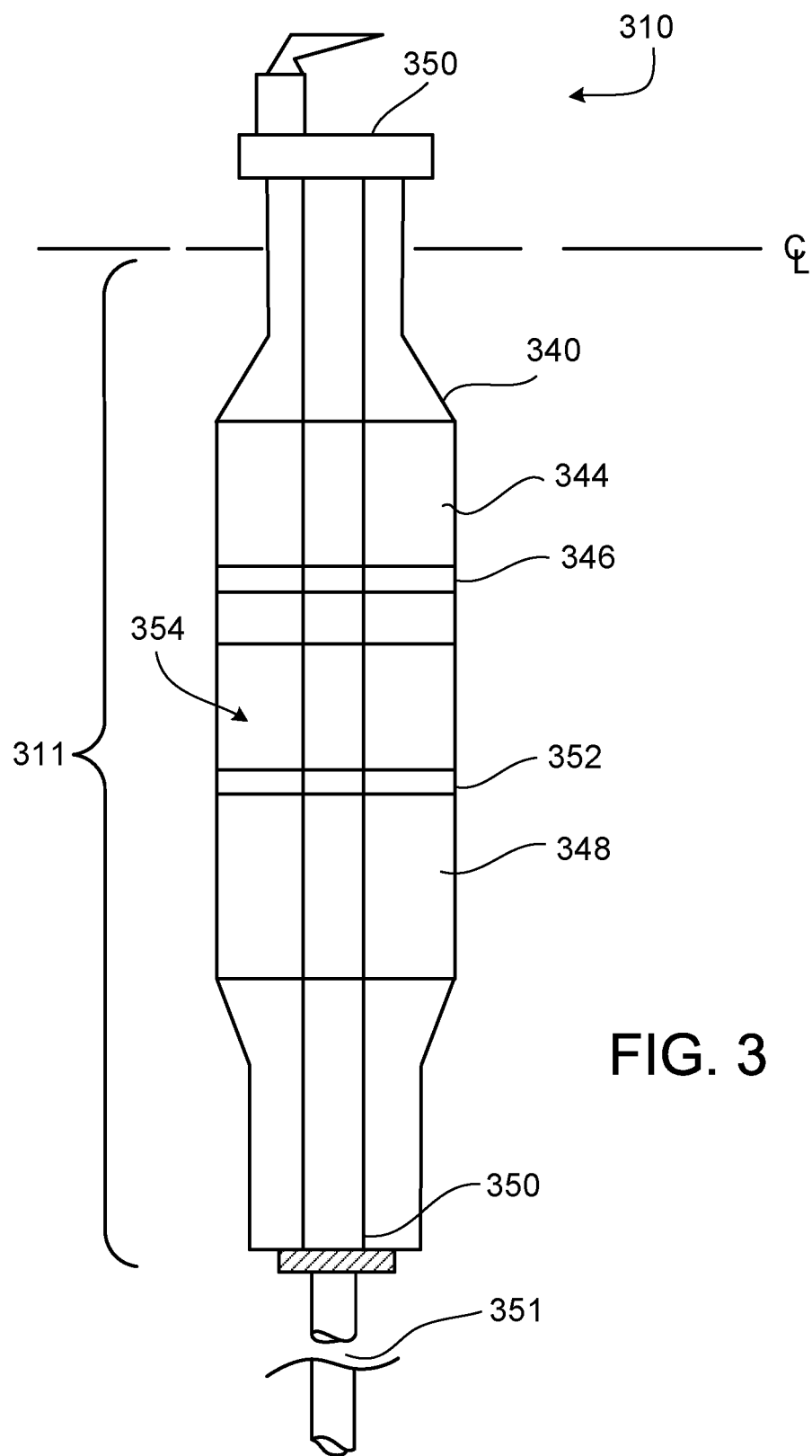
FIG. 3 illustrates OTEC structure of the present invention.

Turbo generators 216 should be highly efficient with minimal internal losses and may also be tailored to the working fluid to enhance efficiency FIG. 3 illustrates an implementation of the present invention that enhances the efficiency of previous OTEC power plants and overcomes many of the technical challenges associated therewith. This implementation comprises a spar for the vessel or platform, with heat exchangers and associated warm and cold water piping integral to the spar.

OTEC Spar 310 houses an integral multi-stage heat exchange system for use with an OTEC power generation plant. Spar 310 includes a submerged portion 311 below waterline 305. Submerged portion 311 comprises warm water intake portion 340, evaporator portion 344, warm water discharge portion 346, condenser portion 348, cold water intake portion 350, cold water pipe 351, cold water discharge portion 352, machinery deck portion 354. A deck house 360 sets atop the spar housing the electrical switchyard, auxiliary and emergency machinery and systems, boat handling equipment, and manned spaces such as office, accommodations, communications center and control rooms.

Figure 3A:
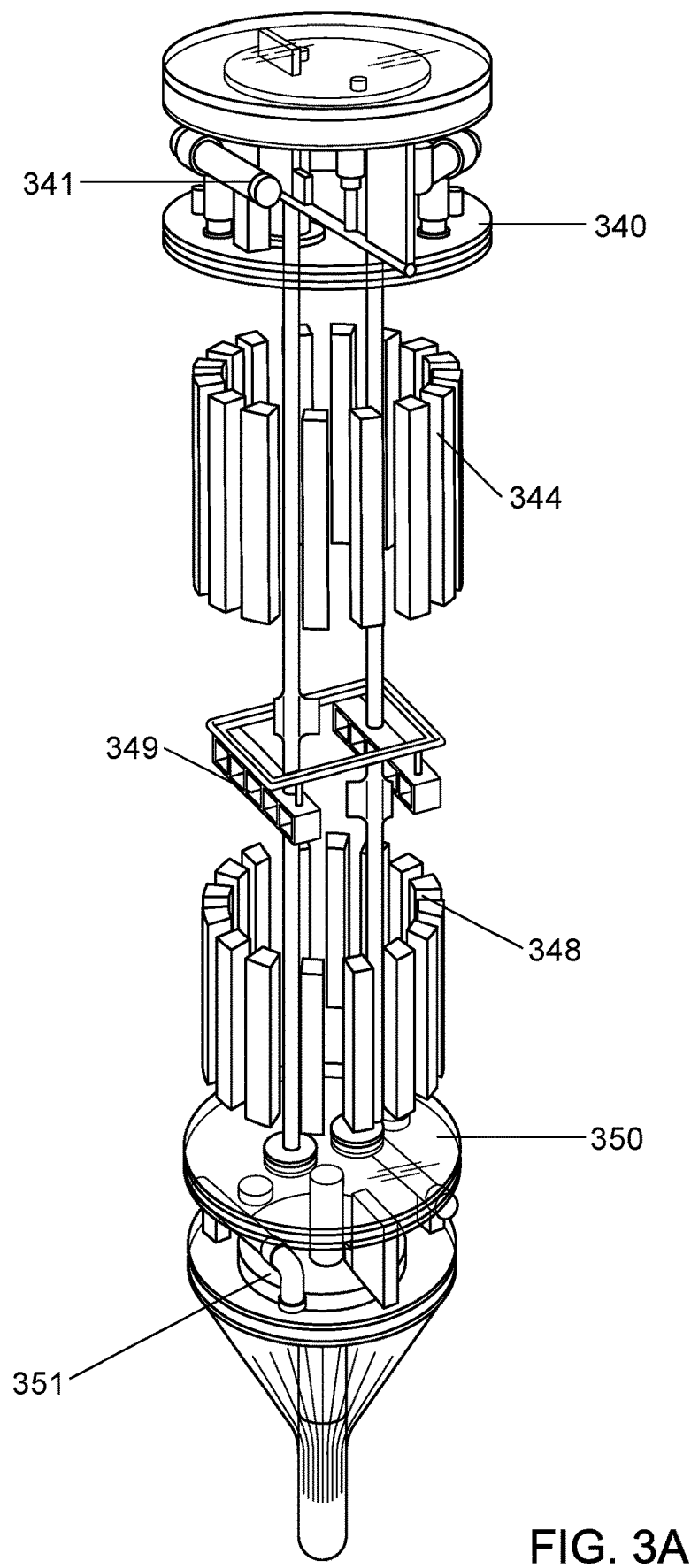
FIG. 3A illustrates OTEC structure of the present invention.

FIG. 3A illustrates an exemplary machinery layout of the present invention, including warm water intake portion 340, warm water pump room 341, stacked evaporator portion 344, turbine generator 349, stacked condenser portion 348, cold water intake portion 350, and cold water pump room 351.

In operation, warm sea water of between 75° F. and 85° F. is drawn through warm water intake portion 340 and flows down the spar though structurally integral warm water conduits not shown. Due to the high volume water flow requirements of OTEC heat engines, the warm water conduits direct flow to the evaporator portion 344 of between 500,000 gpm and 6,000,000 gpm. Such warm water conduits have a diameter of between 6 ft and 35 ft, or more. Due to this size, the warm water conduits are vertical structural members of spar 310. Warm water conduits can be large diameter pipes of sufficient strength to vertically support spar 310. Alternatively, the warm water conduits can be passages integral to the construction of the spar 310.

Warm water then flows through the evaporator portion 344 which houses one or more stacked, multi-stage heat exchangers for warming a working fluid to a vapor. The warm sea water is then discharged from spar 310 via warm water discharge 346. Warm water discharge can be located or directed via a warm water discharge pipe to a depth at or close to an ocean thermal layer that is approximately the same temperature as the warm water discharge temperature to minimize environmental impacts. The warm water discharge can be directed to a sufficient depth to ensure no thermal recirculation with either the warm water intake or cold water intake.

Cold sea water is drawn from a depth of between 2500 and 4200 ft, or more, at a temperature of approximately 40° F., via cold water pipe 351. The cold sea water enters spar 310 via cold water intake portion 350. Due to the high volume water flow requirements of OTEC heat engines, the cold sea water conduits direct flow to the condenser portion 348 of between 500,000 gpm and 3,500,000 gpm. Such cold sea water conduits have a diameter of between 6 ft and 35 ft, or more. Due to this size, the cold sea water conduits are vertical structural members of spar 310. Cold water conduits can be large diameter pipes of sufficient strength to vertically support spar 310. Alternatively, the cold water conduits can be passages integral to the construction of the spar 310.

Cold sea water then flows upward to stacked multi-stage condenser portion 348, where the cold sea water cools a working fluid to a liquid. The cold sea water is then discharged from spar 310 via cold sea water discharge 352. Cold water discharge can be located or directed via a cold sea water discharge pipe to depth at or close to an ocean thermal layer that is approximately the same temperature as the cold sea water discharge temperature. The cold water discharge can be directed to a sufficient depth to ensure no thermal recirculation with either the warm water intake or cold water intake.

Machinery deck portion 354 can be positioned vertically between the evaporator portion 344 and the condenser portion 348. Positioning machinery deck portion 354 beneath evaporator portion 344 allows nearly straight line warm water flow from intake, through the multi-stage evaporators, and to discharge. Positioning machinery deck portion 354 above condenser portion 348 allows nearly straight line cold water flow from intake, through the multi-stage condensers, and to discharge. Machinery deck portion 354 includes turbo-generators 356. In operation warm working fluid heated to a vapor from evaporator portion 344 flows to one or more turbo generators 356. The working fluid expands in turbo generator 356 thereby driving a turbine for the production of electrical power. The working fluid then flows to condenser portion 348 where it is cooled to a liquid and pumped to evaporator portion 344.

The performance of heat exchangers is affected by the available temperature difference between the fluids as well as the heat transfer coefficient at the surfaces of the heat exchanger. The heat transfer coefficient generally varies with the velocity of the fluid across the heat transfer surfaces. Higher fluid velocities require higher pumping power, thereby reducing the net efficiency of the plant. A hybrid cascading multi-stage heat exchange system facilitates lower fluid velocities and greater plant efficiencies. The stacked hybrid cascade heat exchange design also facilitates lower pressure drops through the heat exchanger. And the vertical plant design facilitates lower pressure drop across the whole system. A hybrid cascading multi-stage heat exchange system is described in U.S. patent application Ser. No. 12/691,663, entitled "Ocean Thermal Energy Conversion Plant," filed on Jan. 21, 2010, the entire contents of which are incorporated herein by reference.

Cold Water Pipe

As described above, OTEC operations require a source of cold water at a constant temperature. Variations in the cooling water can greatly influence the overall efficiency of the OTEC power plant. As such, water at approximately 40° F. is drawn from depths of between 2700 ft and 4200 ft or more. A long intake pipe is needed to draw this cold water to the surface for use by the OTEC power plant. Such cold water pipes have been an obstacle to commercially viable OTEC operations because of the cost in constructing a pipe of suitable performance and durability.

Such cold water pipes have been an obstacle to commercially viable OTEC operations because of the cost in constructing a pipe of suitable performance and durability. OTEC requires large volumes of water at desired temperatures in order to ensure maximum efficiency in generating electrical power. Previous cold water pipe designs specific to OTEC operations have included a sectional construction. Cylindrical pipe sections were bolted or mechanically joined together in series until a sufficient length was achieved. Pipe sections were assembled near the plant facility and the fully constructed pipe was then upended and installed. This approach had significant drawbacks including stress and fatigue at the connection points between pipe sections. Moreover, the connection hardware added to the overall pipe weight, further complicating the stress and fatigue considerations at the pipe section connections and the connection between the fully assembled CWP and the OTEC platform or vessel.

The cold water pipe ("CWP") is used to draw water from the cold water reservoir at an ocean depth of between 2700 ft and 4200 ft or more. The cold water is used to cool and condense to a liquid the vaporous working fluid emerging from the power plant turbine. The CWP and its connection to the vessel or platform are configured to withstand the static and dynamic loads imposed by the pipe weight, the relative motions of the pipe and platform when subjected to wave and current loads of up to 100-year-storm severity, and the collapsing load induced by the water pump suction. The CWP is sized to handle the required water flow with low drag loss, and is made of a material that is durable and corrosion resistant in sea water.

The cold water pipe length is defined by the need to draw water from a depth where the temperature is approximately 40° F. The CWP length can be between 2000 feet and 4000 ft or more. In aspects of the present invention the cold water pipe can be approximately 3000 feet in length.

The CWP diameter is determined by the power plant size and water flow requirements. The water flow rate through the pipe is determined by the desired power output and OTEC power plant efficiency. The CWP can carry cold water to the cold water conduit of the vessel or platform at a rate of between 500,000 gpm and 3,500,000 gpm, or more. Cold water pipe diameters can be between 6 feet and 35 feet or more. In aspects of the present invention, the CWP diameter is approximately 31 feet in diameter.

Previous cold water pipe designs specific to OTEC operations have included a sectional construction. Cylindrical pipe sections of between 10 and 80 feet in length were bolted or joined together in series until a sufficient length was achieved. Using multiple cylindrical pipe sections, the CWP could be assembled near the plant facility and the fully constructed pipe could be upended and installed. This approach had significant drawbacks including stress and fatigue at the connection points between pipe sections. Moreover, the connection hardware added to the overall pipe weight, further complicating the stress and fatigue considerations at the pipe section connections and the connection between the fully assembled CWP and the OTEC platform or vessel.

Referring to FIG. 4 a continuous offset staved cold water pipe is shown. The cold water pipe 451 is free of sectional joints as in previous CWP designs, instead utilizing an offset stave construction. CWP 451 includes a top end portion 452 for connection to the submerged portion of the floating OTEC platform 411. Opposite top end portion 452 is bottom portion 454, which can include a ballast system, an anchoring system, and/or an intake screen.

CWP 451 comprises a plurality of offset staves constructed to form a cylinder. In an aspect the plurality of offset staves can include alternating multiple first staves 465 and multiple second staves 467. Each first stave includes a top edge 471 and a bottom edge 472. Each second stave includes a top edge 473 and a bottom edge 474. In an aspect, second stave 467 is vertically offset from an adjacent first stave portion 465 such that top edge 473 (of second stave portion 467) is between 3% and 97% vertically displaced from the top edge 471 (of first stave portion 465). In further aspects, the offset between adjacent staves can be approximately, 5%, 10%, 15%, 20%, 25%, 30%, 35%, 40%, 45%, 50% or more.

Figure 5:
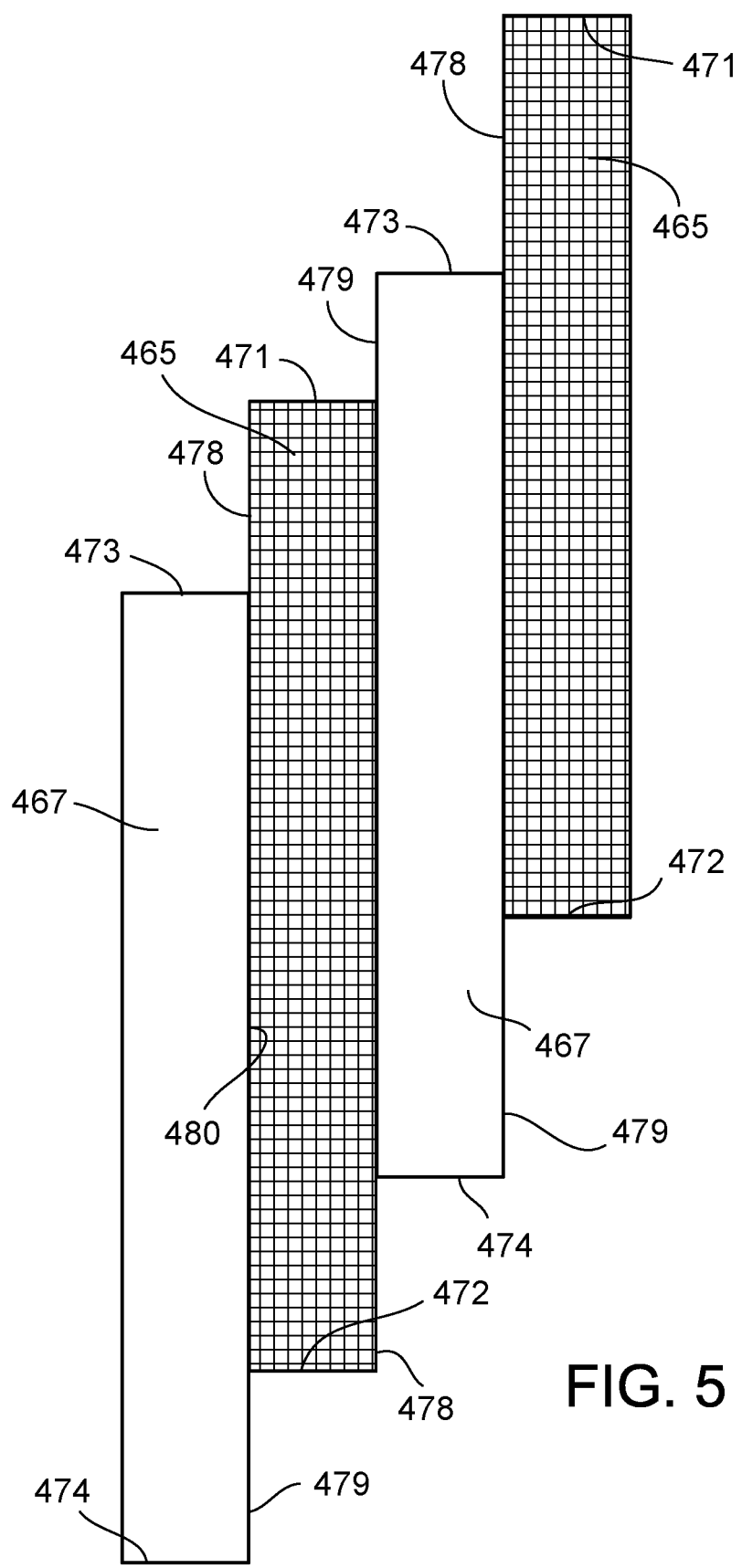
FIG. 5 illustrates a detailed image of an offset stave pattern of the present invention.

FIG. 5 illustrates a detail view of an offsetting stave pattern of an aspect of the present invention. The pattern includes multiple first staves 465, each having a top edge portion 471, bottom edge portion 472, connected edge 480 and offset edge 478. The pattern also includes multiple second staves 467, each having a top edge portion 473, a bottom edge portion 474, connected edge 480, and offset edge 479. In forming the cold water pipe, first stave section 465 is joined to second stave section 467 such that connected edge 480 is approximately 3% to 97% of the length of first stave section 465 when measured from the top edge 471 to the bottom edge 472. In an aspect, connected edge 480 is approximately 50%, 55%, 60%, 65%, 70%, 75%, 80%, 85%, or 90% of the length of the stave.

It will be appreciated that in a fully constructed pipe, first stave 465 can be joined to second stave 467 along connected edge 480. First stave 465 can also be connected to additional staves along offset edge 478, including an additional first stave portion, an additional second stave portion, or any other stave portion. Similarly, second stave 467 can be joined to first stave portion along connected edge 480. And second stave 467 can be joined to another stave along offset edge 479, including an additional first stave portion, an additional second stave portion, or any other stave portion.

In aspects, the connected edge 480 between the multiple first staves 465 and the multiple second staves 467 can be a consistent length or percentage of the stave length for each stave about the circumference of the pipe. The connected edge 480 between the multiple first staves 465 and the multiple second staves 465 can be a consistent length or percentage of the stave length for each stave along the longitudinal axis of the cold water pipe 451. In further aspects the connected edge 480 can vary in length between alternating first staves 465 and second staves 467.

As illustrated in FIG. 5, first stave 465 and second stave 467 have the same dimensions. In aspects, first stave 465 can be between 30 and 130 inches wide or more, 30 to 60 feet long, and between 1 and 24 inches thick. In an aspect the stave dimensions can be approximately 80 inches wide, 40 feet long, and 4 to 12 inches thick. Alternatively, first stave 465 can have a different length or width from second stave 467.

Figure 6:
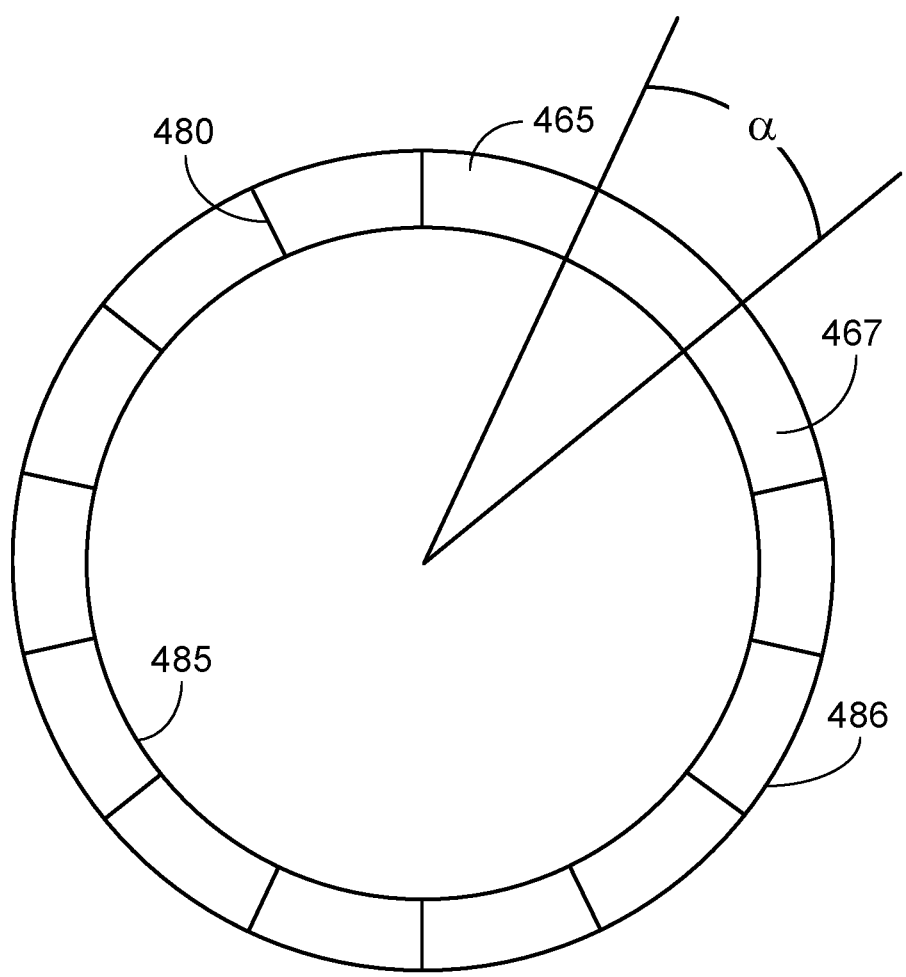
FIG. 6 illustrates a cross sectional view of an offset staved cold water pipe of the present invention.

FIG. 6 illustrates a cross sectional view of cold water pipe 451 showing alternating first staves 465 and second staves 467. Each stave includes an inner surface 485 and an outer surface 486. Adjacent staves are joined along connected surface 480. Any two connected surfaces on opposite sides of a single stave define an angle $\alpha$. The angle $\alpha$ is determined by dividing 360° by the total number of staves. In an aspect, a can be between 1° and 36°. In an aspect a can be 22.5° for a 16 stave pipe or 11.25° for a 32 stave pipe.

Individual staves of cold water pipe 451 can be made from polyvinyl chloride (PVC), chlorinated polyvinyl chloride (CPVC), fiber reinforced plastic (FRP), reinforced polymer mortar (RPMP), polypropylene (PP), polyethylene (PE), cross-linked high-density polyethylene (PEX), polybutylene (PB), acrylonitrile butadiene styrene (ABS); polyurethane, polyester, fiber reinforced polyester, nylon reinforce polyester, vinyl ester, fiber reinforced vinyl ester, nylon reinforced vinyl ester, concrete, ceramic, or a composite of one or more thereof. Individual staves can be molded, extruded, or pulltruded using standard manufacturing techniques. In one aspect, individual staves are pulltruded to the desired shape and form and comprise a fiber or nylon reinforced vinyl ester. Vinyl esters are available from Ashland Chemical of Covington, Ky.

In an aspect, staves are bonded to adjacent staves using a suitable adhesive. A flexible resin can be used to provide a flexible joint and uniform pipe performance. In aspects of the invention, staves comprising a reinforced vinyl ester are bonded to adjacent staves using a vinyl ester resin. Methacrylate adhesives can also be used, such as MA560-1 manufactured by Plexis Structural Adhesives of Danvers, Mass.

Figure 7A:
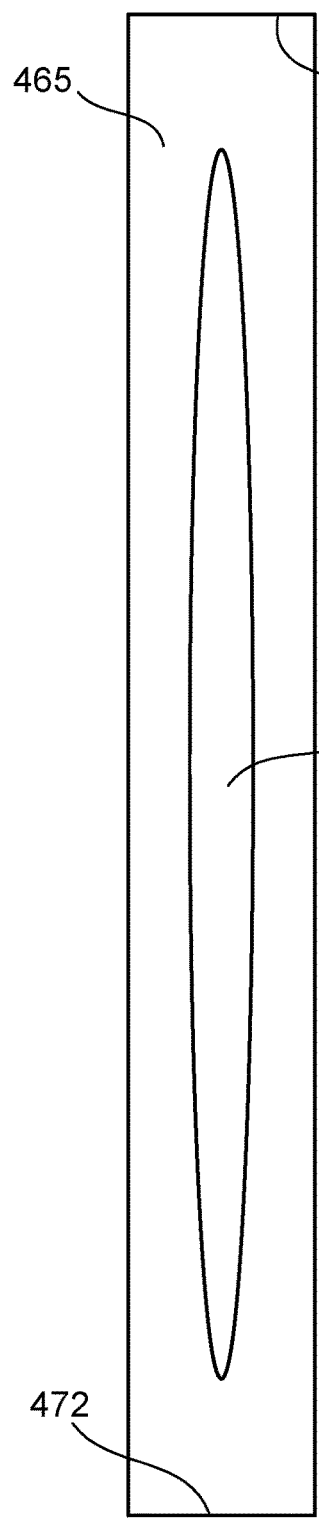
FIGS. 7A-C illustrate various views of individual staves of the present invention.
Figure 7B:
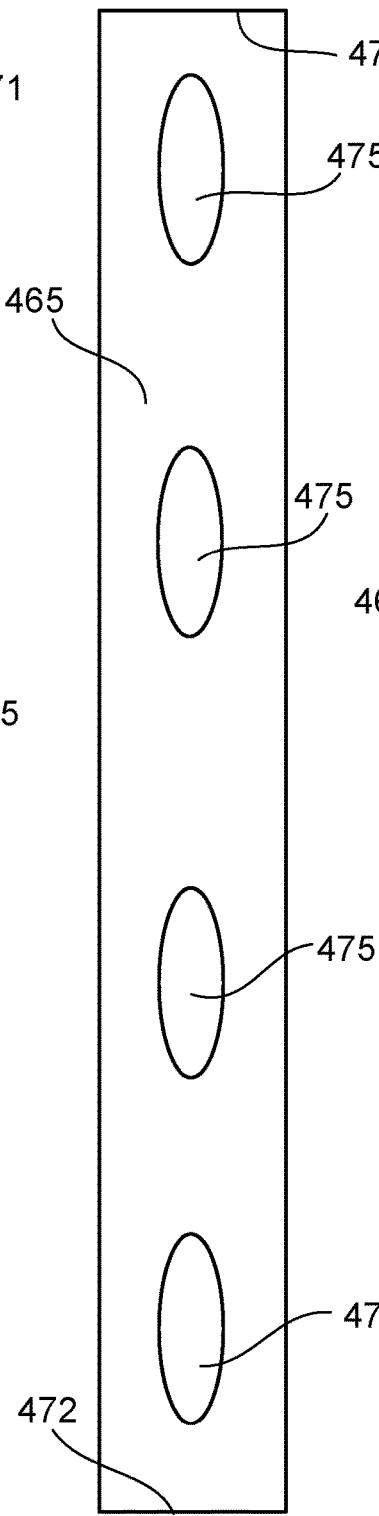
Figure 7C:
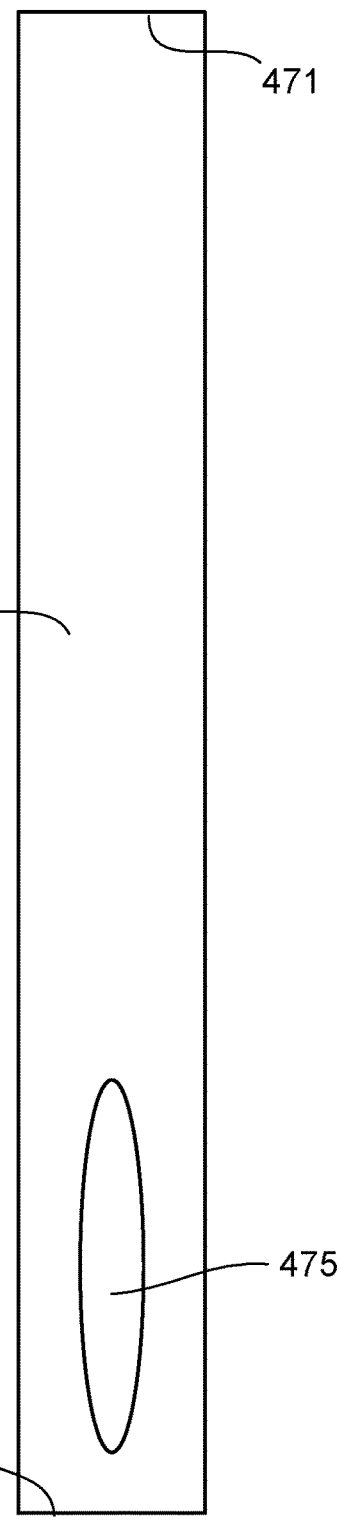

Referring to FIGS. 7A-7C, various stave constructions are shown wherein an individual stave 465 includes a top edge 471, a bottom edge 472 and one or more voids 475. Void 475 can be hollow, filled with water, filled with a resin, filled with an adhesive, or filled with a foam material, such as syntactic foam. Syntactic foam is a matrix of resin and small glass beads. The beads can either be hollow or solid. Void 475 can be filled to influence the buoyancy of the stave and/or the cold water pipe 451. FIG. 7A illustrates a single void 475. In an aspect multiple voids 475 can be equally spaced along the length of the stave, as illustrated in FIG. 7B. In an aspect, one or more voids 475 can be placed toward one end of the stave, for example toward the bottom edge 472, as illustrated in FIG. 7C.

Figure 8:
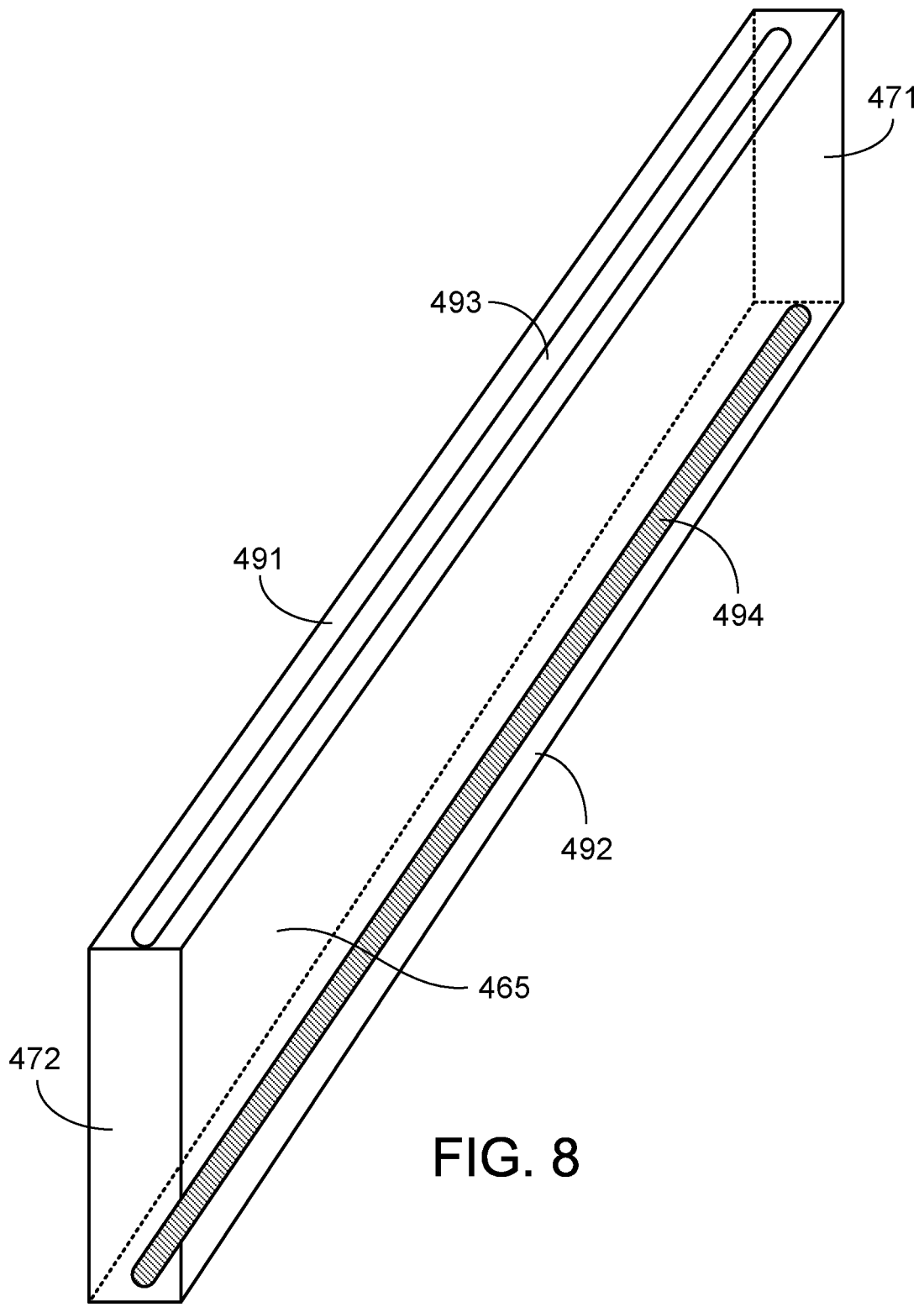
FIG. 8 illustrates a tongue and groove arrangement of an individual stave of the present invention.

Referring to FIG. 8, each individual stave 465 can include a top edge 471, a bottom edge 472, a first longitudinal side 491 and a second longitudinal side 492. In an aspect, longitudinal side 491 includes a joinery member, such as tongue 493. The joinery member can alternatively include, biscuits, half-lap joints, or other joinery structures. Second longitudinal side 492 includes a mating joinery surface, such as groove 494. In use, the first longitudinal side 491 of a first stave mates or joins with the second longitudinal side 492 of a second stave. Though not shown, joining structures, such as tongue and groove, or other structures can be used at the top edge 471 and the bottom edge 472 to join a stave to a longitudinally adjacent stave.

In aspects of the invention, first longitudinal side can include a positive snap lock connection 491 for mating engagement with second longitudinal side 492. Positive snap lock connections or snap lock connections are generally described in U.S. Pat. No. 7,131,242, incorporated herein by reference in its entirety. The entire length of tongue 493 can incorporate a positive snap lock or portions of tongue 493 can include a positive snap lock. Tongue 493 can include snap rivets. It will be appreciated that where tongue 493 includes a snap locking structure, an appropriate receiving structure is provided on the second longitudinal side having groove 494.

Figure 9:
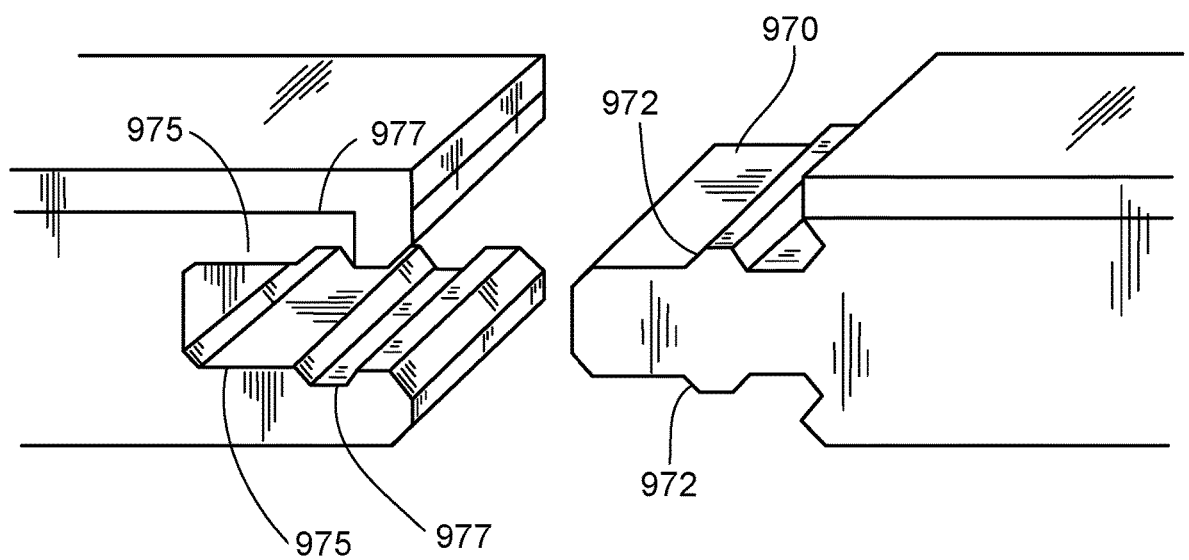
FIG. 9 illustrates a positive snap lock between two staves of the present invention.

FIG. 9 illustrates an exemplary positive snap lock system, wherein male portion 970 includes collar 972. Male portion 970 mechanically engages with receiving portion 975 with include recessed collar mount 977. In use, male portion 970 is inserted into receiving portion 975 such that collar portion 972 engages recessed collar mount 977, there by allowing insertion of the male portion 970 but preventing its release or withdrawal.

Positive snap locking joints between staved portions of the offset staved pipe can be used to mechanically lock two staved portions together. The positive snap lock joints can be used alone or in combination with a resin or adhesive. In an aspect, a flexible resin is used in combination with the positive snap lock joint.

FIG. 10 illustrates a cold water pipe 451 having an offset stave construction comprising multiple alternating first staves 465 and second staves 467 and further comprising a spirally wound ribbon 497 covering at least a portion of the outer surface of cold water pipe 451. In aspects the ribbon is continuous from the bottom portion 454 of cold water pipe 451 to the top portion 452 of the cold water pipe 451. In other aspects the ribbon 497 is provided only in those portions of pipe 451 that experience vortex shedding due to movement of water past the cold water pipe 451. Ribbon 497 provides radial and longitudinal support to cold water pipe 451. Ribbon 497 also prevents vibration along the cold water pipe and reduces vortex shedding due to ocean current action.

Ribbon 497 can be the same thickness and width as an individual stave of cold water pipe 451 or can be two, three, four or more time the thickness and up to 10 times (e.g., 2, 3, 4, 5, 6, 7 8, 9 or 10 times) the width of an individual stave.

Ribbon 497 can be mounted on the outside surface of the cold water pipe so as to lay substantially flat along the outside surface. In an embodiment, ribbon 497 can protrude outwardly from the outside surface of cold water pipe 451 so as to form a spirally wound strake. In aspects of the invention, a fin, blade or foil can be attached to various portions of ribbon or strake 497. Such fins can form a helix wounding around a portion of the cold water pipe or winding the entire length of the cold water pipe. Fins can be angled and provide about the strake in any number to prevent vortex conditions caused by the cold water pipe. In some aspects the fins can protrude from the pipe surface a distance of between $1/32$ and $1/3$ of the pipe diameter (e/g, about $1/32$ of the pipe diameter, about $1/16^{th}$ the pipe diameter, about $1/8^{th}$ the pipe diameter, about $1/7^{th}$ the pipe diameter, about $1/6^{th}$ the pipe diameter, about $1/5^{th}$ the pipe diameter, about $1/4$ the pipe diameter, and about $1/3^{rd}$ the pipe diameter).

Ribbon 497 can be of any suitable material compatible with the material of the multiple staves forming cold water pipe 451, including: polyvinyl chloride (PVC), chlorinated polyvinyl chloride (CPVC), fiber reinforced plastic (FRP), reinforced polymer mortar (RPMP), polypropylene (PP), polyethylene (PE), cross-linked high-density polyethylene (PEX), polybutylene (PB), acrylonitrile butadiene styrene (ABS); polyurethane, polyester, fiber reinforced polyester, vinyl ester, reinforced vinyl ester, concrete, ceramic, or a composite of one or more thereof. Ribbon 497 can be molded, extruded, or pulltruded using standard manufacturing techniques. In one aspect, ribbon 497 is pulltruded to the desired shape and form and comprises a fiber or nylon reinforced vinyl ester similar to that used with the staves of cold water pipe 451. Ribbon 497 can be joined to cold water pipe 451 using a suitable adhesive or resin including the resins of any of the materials above.

In some aspects, ribbon 497 is not continuous along the length of cold water pipe 451. In some aspects, ribbon 497 is not continuous about the circumference of cold water pipe 451. In some aspects, ribbon 497 comprises vertical strips adhered to the outside surface of the cold water pipe 451. In some aspects, where radial or other structural support is required, ribbon 497 can be a circumferential support member around the outside surface of the cold water pipe.

Ribbon 497 can be adhesively bonded or adhered to the outside surface of the cold water pipe, using a suitable flexible adhesive. In an aspect, ribbon 497 can be mechanically coupled to the outside surface of cold water pipe 451 using multiple positive snap locks.

Figure 11:
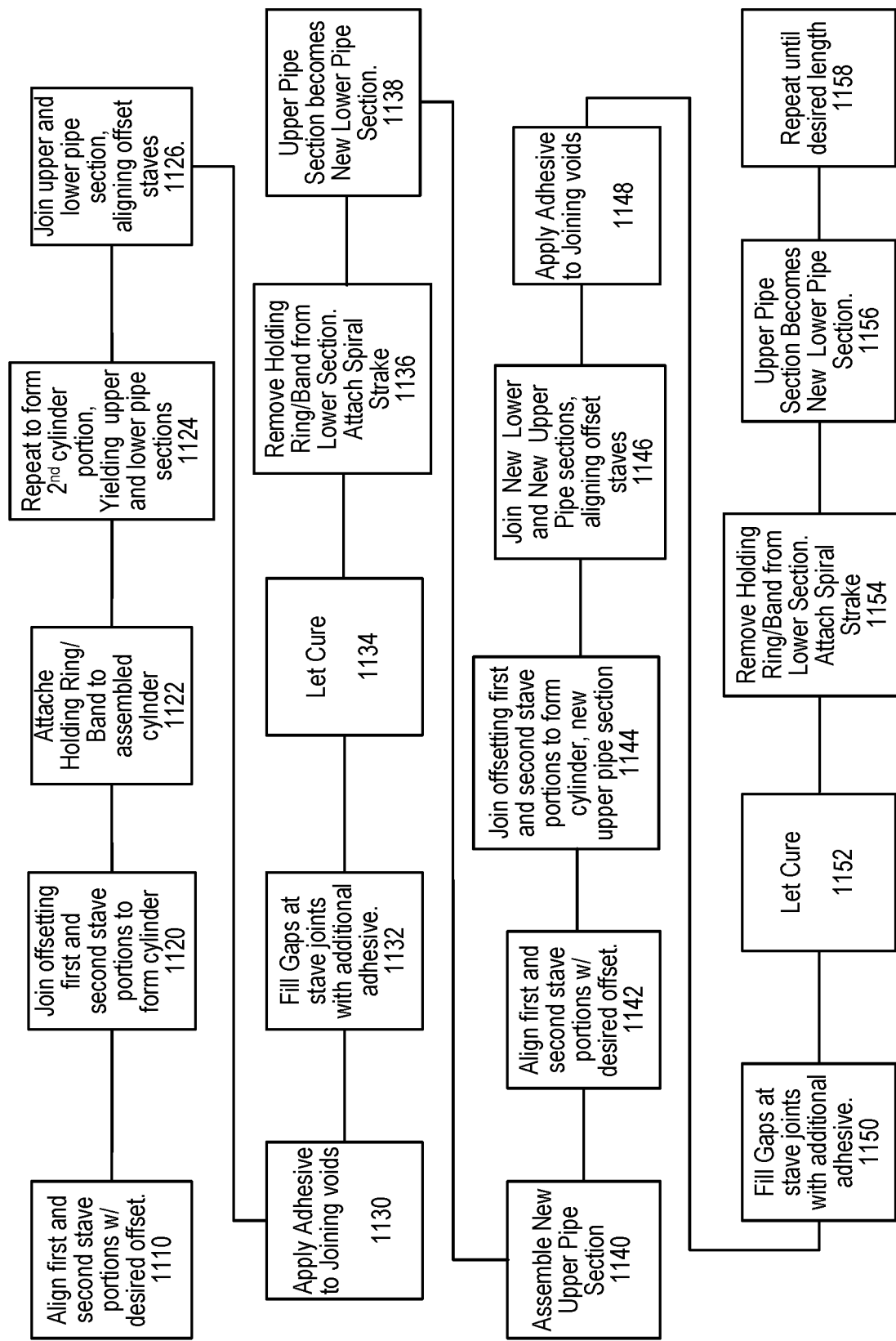
FIG. 11 illustrates a method of cold water pipe construction of the present invention.

With regard to FIG. 11, an exemplary method of assembling a cold water pipe provides for the efficient transport and assembly of the cold water pipe 451. Vertical cylindrical pipe sections are assembled by aligning 1110 alternating first and second stave portions to have the desired offset as described above. The first and second stave portions are then joined 1120 to form a cylindrical pipe section. The offset first and second staves can be joined using any of a variety of joining methods. In an aspect the multiple offset first and second stave portions are joined using a tongue and groove arrangement and a flexible adhesive. In an aspect the multiple first and second staved portions are joined using a mechanical positive snap lock. A combination of tongue and groove, snap lock mechanisms, and flexible adhesives can be used.

After joining 1120 the multiple first and second stave portions to form a cylindrical pipe section having offset first and second stave portions, a retaining band, inflatable sleeve or other jig can be attached 1122 to the cylindrical pipe section to provide support and stability to the pipe section. The steps of aligning 1110 and joining 1120 multiple offset first and second stave portions can be repeated 1124 to form any number of prefabricated cylindrical pipe sections. It will be appreciated that the cylindrical pipe section can be prefabricated at the OTEC plant facility or remotely and then transported to the OTEC plant facility for additional construction to form the fully assembled cold water pipe 451.

Having assembled at least two cylindrical pipe sections having offset staves, an upper and lower cylindrical pipe sections are joined 1126 and the offset staves of each pipe section are aligned. A flexible adhesive can be applied 1130 to the butt joint of the offset staves of the upper and lower cylindrical pipe sections. The staves of the two pipe sections can be joined using a variety of end butt joints including biscuit joinery. In an aspect, the offset staves of the upper and lower cylindrical pipe portions can be provided with aligning joining voids which in turn can be filled with a flexible adhesive.

Gaps in and joints between pipe sections or between and individual staves can be filled 1132 with additional flexible resin. Once the two pipe sections have been joined and the resin applied where needed the two pipe sections are allowed to cure 1134.

The retaining band is then removed 1136 from the lower pipe section and a spirally wound strake is attached thereto. The spirally wound strake can be attached using adhesive bonding, mechanical bonding, for example positive snap locks, or a combination of the adhesive and mechanical bonding.

In an aspect of the method of assembly, after the spiral strake is attached to the lower pipe section, the entire pipe assembly can be shifted, for example lowered, so that the previous upper pipe portion becomes the new lower pipe portion, 1138. Then a new upper cylindrical pipe section is assembled 1140 in a similar manner as described above. That is, first and second stave portions are aligned 1142 to achieve the desired offset. The first and second stave portions are then joined 1144 to form a new cylindrical pipe section, e.g., new upper pipe section. As previously mentioned, a retaining band, inflatable sleeve or other jig can be used to provide support and stability to the cylindrical pipe section during construction of the cold water pipe 451.

Having assembled new upper pipe section 1144, the offset staves of the new lower pipe section and the new upper pipe section are aligned and drawn together 1146. Adhesive or flexible resin is applied 1148 to the end butt joints as described above, for example in conjunction with biscuit joinery or with aligning joining voids. Any gaps between the new lower pipe section and the new upper pipe section or between any two stave portions can be filled 1150 with additional flexible resin. The entire assembly can then be left to cure 1152. The retaining jig can be removed 1154 as before and the spiral strake can be attached to the new lower portion. And, as before, the entire pipe assembly can be shifted to provide for the next cylindrical pipe section. In this manner, the method can be repeated until the desired pipe length is achieved.

It will be appreciated that joining cylindrical pipe sections having offset staves can be accomplished in a number of manners consistent with the present invention. The method of joining offset staves provides for a continuous pipe without the need for bulky, heavy or interfering joining hardware between the pipe segments. As such a continuous pipe having nearly uniform material properties, including flexibility and rigidity, is provided.

EXAMPLE

A cold water pipe assembly is provided that facilitates on site construction of a continuous, offset staved pipe of approximately 3000 feet. Additionally the staved design accounts for adverse shipping and handling loads traditionally experienced by segmented pipe construction. For example towing and upending of traditionally constructed segmented cold water pipes imposes hazardous loads on the pipe.

Staved construction allows offsite manufacturing of multiple staves of 40 to 50 ft lengths. Each stave is approximately 52 inches wide and 4 to 12 inches thick. The staves can be shipped in stacks or containers to the offshore platform and the cold water pipe can then be constructed on the platform from the multiple staves. This eliminates the need for a separate facility to assemble pipe sections.

The stave portions can be constructed from a nylon reinforced vinyl ester having a modulus of elasticity of between about 66,000 psi and 165,000 psi. The stave portions can have an ultimate strength of between about 15,000 psi and 45,000 psi, with a tensile strength between about 15,000 psi to 45,000 psi. In an aspect, the stave portions can have a modulus of elasticity of 150,000 psi, an ultimate strength of 30,000 psi and a yield strength of 30,000 psi, such that the installed CWP behaves similar to a hose rather than a purely rigid pipe. This is advantageous in storm conditions as the pipe is more flexible and avoids cracking or breaking. In an aspect, the pipe can deflect approximately two diameters from center at the unconnected lower end. Deflection at the unconnected lower end should not be so great as to interfere with the mooring system of the OTEC power plant or any other underwater systems involved in plant operations.

The cold water pipe connects to the bottom portion of the OTEC power plant. More specifically, the cold water pipe connects using a dynamic bearing with the bottom portion of the OTEC spar of FIG. 3. Cold water pipe connections in OTEC applications are described in Section 4.5 of Avery & Wu, "Renewable Energy from the Ocean, a Guide to OTEC," Oxford University Press, 1994, incorporated herein by reference in its entirety.

One of the significant advantages of using the spar buoy as the platform is that doing so results in relatively small rotations between the spar itself and the CWP even in the most severe 100-year storm conditions. In addition the vertical and lateral forces between the spar and the CWP are such that the downward force between the spherical ball and its seat keeps the bearing surfaces in contact at all times. Because this bearing that also acts as the water seal does not come out of contact with its mating spherical seat there is no need to install a mechanism to hold the CWP in place vertically. This helps to simplify the spherical bearing design and also minimizes the pressure losses that would otherwise be caused by any additional CWP pipe restraining structures or hardware. The lateral forces transferred through the spherical bearing are also low enough that they can be adequately accommodated without the need for vertical restraint of the CWP.

Cold water is drawn through the cold water pipe via one or more cold water pumps such and flows via one or more cold water passages or conduits to the condenser portion of a multi-stage OTEC power plant.

Further details of cold water pipe construction and performance are described in U.S. patent application Ser. No. 12/691,655, entitled "Ocean Thermal Energy Conversion Power Plant Cold Water Pipe," filed on Jan. 21, 2010, the entire contents of which are incorporated herein by reference.

Cold Water Pipe Connection

The connection between the cold water pipe 351 and the spar platform 311 presents construction, maintenance and operational challenges. For example, the cold water pipe is a 2000 ft to 4000 ft vertical column suspended in the dynamic ocean environment. The platform or vessel to which the cold water pipe connects is also floating in the dynamic ocean environment. Moreover, the pipe is ideally connected below the waterline, and in some aspects, well below the waterline and close to the bottom of the vessel. Maneuvering the fully assembled pipe into the proper position and a securing the pipe to the vessel or platform is a difficult task.

The cold water pipe connection supports the static weight of the pipe suspended from the platform and accounts for the dynamic forces between the platform and the suspended pipe due to wave action, pipe vibration, and pipe movement.

Figure 12:
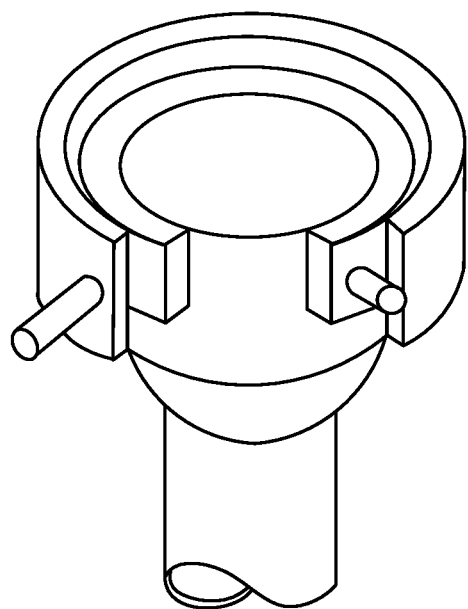
FIG. 12 illustrates a prior-art example of a gimbaled pipe connection.

Various OTEC cold water pipe connections, including gimbal, ball and socket, and universal connections, are disclosed in Section 4.5 of "Renewable Energy from the Ocean, a Guide to OTEC" William Avery and Chih Wu, Oxford University Press, 1994, incorporated herein by reference. Only the gimbal connection was operationally tested and included a two-axis gimbal allowing for 30° of rotation. As described in Avery and Wu, in the plane of the gimbal, a spherical shell formed the top of the pipe. A cylindrical cap with a flat ring of nylon and Teflon provided a sliding seal between the cold water in the pipe and the surrounding platform structure. The gimbaled pipe connection is illustrated in FIG. 12.

Previous cold water pipe connections were designed for traditional hull forms and platforms that exhibit greater vertical displacement due to heave and wave action than spar platforms. One of the significant advantages of using the spar buoy as the platform is that doing so results in relatively small rotations between the spar itself and the CWP even in the most severe 100-year storm conditions. In addition the vertical and lateral forces between the spar and the CWP are such that the downward force between the spherical ball and its seat keeps the bearing surfaces in contact at all times. In aspects, the downward force between the CWP and the connection bearing surface is between 0.4 g and 1.0 g. Because this bearing that also acts as the water seal does not come out of contact with its mating spherical seat there is no need to install a mechanism to hold the CWP in place vertically. This helps to simplify the spherical bearing design and also minimizes the pressure losses that would otherwise be caused by any additional CWP pipe restraining structures or hardware. The lateral forces transferred through the spherical bearing are also low enough that they can be adequately accommodated without the need for vertical restraint of the CWP.

Aspects of the present invention allow for vertical insertion of the cold water pipe upwardly through the bottom of the platform. This is accomplished by lifting the fully assembled cold water pipe into position from below the platform. This facilitates simultaneous construction of the platform and pipe as well as providing for easy installation and removal of the cold water pipe for maintenance.

Referring to FIG. 3, cold water pipe 351 connects to the submerged portion 311 of spar platform 310 at cold water pipe connection 375. In an aspect the cold water pipe connects using a dynamic bearing with the bottom portion of the OTEC spar of FIG. 3.

In an aspect of the present invention a cold water pipe connection is provided comprising a pipe collar seated via a spherical surface to a movable detent. The movable detent is coupled to the base of the spar platform. Incorporating the movable detent allows for vertical insertion and removal of the cold water pipe into and from the cold water pipe receiving bay.

Figure 13:
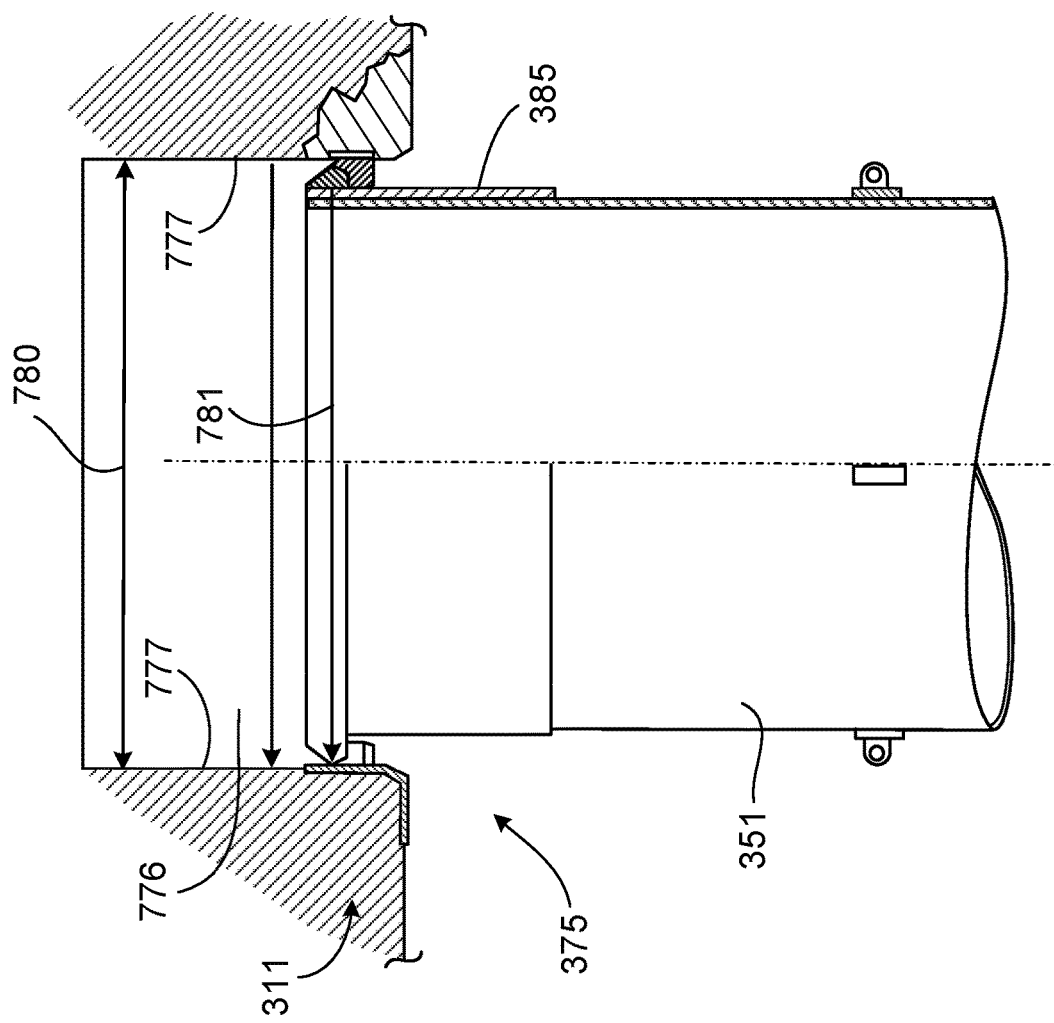
FIG. 13 illustrates a cold water pipe connection of the present invention.

FIG. 13 illustrates an exemplary aspect wherein cold water pipe connection 375 includes pipe receiving bay 776 comprising bay walls 777 and detent housings 778. Receiving bay 776 further comprises receiving diameter 780, which is defined by the length of the diameter between bay walls 777. In aspects, the receiving diameter is larger than the outer collar diameter 781 of cold water pipe 351.

Cold water pipe connection 375 and the lower portion of spar 311 can include structural reinforcement and supports to bear the weight and dynamic forces imposed on and transferred to spar 311 by cold water pipe 351 once suspended.

Figure 14:
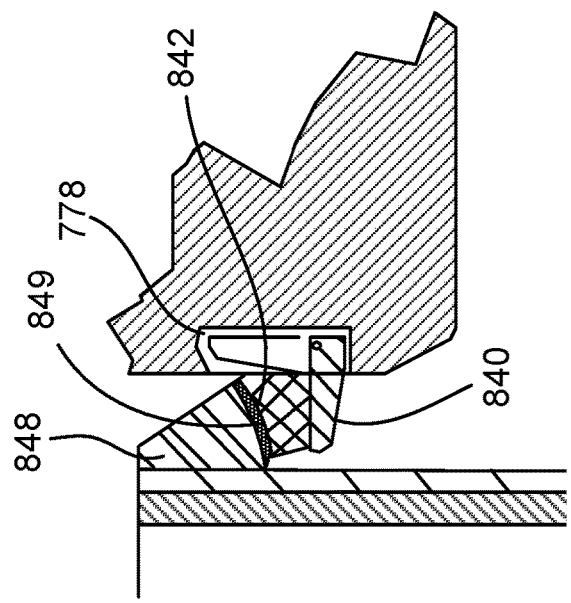
FIG. 14 illustrates a cold water pipe connection of the present invention.

Referring to FIG. 14, cold water pipe connection 375 includes detent housing 778 and movable detent 840, which is mechanically coupled to the detent housing 778 to allow for movement of detent 840 from a first position to a second position. In a first position, movable detent 840 is housed within detent housing 778 such that the detent 840 does not protrude inwardly toward the center of the receiving bay 776 and remains outside of receiving diameter 780. In the first position, the top end portion 385 of cold water pipe 351 can be inserted into the pipe receiving bay 776 without interference from the moveable detent 840. In an alternate aspect, movable detent 840 can be housed in a first position such that no aspect of the movable detent 840 protrudes inwardly toward the center of receiving bay 776 past the outer collar diameter 781. In a further aspect, movable detent 840 in a first position does not interfere with the vertical movement of cold water pipe 351 through receiving bay 776.

In a second position, movable detent 840 extends beyond detent housing 778 and protrudes inwardly toward the center of receiving bay 776. In the second position, movable detent 840 extends inwardly past the outer collar diameter 781. Movable detent 840 can be adjusted or moved from a first position to a second position using hydraulic actuators, pneumatic actuators, mechanical actuators, electrical actuators, electro-mechanical actuators, or a combination of the above.

Movable detent 840 includes a partial spherical or arcuate bearing surface 842. Arcuate bearing surface 842 is configured to provide a dynamic bearing to cold water pipe bearing collar 848 when movable detent 840 is in a second position.

Cold water pipe bearing collar 842 includes collar bearing surface 849. Arcuate bearing surface 842 and collar bearing surface 849 can be cooperatively seated to provide a dynamic bearing to support the suspended weight of cold water pipe 351. Additionally, arcuate bearing surface 842 and collar bearing surface 849 are cooperatively seated to account for relative motion between the cold water pipe 351 and the platform 310 without unseating the cold water pipe 351. Arcuate bearing surface 842 and collar bearing surface 849 are cooperatively seated to provide a dynamic seal so that relatively warm water cannot enter pipe receiving bay 776 and ultimately cold water intake 350 once the cold water pipe 351 is connected to the platform 310 via cold water pipe connection 375. Once cold water pipe 351 is suspended, cold water is drawn through the cold water pipe via one or more cold water pumps and flows via one or more cold water passages or conduits to the condenser portion of a multistage OTEC power plant.

Arcuate bearing surface 842 and collar bearing surface 849 can be treated with a coating such as a Teflon coating to prevent galvanic interaction between the two surfaces.

It will be appreciated that any combination of a dynamic bearing surface and a movable detent or pinion to connect the cold water pipe to the floating platform are contemplated in the claims and the disclosure herein. For example, in aspects, the arcuate bearing surface can be positioned above the movable detent, the arcuate bearing surface can be positioned to the side of the movable detent, or even below the movable detent. In aspects, the movable detent can be integral to the bottom portion of the floating platform as described above. In other aspects the movable detent can be integral to the cold water pipe.

Figure 15:
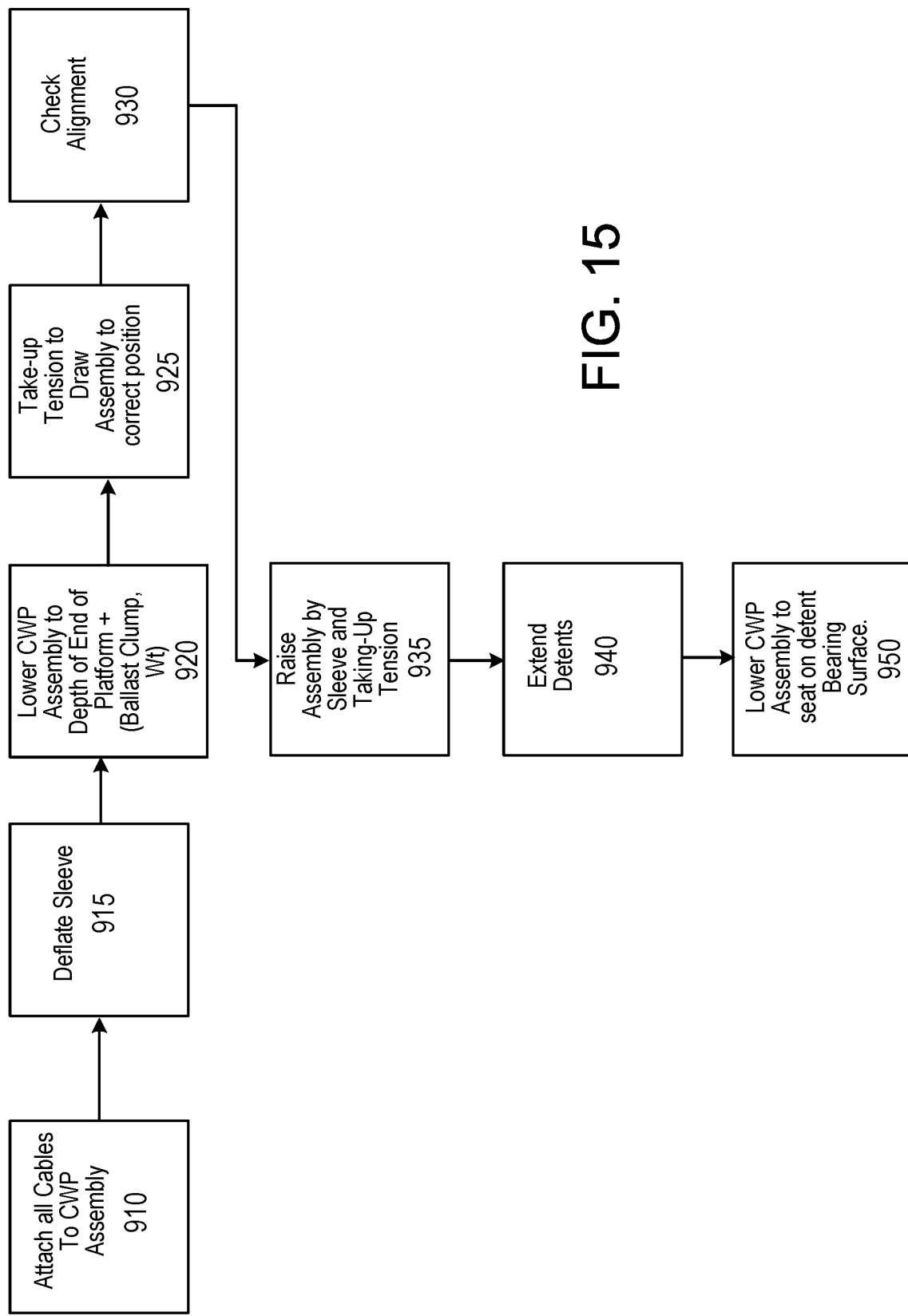
FIG. 15 illustrates a cold water pipe connection method of the present invention.

FIG. 15 illustrates an exemplary method of attaching a cold water pipe to a floating platform, and more specifically an OTEC floating platform. The method includes rigging guide lines and downhauls from the platform to the fully assembled cold water pipe. The cold water pipe is then lowered below the platform and aligned to the proper position. The cold water pipe is then raised into the pipe receiving bay, the movable detents or pinions are extended and the pipe is seated on the arcuate bearing surface.

More specifically, guiding cables are attached 910 to the fully assembled cold water pipe 351. In an exemplary embodiment, the cold water pipe 351 can include one or more inflatable sleeves to provide buoyancy during construction, movement, and upending of the cold water pipe. After the guide wires are attached 910 to the cold water pipe, the one or more inflatable sleeves can be deflated 915 so that the cold water pipe is negatively buoyant. In an embodiment, the cold water pipe can also include a clump weight or other ballast system that can be partially or completely filled with water or other ballast material to provide negative buoyancy to the cold water pipe.

The cold water pipe is then lowered 920 to a position below the cold water pipe connection 375 of the floating OTEC platform 310. Ballast can again be adjusted. The guide wires are adjusted 925 to properly position the cold water pipe below the cold water pipe connection 375 and alignment can be checked and confirmed 930 via video, remote sensors and other means. The cold water pipe assembly is then raised 935 to a position such that the cold water pipe bearing collar 848 is above the movable detents 840 of the cold water pipe connection assembly. Raising the cold water pipe into the cold water pipe connection can be done using the guide wires, inflatable sleeves, detachable balloons or a combination of the same.

After the cold water pipe is raised 935 into the cold water pipe connection, the movable detents are extended 940 to provide a dynamic bearing surface for the cold water pipe. The cold water pipe is then lowered by adjusting the guide wires, deflating the inflatable sleeves or detachable balloons, or by adjusting the clump weight or other ballast system. A combination of the same may also be used.

It will be appreciated that guide wires, inflation lines, ballast lines and the like should remain unobstructed from each other during movement of the cold water pipe. Moreover, the movement of the cold water pipe should not interfere with the mooring system of the OTEC platform.

Figure 16:
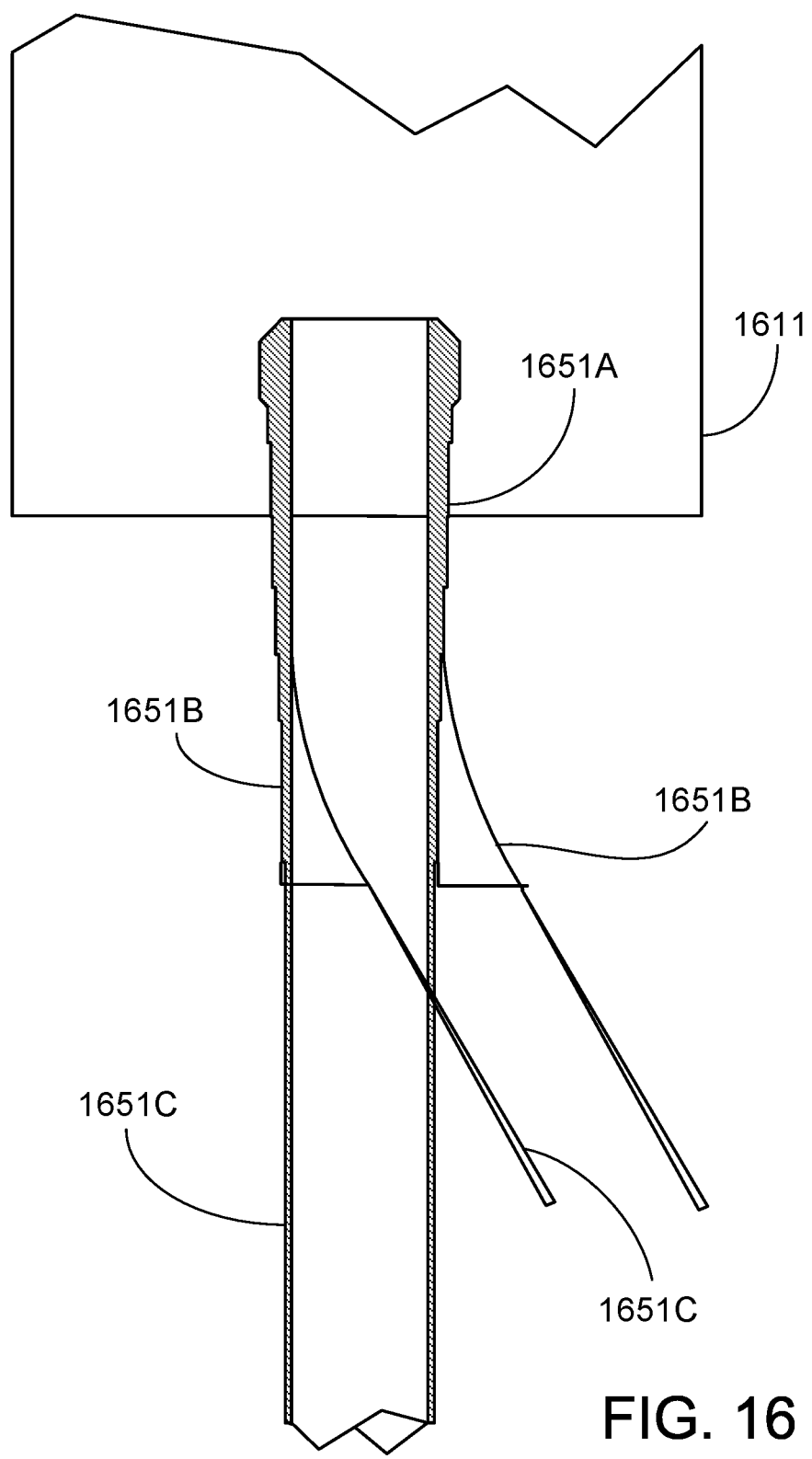
FIG. 16 illustrates a cold water pipe connection with a flexible cold water pipe of the present invention.

In a further aspect of the invention, a static connection can be made between the cold water pipe and the spar structure. In such aspects, the dynamic forces between the pipe and spar can be accounted for by varying the flexibility of the pipe near the top portion of the pipe. By allowing for movement of the lower and middle portions of the cold water pipe, the need for a dynamic pipe connection is reduced or avoided entirely. Avoiding the need for a gimbaled connection removes costly moving parts and simplifies fabrication of both the lower spar portion and the cold water pipe Referring to FIG. 16, cold water pipe 1651 is connected to the lower portion of spar 1611 without the use of the above described dynamic bearings. FIG. 16 illustrates the cold water pipe connected to the lower portion of the spar structure in both the displaced and non-displaced configurations. The upper portions of the cold water pipe 1651—that is those portion at and adjacently below the point of connection and the lower portion of spar 1611—are stiffened to provide a relatively inflexible top portion 1651A of the cold water pipe. Below the inflexible top portion 1651A, relatively flexible middle portion 1651B is provided. Below the flexible middle portion 1651B is a moderately flexible lower portion 1651C, which can comprise the largest portion of the cold water pipe assembly. A clump weight or ballast system can be secured to the bottom or any other part of the moderately flexible lower portion 1651C.

As illustrated, the flexible middle portion 1651B allows for deflection of the lower portions of the cold water pipe away from the line of suspension of the cold water pipe. The amount of deflection can be between 0.25 degrees and 30 degrees, depending on the length and diameter of the cold water pipe suspended from the spar 1011.

Figure 17:
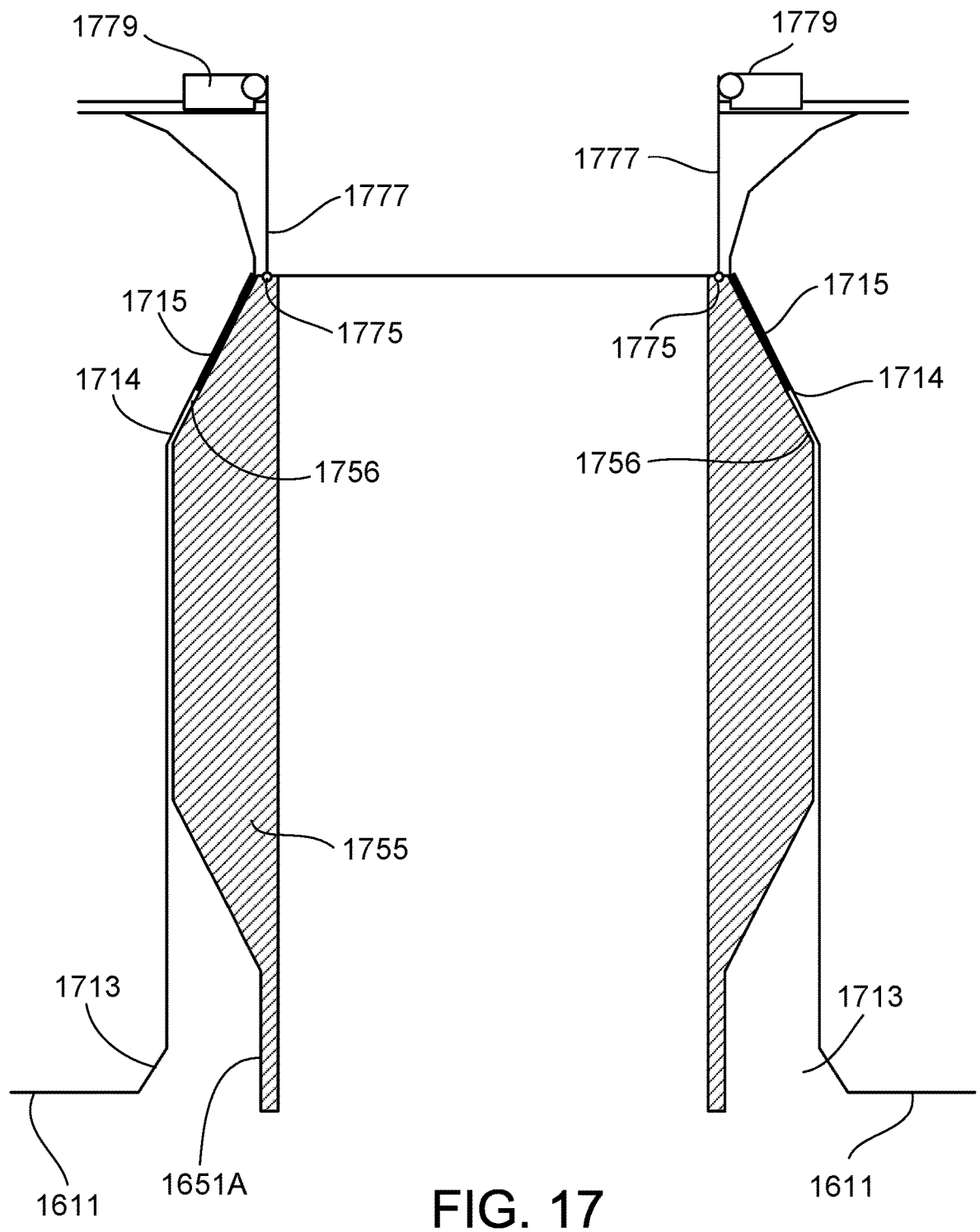
FIG. 17 illustrates a cold water pipe connection of the present invention.

Referring to FIG. 17, the static cold water pipe—spar connection is detailed. The lower portion of spar 1611 includes receiving bay 1713 for receiving top portion 1651A of cold water pipe 1651. Receiving bay 1713 include tapered portion 1714 and contact pads 1715. Upper portion 1651A of cold water pipe 1651 includes collar 1755 with tapered collar surface 1756 and lifting lugs 1775. Cold water pipe 1651 is connected to spar 1611 by lifting and retention cables 1777, which are secured to the cold water pipe at lifting lugs 1775. Cables 1777 are attached to mechanical winches 1779 housed in the lower portion of Spar 1611.

In an exemplary method of connecting the cold water pipe to the spar platform, the fully fabricated cold water pipe is lowered to a point just below the spar platform. Lifting and retention cables 1777 are connected to lifting lugs 1775 by remotely operated vehicles. Tension is taken up in the cables using the aforementioned mechanical winches housed in the lower portion of spar 1611. As the upper portion 1651A of cold water pipe 1651 enters receiving bay 1713, it is guided into proper position by tapered portion 1714 until a secure connection is made between tapered collar surface 1756 and contact pads 1715. Upon proper placement and secure connection of the cold water pipe in the receiving bay, the cables 1777 are mechanically locked to prevent downward movement of the cold water pipe 1651. Because water is flowing on the inside of the cold water pipe and surround the outside of the pipe, a pressure seal is not necessary at the interface between the cold water pipe and the spar structure. In some implementations the seal between the cold water pipe and the spar structure minimizes water passage across the seal. The upward force exerted on the connecting pad can be imparted by the lifting cables, the buoyancy of the cold water pipe, or a combination of both.

It will be appreciated that the number of lifting cables 1777 and corresponding lifting lugs 1775 is dependent on the size, weight and buoyancy of the cold water pipe 1651. In some aspects, cold water pipe 1651 can be positively, neutrally, or negatively buoyant. The number of lifting cables 1777 and corresponding lifting lugs 1775 is also dependent on any ballasting associated with the cold water pipe as well as the weight and buoyancy of the clump weight attached to the cold water pipe. In aspects of the invention, 2, 3, 4, 5, 6, or more lifting and retention cables can be used.

G33

In additional aspects of the invention, the lifting lugs 1775 can comprise pad eyes bolted directly to the top of the cold water pipe using known fastening and connecting techniques. For example, barrel sockets, hex socket, coddler pins and the like can be incorporated into the staved top portion of the cold water pipe.

Figure 18:
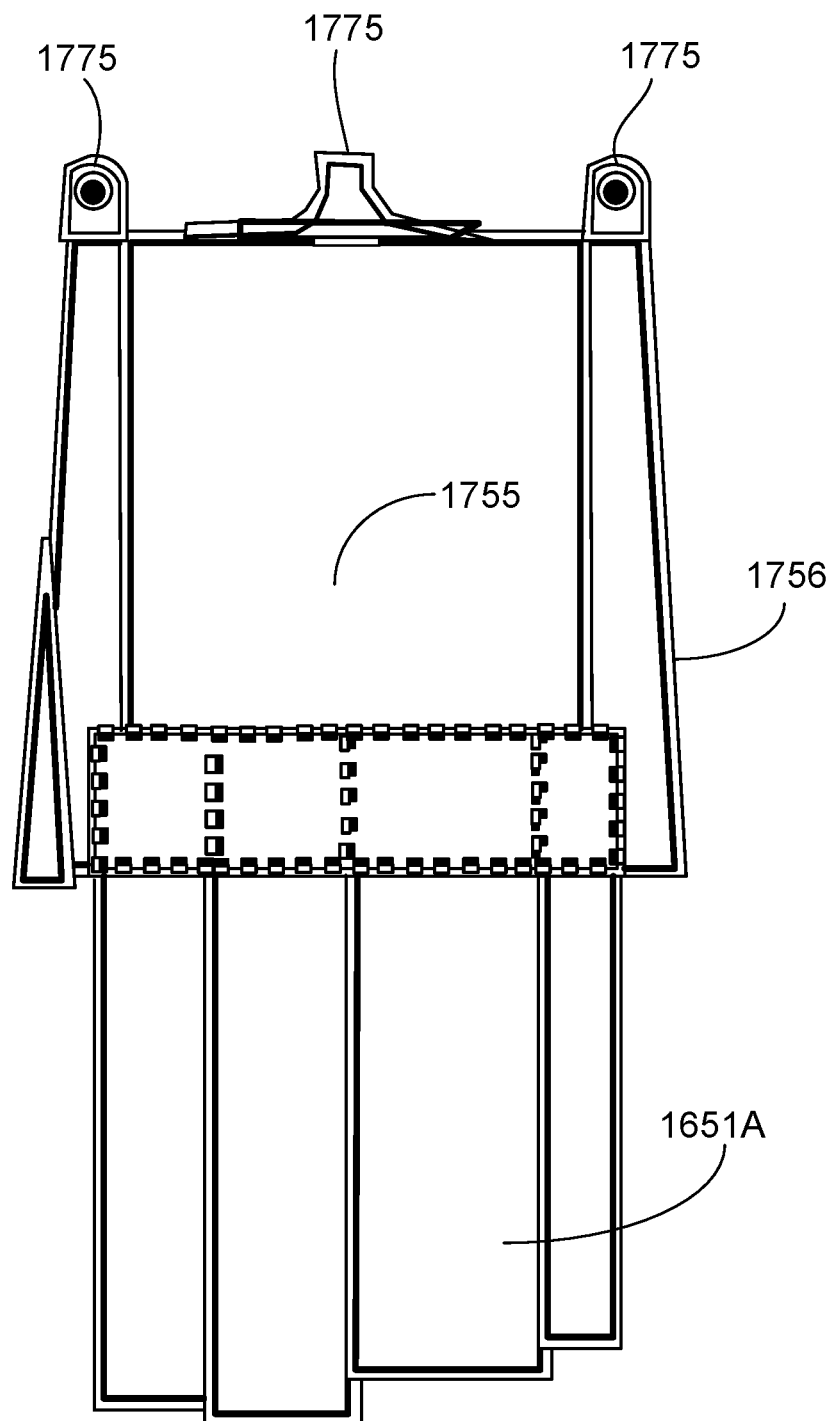
FIG. 18 illustrates a cold water pipe with a lifting collar of the present invention.
Figure 19:
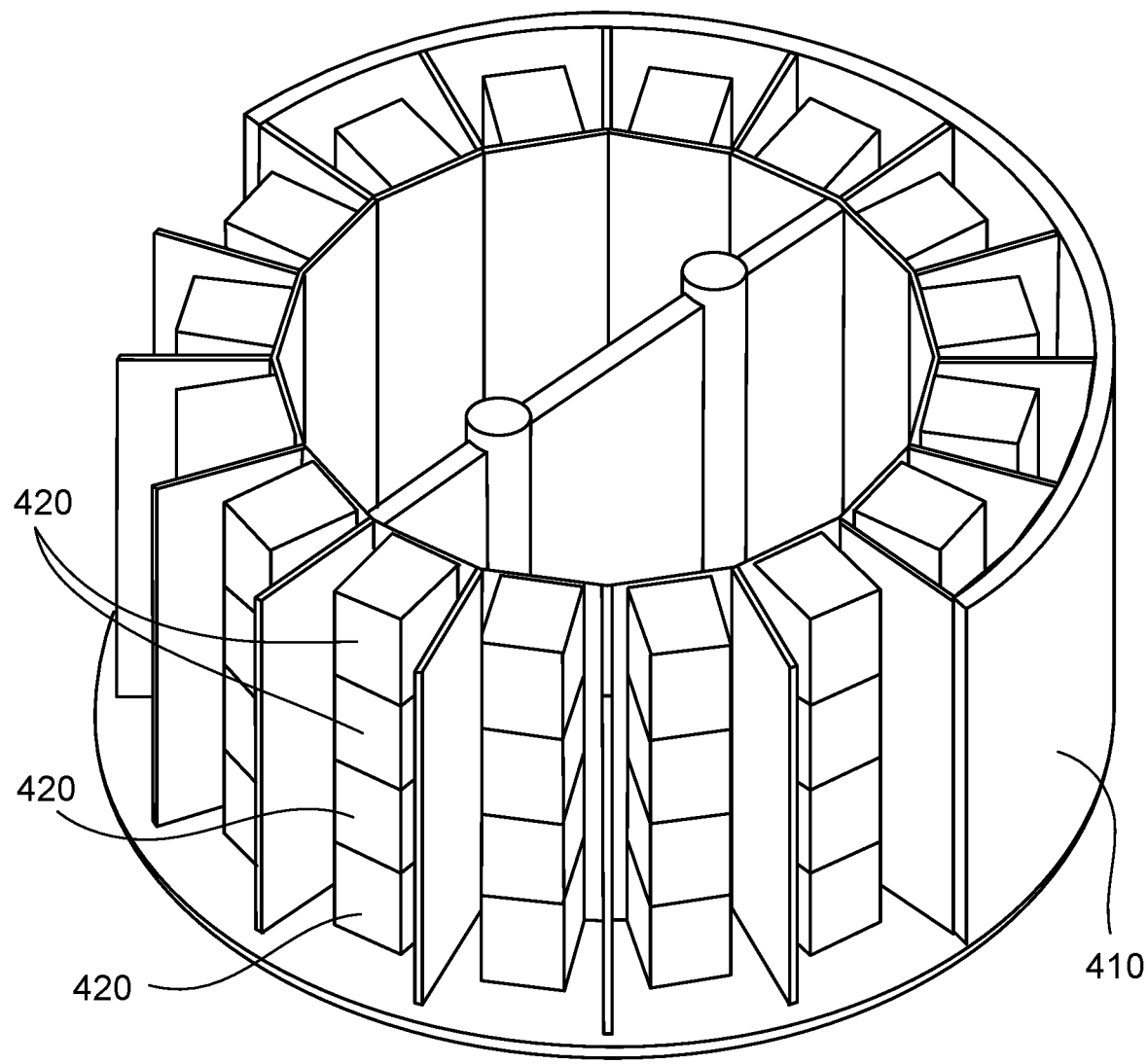
FIG. 19 illustrates a cut-away perspective view of an aspect of the present invention.
Figure 20:
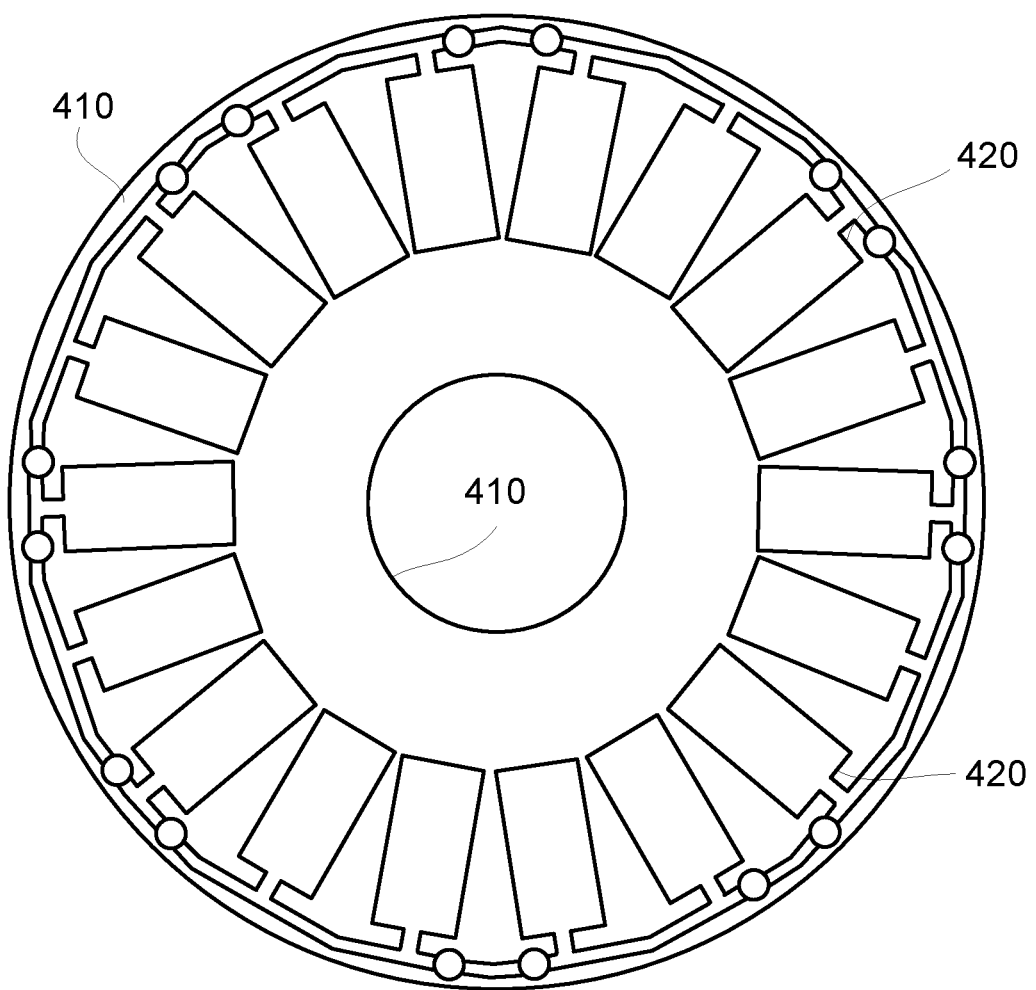
FIG. 20 illustrates a deck plan of a heat exchanger deck of the present invention.

In other aspects, a lifting collar can be installed to the top portion of the cold water pipe, the lifting collar comprising collar connecting surface 1756 and lifting lugs 1755. The lifting collar can be the same or different material as the cold water pipe. The lifting collar, when attached to the cold water pipe can increase the rigidity of the cold water pipe more than the rigidity associated with the upper portion 1651A. FIG. 18 is an illustration of a lifting collar 1775 mounted to a staved cold water pipe 1651. The lifting collar can be mechanically, chemically, or thermally bonded to the upper portion 1651A of the cold water pipe. For example, the same bonding resin to connect individual stave members of the cold water pipe can be used to connect the lifting collar to the cold water pipe.

Heat Exchange System

FIGS. 3, 3A and 19 and 20 illustrate an implementation of the present invention wherein a plurality of multi-stage heat exchangers 420 are arranged about the periphery of OTEC spar 410. Heat exchangers 420 can be evaporators or condensers used in an OTEC heat engine. The peripheral layout of heat exchanges can be utilized with evaporator portion 344 or condenser portion 348 of an OTEC spar platform. The peripheral arrangement can support any number of heat exchangers (e.g., 1 heat exchanger, between 2 and 8 heat exchangers, 8-16 heat exchanger, 16-32 heat exchangers, or 32 or more heat exchangers). One or more heat exchangers can be peripherally arranged on a single deck or on multiple decks (e.g., on 2, 3, 4, 5, or 6 or more decks) of the OTEC spar 410. One or more heat exchangers can be peripherally offset between two or more decks such that no two heat exchangers are vertically aligned over one another. One or more heat exchangers can be peripherally arranged so that heat exchangers in one deck are vertically aligned with heat exchanges on another adjacent deck.

Individual heat exchangers 420 can comprise a multi-stage heat exchange system (e.g., a 2, 3, 4, 5, or 6 or more heat exchange system). In an embodiment, individual heat exchangers 420 can be a cabinet heat exchanger constructed to provide minimal pressure loss in the warm sea water flow, cold sea water flow, and working fluid flow through the heat exchanger.

Figure 21:
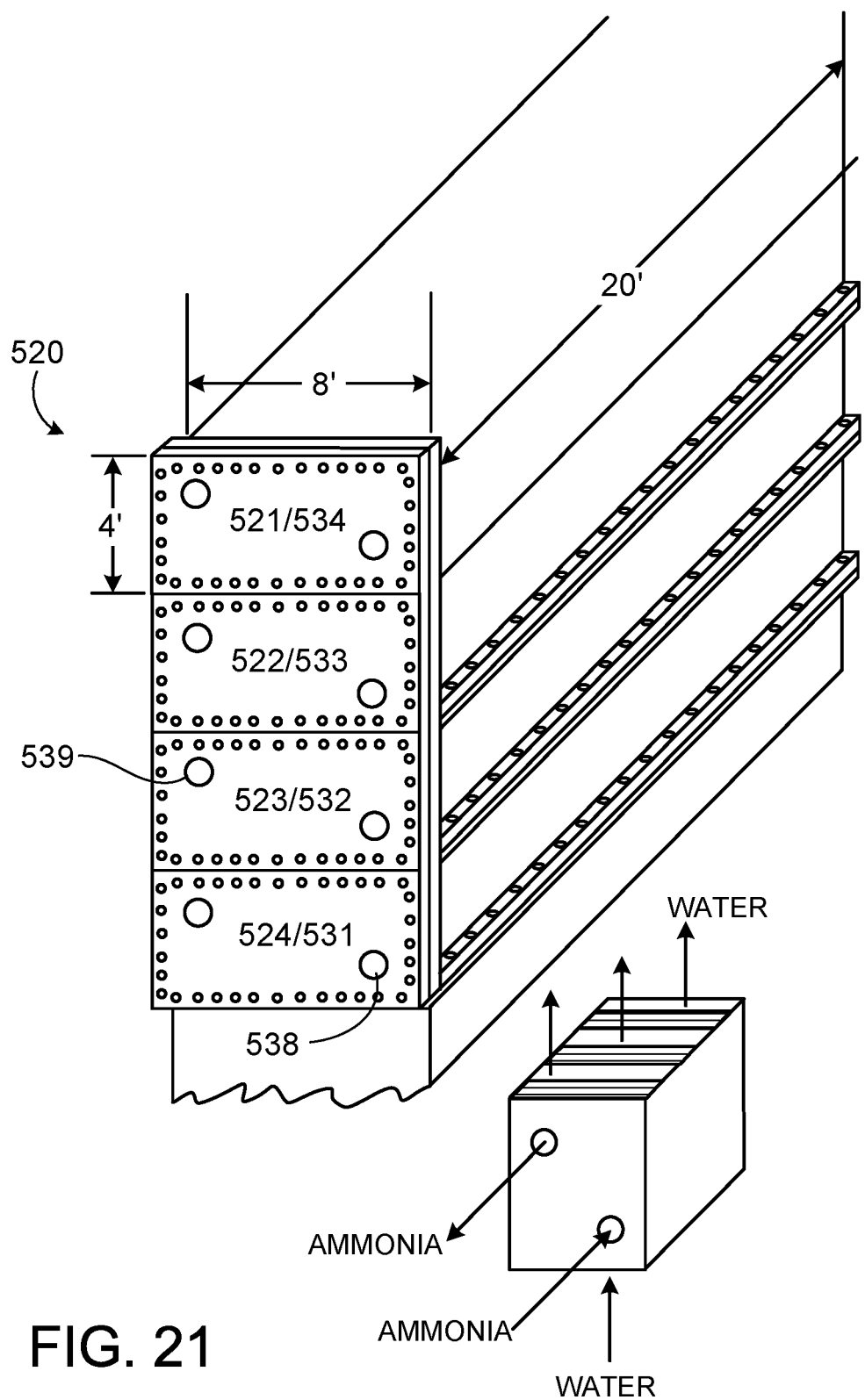
FIG. 21 illustrates a cabinet heat exchanger of the present invention.

Referring to FIG. 21 an embodiment of a cabinet heat exchanger 520 includes multiple heat exchange stages, 521, 522, 523 and 524. In an implementation the stacked heat exchangers accommodate warm sea water flowing down through the cabinet, from first evaporator stage 521, to second evaporator stage 522, to third evaporator stage 523 to fourth evaporator stage 524. In another embodiment of the stacked heat exchange cabinet, cold sea water flows up through the cabinet from first condenser stage 531, to second condenser stage 532, to third condenser stage 533, to fourth condenser stage 534. Working fluid flows through working fluid supply conduits 538 and working fluid discharge conduits 539. In an embodiment, working fluid conduits 538 and 539 enter and exit each heat exchanger stage horizontally as compared to the vertical flow of the warm sea water or cold sea water. The vertical multi-stage heat exchange design of cabinet heat exchanger 520 facilitates an integrated vessel (e.g., spar) and heat exchanger design, removes the requirement for interconnecting piping between heat exchanger stages, and ensures that virtually all of the heat exchanger system pressure drop occurs over the heat transfer surface.

In an aspect, the heat transfer surface can be optimized using surface shape, treatment and spacing. Material selection such as alloys of aluminum offer superior economic performance over traditional titanium base designs. The heat transfer surface can comprise 1000 Series, 3000 Series or 5000 Series Aluminum alloys. The heat transfer surface can comprise titanium and titanium alloys.

It has been found that the multi-stage heat exchanger cabinet enables the maximum energy transfer to the working fluid from the sea water within the relatively low available temperature differential of the OTEC heat engine. The thermodynamic efficiency of any OTEC power plant is a function of how close the temperature of the working fluid approaches that of the sea water. The physics of the heat transfer dictate that the area required to transfer the energy increases as the temperature of the working fluid approaches that of the sea water. To offset the increase in surface area, increasing the velocity of the sea water can increase the heat transfer coefficient. But this greatly increases the power required for pumping, thereby increasing the parasitic electrical load on the OTEC plant.

Figure 22A:
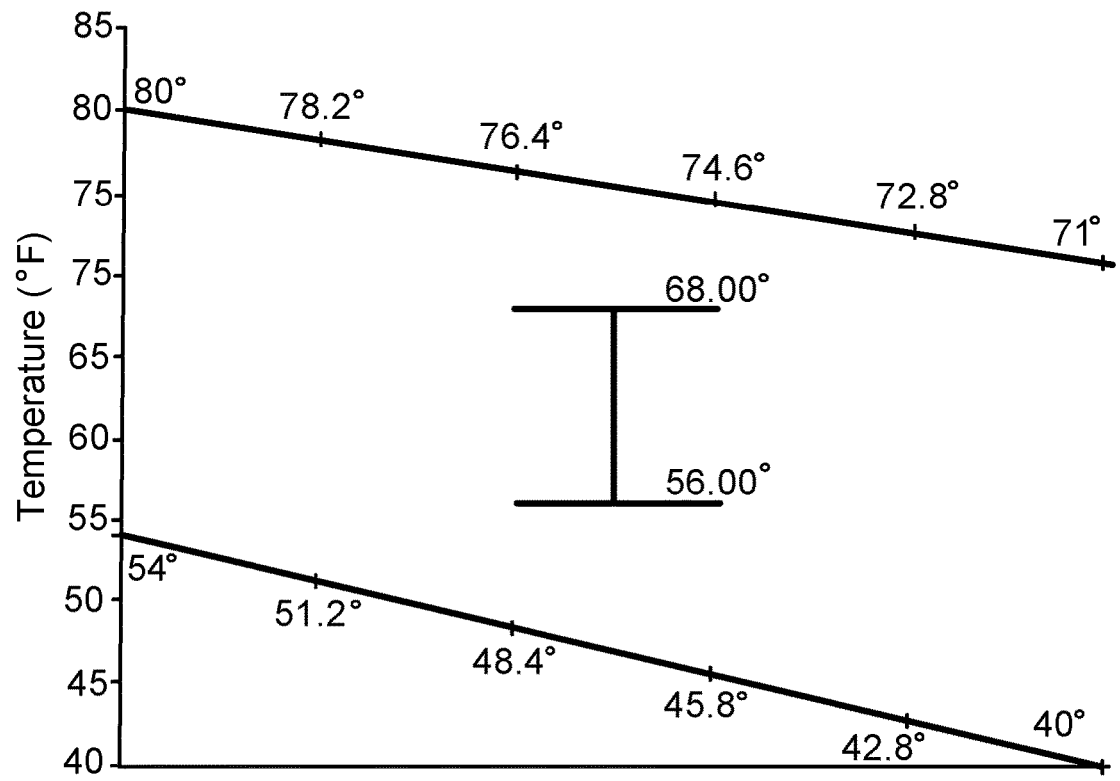
FIG. 22A illustrates a conventional heat exchange cycle.

Referring to FIG. 22A, a conventional OTEC cycle wherein the working fluid is boiled in a heat exchanger using warm surface sea water. The fluid properties in this conventional Rankine cycle are constrained by the boiling process that limits the leaving working fluid to approximately 3° F. below the leaving warm seawater temperature. In a similar fashion, the condensing side of the cycle is limited to being no close than 2° F. higher than the leaving cold seawater temperature. The total available temperature drop for the working fluid is approximately 12° F. (between 68° F. and 56° F.).

It has been found that a cascading multi-stage OTEC cycle allows the working fluid temperatures to more closely match that of the sea water. This increase in temperature differential increases the amount of work that can be done by the turbines associated with the OTEC heat engine.

Figure 22B:
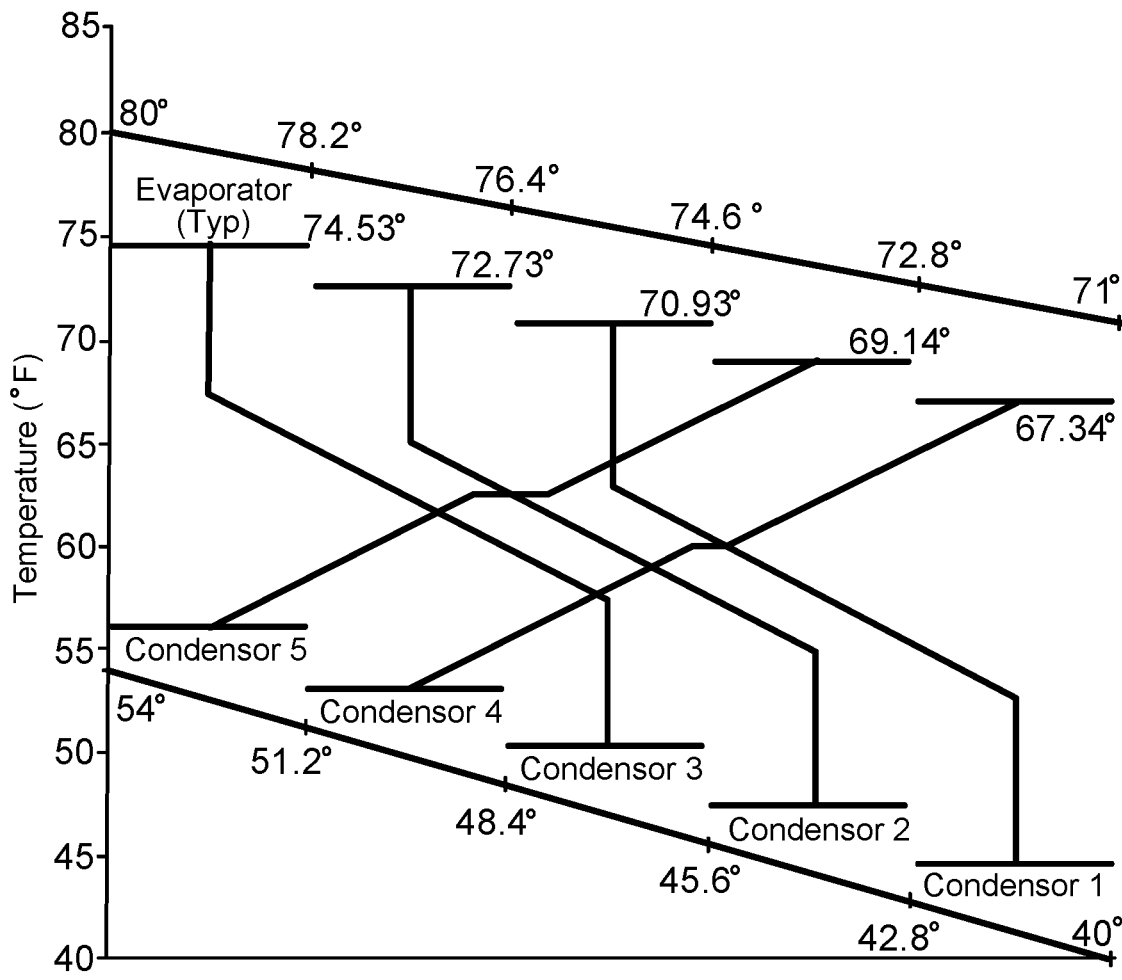
FIG. 22B illustrates a cascading multi-stage heat exchange cycle.

Referring to FIG. 22B, an aspect of a cascading multi-stage OTEC cycle uses multiple steps of boiling and condensing to expand the available working fluid temperature drop. Each step requires an independent heat exchanger, or a dedicated heat exchanger stage in the cabinet heat exchanger 520 of FIG. 5. The cascading multi-stage OTEC cycle of FIG. 6b allows for matching the output of the turbines with the expected pumping loads for the sea water and working fluid. This highly optimized design would require dedicated and customized turbines.

Figure 22C:
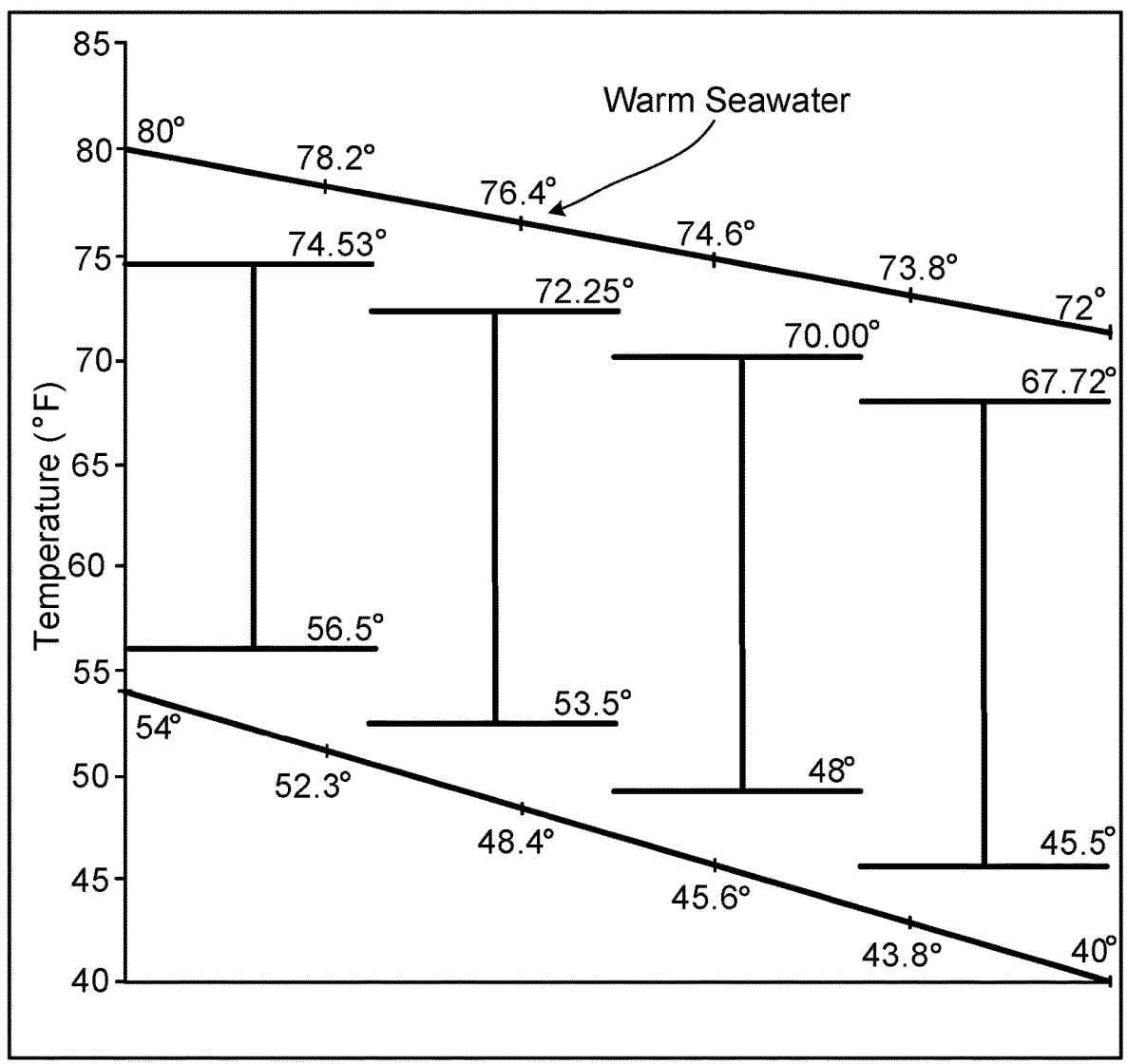
FIG. 22C illustrates a hybrid cascading multi-stage heat exchange cycle.

Referring to FIG. 22C, a hybrid yet still optimized cascading OTEC cycle is shown that facilitates the use of identical equipment (e.g., turbines, generators, pumps) while retaining the thermodynamic efficiencies or optimization of the true cascade arrangement of FIG. 22B. In the hybrid cascade cycle of FIG. 22C, the available temperature differential for the working fluid ranges from about 18° F. to about 22° F. This narrow range allows the turbines in the heat engine to have identical performance specifications, thereby lowering construction and operation costs.

System performance and power output is greatly increased using the hybrid cascade cycle in an OTEC power plant. Table A compares the performance of the conventional cycle of FIG. 22A with that of the hybrid cascading cycle of FIG. 22C.

TABLE A

Estimated Performance for 100 MW Net Output

|  | Conventional Cycle | Four Stage Hybrid Cascade Cycle |
|---|---|---|
| Warm Sea Water Flow | 4,800,000 GPM | 3,800,000 GPM |
| Cold Sea Water Flow | 3,520,000 GPM | 2,280,000 GPM |
| Gross Heat Rate | 163,000 BTU/kWH | 110,500 BTU/kWH |

Utilizing the four stage hybrid cascade heat exchange cycle reduces the amount of energy that needs to be transferred between the fluids. This in turn serves to reduce the amount of heat exchange surface that is required.

The performance of heat exchangers is affected by the available temperature difference between the fluids as well as the heat transfer coefficient at the surfaces of the heat exchanger. The heat transfer coefficient generally varies with the velocity of the fluid across the heat transfer surfaces. Higher fluid velocities require higher pumping power, thereby reducing the net efficiency of the plant. A hybrid cascading multi-stage heat exchange system facilitates lower fluid velocities and greater plant efficiencies. The stacked hybrid cascade heat exchange design also facilitates lower pressure drops through the heat exchanger. And the vertical plant design facilitates lower pressure drop across the whole system.

Figure 22D:
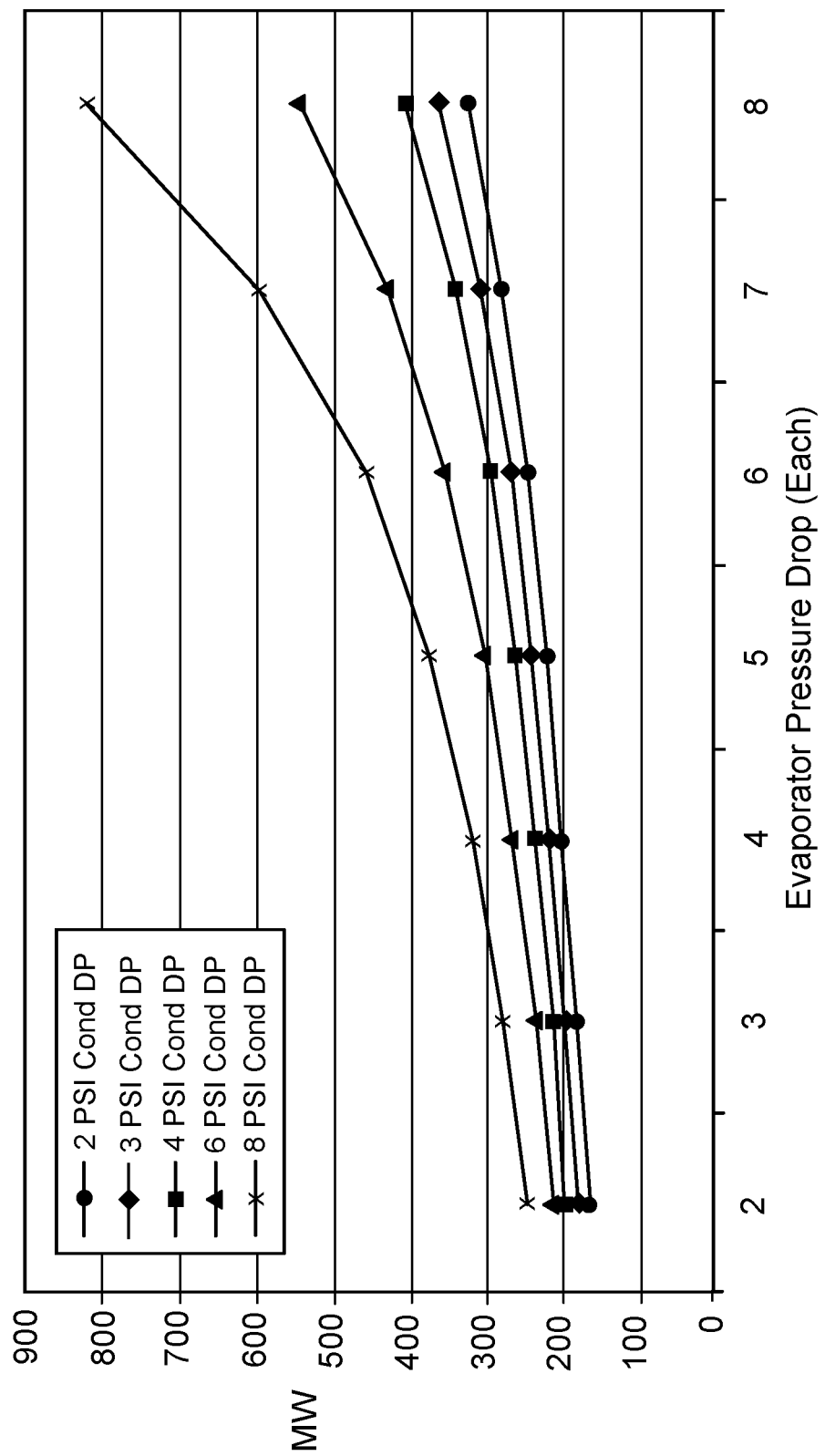
FIG. 22D illustrates the evaporator pressure drop and associate power production.

FIG. 22D illustrates the impact of heat exchanger pressure drop on the total OTEC plant generation to deliver 100 MW to a power grid. Minimizing pressure drop through the heat exchanger greatly enhances the OTEC power plant's performance. Pressure drop is reduced by providing an integrated vessel or platform—heat exchanger system, wherein the sea water conduits form structural members of the vessel and allow for sea water flow from one heat exchanger stage to another in series. An approximate straight line sea water flow, with minimal changes in direction from intake into the vessel, through the pump, through the heat exchange cabinets and in turn through each heat exchange stage in series, and ultimately discharging from the plant, allows for minimal pressure drop.

EXAMPLE

Aspects of the present invention provide an integrated multi-stage OTEC power plant that will produce electricity using the temperature differential between the surface water and deep ocean water in tropical and subtropical regions. Aspects eliminate traditional piping runs for sea water by using the off-shore vessel's or platform's structure as a conduit or flow passage. Alternatively, the warm and cold sea water piping runs can use conduits or pipes of sufficient size and strength to provide vertical or other structural support to the vessel or platform. These integral sea water conduit sections or passages serve as structural members of the vessel, thereby reducing the requirements for additional steel. As part of the integral sea water passages, multi-stage cabinet heat exchangers provide multiple stages of working fluid evaporation without the need for external water nozzles or piping connections. The integrated multi-stage OTEC power plant allows the warm and cold sea water to flow in their natural directions. The warm sea water flows downward through the vessel as it is cooled before being discharged into a cooler zone of the ocean. In a similar fashion, the cold sea water from deep in the ocean flows upward through the vessel as it is warmed before discharging into a warmer zone of the ocean. This arrangement avoids the need for changes in sea water flow direction and associated pressure losses. The arrangement also reduces the pumping energy required.

Multi-stage cabinet heat exchangers allow for the use of a hybrid cascade OTEC cycle. These stacks of heat exchangers comprise multiple heat exchanger stages or sections that have sea water passing through them in series to boil or condense the working fluid as appropriate. In the evaporator section the warm sea water passes through the first stage where it boils off some of the working fluid as the sea water is cooled. The warm sea water then flows down the stack into the next heat exchanger stage and boils off additional working fluid at a slightly lower pressure and temperature. This occurs sequentially through the entire stack. Each stage or section of the cabinet heat exchanger supplies working fluid vapor to a dedicated turbine that generates electrical power. Each of the evaporator stages has a corresponding condenser stage at the exhaust of the turbine. The cold sea water passes through the condenser stacks in a reverse order to the evaporators.

Figure 23B:
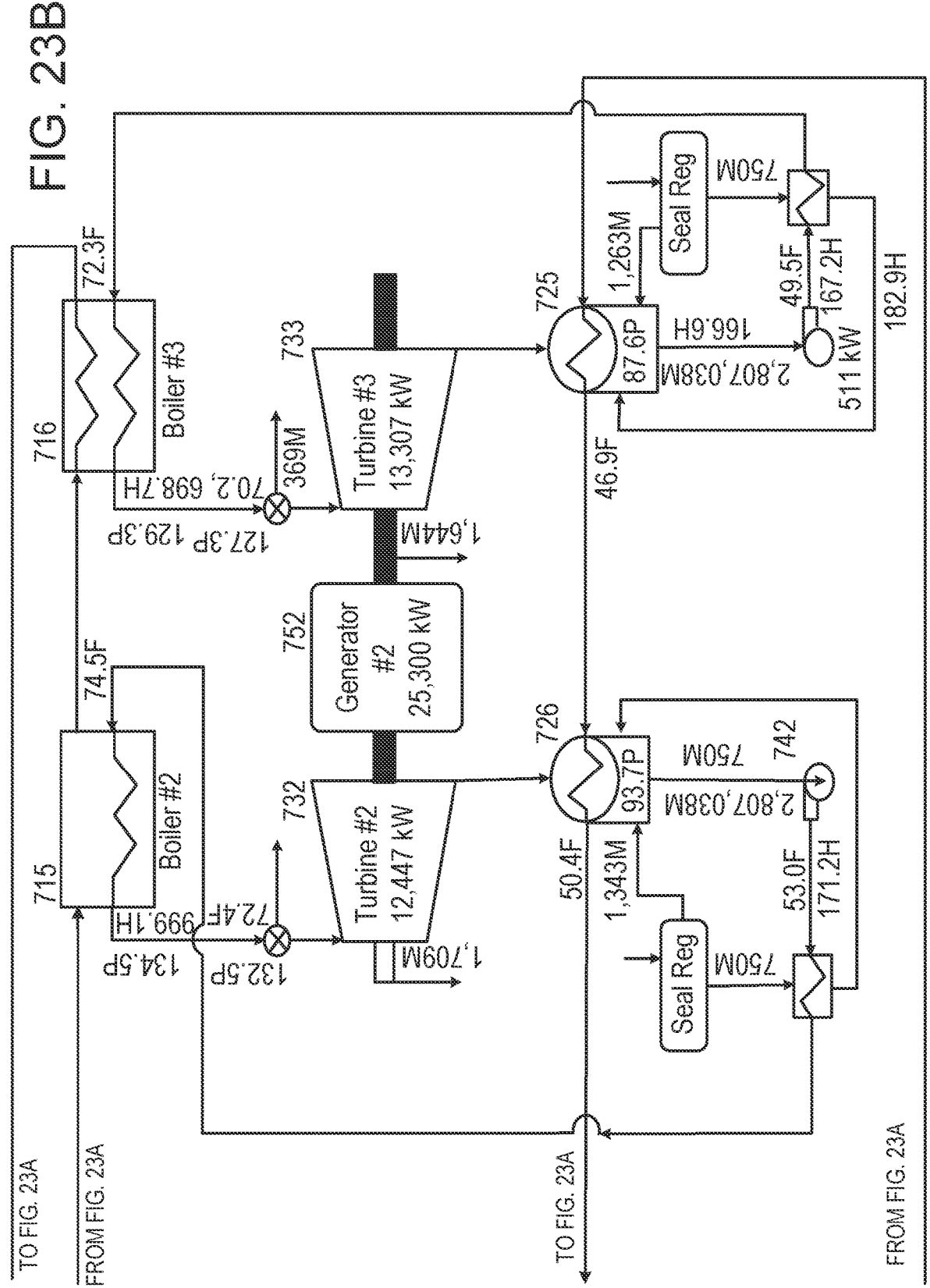

Referring to FIG. 23, an exemplary multi-stage OTEC heat engine 710 utilizing a hybrid cascading heat exchange cycles is provided. Warm sea water is pumped from a warm sea water intake (not shown) via warm water pump 712, discharging from the pump at approximately 1,360,000 gpm and at a temperature of approximately 79° F. All or parts of the warm water conduit from the warm water intake to the warm water pump, and from the warm water pump to the stacked heat exchanger cabinet can form integral structural members of the vessel.

From the warm water pump 712, the warm sea water then enters first stage evaporator 714 where it boils a first working fluid. The warm water exits first stage evaporator 714 at a temperature of approximately 76.8° F. and flows down to the second stage evaporator 715.

The warm water enters second stage evaporator 715 at approximately 76.8° F. where it boils a second working fluid and exits the second stage evaporator 715 at a temperature of approximately 74.5°.

The warm water flows down to the third stage evaporator 716 from the second stage evaporator 715, entering at a temperature of approximately 74.5° F., where it boils a third working fluid. The warm water exits the third stage evaporator 716 at a temperature of approximately 72.3° F.

The warm water then flows from the third stage evaporator 716 down to the fourth stage evaporator 717, entering at a temperature of approximately 72.3° F., where it boils a fourth working fluid. The warm water exits the fourth stage evaporator 717 at a temperature of approximately 70.1° F. and then discharges from the vessel. Though not shown, the discharge can be directed to a thermal layer at an ocean depth of or approximately the same temperature as the discharge temperature of the warm sea water. Alternately, the portion of the power plant housing the multi-stage evaporator can be located at a depth within the structure so that the warm water is discharged to an appropriate ocean thermal layer. In aspects, the warm water conduit from the fourth stage evaporator to the warm water discharge of the vessel can comprise structural members of the vessel.

Similarly, cold sea water is pumped from a cold sea water intake (not shown) via cold sea water pump 722, discharging from the pump at approximately 855,003 gpm and at a temperature of approximately 40.0° F. The cold sea water is drawn from ocean depths of between approximately 2700 and 4200 ft, or more. The cold water conduit carrying cold sea water from the cold water intake of the vessel to the cold water pump, and from the cold water pump to the first stage condenser can comprise in its entirety or in part structural members of the vessel.

From cold sea water pump 722, the cold sea water enters a first stage condenser 724, where it condenses the fourth working fluid from the fourth stage boiler 717. The cold seawater exits the first stage condenser at a temperature of approximately 43.5° F. and flows up to the second stage condenser 725.

The cold sea water enters the second stage condenser 725 at approximately 43.5° F. where it condenses the third working fluid from third stage evaporator 716. The cold sea water exits the second stage condenser 725 at a temperature approximately 46.9° F. and flows up to the third stage condenser.

The cold sea water enters the third stage condenser 726 at a temperature of approximately 46.9° F. where it condenses the second working fluid from second stage evaporator 715. The cold sea water exits the third stage condenser 726 at a temperature approximately 50.4° F.

The cold sea water then flows up from the third stage condenser 726 to the fourth stage condenser 727, entering at a temperature of approximately 50.4° F. In the fourth stage condenser, the cold sea water condenses the first working fluid from first stage evaporator 714. The cold sea water then exits the fourth stage condenser at a temperature of approximately 54.0° F. and ultimately discharges from the vessel. The cold sea water discharge can be directed to a thermal layer at an ocean depth of or approximately the same temperature as the discharge temperature of the cold sea water. Alternately, the portion of the power plant housing the multi-stage condenser can be located at a depth within the structure so that the cold sea water is discharged to an appropriate ocean thermal layer.

The first working fluid enters the first stage evaporator 714 at a temperature of 56.7° F. where it is heated to a vapor with a temperature of 74.7° F. The first working fluid then flows to first turbine 731 and then to the fourth stage condenser 727 where the first working fluid is condensed to a liquid with a temperature of approximately 56.5° F. The liquid first working fluid is then pumped via first working fluid pump 741 back to the first stage evaporator 714.

The second working fluid enters the second stage evaporator 715 at a temperature approximately 53.0° F. where it is heated to a vapor. The second working fluid exits the second stage evaporator 715 at a temperature approximately 72.4° F. The second working fluid then flow to a second turbine 732 and then to the third stage condenser 726. The second working fluid exits the third stage condenser at a temperature approximately 53.0° F. and flows to working fluid pump 742, which in turn pumps the second working fluid back to the second stage evaporator 715.

The third working fluid enters the third stage evaporator 716 at a temperature approximately 49.5° F. where it will be heated to a vapor and exit the third stage evaporator 716 at a temperature of approximately 70.2° F. The third working fluid then flows to third turbine 733 and then to the second stage condenser 725 where the third working fluid is condensed to a fluid at a temperature approximately 49.5° F. The third working fluid exits the second stage condenser 725 and is pumped back to the third stage evaporator 716 via third working fluid pump 743.

The fourth working fluid enters the fourth stage evaporator 717 at a temperature of approximately 46.0° F. where it will be heated to a vapor. The fourth working fluid exits the fourth stage evaporator 717 at a temperature approximately 68.0° F. and flow to a fourth turbine 734. The fourth working fluid exits fourth turbine 734 and flows to the first stage condenser 724 where it is condensed to a liquid with a temperature approximately 46.0° F. The fourth working fluid exits the first stage condenser 724 and is pumped back to the fourth stage evaporator 717 via fourth working fluid pump 744.

The first turbine 731 and the fourth turbine 734 cooperatively drive a first generator 751 and form first turbo-generator pair 761. First turbo-generator pair will produce approximately 25 MW of electric power.

The second turbine 732 and the third turbine 733 cooperatively drive a second generator 752 and form second turbo-generator pair 762. Second turbo-generator pair 762 will produce approximately 25 MW of electric power.

The four stage hybrid cascade heat exchange cycle of FIG. 7 allows the maximum amount of energy to be extracted from the relatively low temperature differential between the warm sea water and the cold sea water. Moreover, all heat exchangers can directly support turbo-generator pairs that produce electricity using the same component turbines and generators.

It will be appreciated that multiple multi-stage hybrid cascading heat exchangers and turbo generator pairs can be incorporated into a vessel or platform design.

EXAMPLE

An offshore OTEC spar platform includes four separate power modules, each generating about 25 MWe Net at the rated design condition. Each power module comprises four separate power cycles or cascading thermodynamic stages that operate at different pressure and temperature levels and pick up heat from the sea water system in four different stages. The four different stages operate in series. The approximate pressure and temperature levels of the four stages at the rated design conditions (Full Load—Summer Conditions) are:

|  | Turbine inlet Pressure/Temp. (Psia)/(° F.) | Condenser Pressure/Temp. (Psia)/(° F.) |
| --- | --- | --- |
| 1 Stage | 137.9/74.7 | 100.2/56.5 |
| 2" Stage | 132.5/72.4 | 93.7/53 |
| 3' Stage | 127.3/70.2 | 87.6/49.5 |
| 4" Stage | 122.4/68 | 81.9/46 |

The working fluid is boiled in multiple evaporators by picking up heat from warm sea water (WSW). Saturated vapor is separated in a vapor separator and led to an ammonia turbine by STD schedule, seamless carbon steel pipe. The liquid condensed in the condenser is pumped back to the evaporator by 2×100% electric motor driven constant speed feed pumps. The turbines of cycle-1 and 4 drive a common electric generator. Similarly the turbines of cycle-2 and 3 drive another common generator. In an aspect there are two generators in each plant module and a total of 8 in the 100 MWe plant. The feed to the evaporators is controlled by feed control valves to maintain the level in the vapor separator. The condenser level is controlled by cycle fluid make up control valves. The feed pump minimum flow is ensured by recirculation lines led to the condenser through control valves regulated by the flow meter on the feed line.

In operation the four (4) power cycles of the modules operate independently. Any of the cycles can be shutdown without hampering operation of the other cycles if needed, for example in case of a fault or for maintenance. But that will reduce the net power generation of the power module as a whole module.

Aspects of the present invention require large volumes of seawater. There will be separate systems for handling cold and warm seawater, each with its pumping equipment, water ducts, piping, valves, heat exchangers, etc. Seawater is more corrosive than fresh water and all materials that may come in contact with it need to be selected carefully considering this. The materials of construction for the major components of the seawater systems will be:

Large bore piping: Fiberglass Reinforced Plastic (FRP)
Large seawater ducts & chambers: Epoxy-coated carbon steel
Large bore valves: Rubber lined butterfly type
Pump impellers: Suitable bronze alloy Unless controlled by suitable means, biological growths inside the seawater systems can cause significant loss of plant performance and can cause fouling of the heat transfer surfaces leading to lower outputs from the plant. This internal growth can also increase resistance to water flows causing greater pumping power requirements, lower system flows, etc. and even complete blockages of flow paths in more severe cases.

The Cold Sea Water ("CSW") system using water drawn in from deep ocean should have very little or no bio-fouling problems. Water in those depths does not receive much sunlight and lack oxygen, and so there are fewer living organisms in it. Some types of anaerobic bacteria may, however, be able to grow in it under some conditions. Shock chlorination will be used to combat bio-fouling.

The Warm Sea Water ("WSW") system handling warm seawater from near the surface will have to be protected from bio-fouling. It has been found that fouling rates are much lower in tropical open ocean waters suitable for OTEC operations than in coastal waters. As a result, chemical agents can be used to control bio-fouling in OTEC systems at very low doses that will be environmentally acceptable. Dosing of small amounts of chlorine has proved to be very effective in combating bio-fouling in seawater. Dosages of chlorine at the rate of about 70 ppb for one hour per day, is quite effective in preventing growth of marine organisms. This dosage rate is only 1/20th of the environmentally safe level stipulated by EPA. Other types of treatment (thermal shock, shock chlorination, other biocides, etc.) can be used from time to time in-between the regimes of the low dosage treatment to get rid of chlorine-resistant organisms.

Necessary chlorine for dosing the seawater streams is generated on-board the plant ship by electrolysis of seawater. Electro-chlorination plants of this type are available commercially and have been used successfully to produce hypochlorite solution to be used for dosing. The electro-chlorination plant can operate continuously to fill-up storage tanks and contents of these tanks are used for the periodic dosing described above.

All the seawater conduits avoid any dead pockets where sediments can deposit or organisms can settle to start a colony. Sluicing arrangements are provided from the low points of the water ducts to blow out the deposits that may get collected there. High points of the ducts and water chambers are vented to allow trapped gases to escape.

The Cold Seawater (CSW) system will consist of a common deep water intake for the plant ship, and water pumping/distribution systems, the condensers with their associated water piping, and discharge ducts for returning the water back to the sea. The cold water intake pipe extends down to a depth of more than 2700 ft, (e.g., between 2700 ft to 4200 ft), where the sea water temperature is approximately a constant 40° F. Entrance to the pipe is protected by screens to stop large organisms from being sucked in to it. After entering the pipe, cold water flows up towards the sea surface and is delivered to a cold well chamber near the bottom of the vessel or spar.

The CSW supply pumps, distribution ducts, condensers, etc. are located on the lowest level of the plant. The pumps take suction from the cross duct and send the cold water to the distribution duct system. 4×25% CSW supply pumps are provided for each module. Each pump is independently circuited with inlet valves so that they can be isolated and opened up for inspection, maintenance, etc. when required. The pumps are driven by high-efficiency electric motors.

The cold seawater flows through the condensers of the cycles in series and then the CSW effluent is discharged back to the sea. CSW flows through the condenser heat exchangers of the four plant cycles in series in the required order. The condenser installations is arranged to allow them to be isolated and opened up for cleaning and maintenance when needed.

The WSW system comprises underwater intake grills located below the sea surface, an intake plenum for conveying the incoming water to the pumps, water pumps, biocide dosing system to control fouling of the heat transfer surfaces, water straining system to prevent blockages by suspended materials, the evaporators with their associated water piping, and discharge ducts for returning the water back to the sea.

Intake grills are provided in the outside wall of the plant modules to draw in warm water from near the sea surface. Face velocity at the intake grills is kept to less than 0.5 ft/sec. to minimize entrainment of marine organisms. These grills also prevent entry of large floating debris and their clear openings are based on the maximum size of solids that can pass through the pumps and heat exchangers safely. After passing through these grills, water enters the intake plenum located behind the grills and is routed to the suctions of the WSW supply pumps.

The WSW pumps are located in two groups on opposite sides of the pump floor. Half of the pumps are located on each side with separate suction connections from the intake plenum for each group. This arrangement limits the maximum flow rate through any portion of the intake plenum to about 1/16th of the total flow and so reduces the friction losses in the intake system. Each of the pumps are provided with valves on inlet sides so that they can be isolated and opened up for inspection, maintenance, etc. when required. The pumps are driven by high-efficiency electric motors with variable frequency drives to match pump output to load.

It is necessary to control bio-fouling of the WSW system and particularly its heat transfer surfaces, and suitable biocides will be dosed at the suction of the pumps for this.

The warm water stream may need to be strained to remove the larger suspended particles that can block the narrow passages in the heat exchangers. Large automatic filters or 'Debris Filters' can be used for this if required. Suspended materials can be retained on screens and then removed by backwashing. The backwashing effluents carrying the suspended solids will be routed to the discharge stream of the plant to be returned to the ocean. The exact requirements for this will be decided during further development of the design after collection of more data regarding the seawater quality.

The strained warm seawater (WSW) is distributed to the evaporator heat exchangers. WSW flows through the evaporators of the four plant cycles in series in the required order. WSW effluent from the last cycle is discharged at a depth of approximately 175 feet or more below the sea surface. It then sinks slowly to a depth where temperature (and therefore density) of the seawater will match that of the effluent.

Though embodiments herein have described multi-stage heat exchanger in a floating offshore vessel or platform, drawing cold water via a continuous, offset staved cold water pipe, it will be appreciated that other embodiments are within the scope of the invention. For example, the cold water pipe can be connected to a shore facility. The continuous offset staved pipe can be used for other intake or discharge pipes having significant length to diameter ratios. The offset staved construction can be incorporated into pipe sections for use in traditional segmented pipe construction. The multi-stage heat exchanger and integrated flow passages can be incorporated into shore based facilities including shore based OTEC facilities. Moreover, the warm water can be warm fresh water, geo-thermally heated water, or industrial discharge water (e.g., discharged cooling water from a nuclear power plant or other industrial plant). The cold water can be cold fresh water. The OTEC system and components described herein can be used for electrical energy production or in other fields of use including: salt water desalination: water purification; deep water reclamation; aquaculture; the production of biomass or biofuels; and still other industries.

All references mentioned herein are incorporated by reference in their entirety.

Other embodiments are within the scope of the following claims.

What is claimed is:

1. A method of connecting submerged vertical cold water pipe to a floating structure, the method comprising:
    drawing a cold water pipe into a spar receiving bay, wherein the spar receiving bay comprises a tapered surface for receiving an upper portion of the cold water pipe and a contact pad, wherein the upper portion of the cold water pipe comprises a lifting collar having a tapered connecting surface; and
    mating a flat sidewall of the spar receiving bay with a corresponding flat surface of the cold water pipe to make a sealable contact with the contact pad of the spar receiving bay.

2. The method of claim 1, wherein the cold water pipe further comprises, a first longitudinal portion, a second longitudinal portion, and a third longitudinal portion, wherein the first longitudinal portion is the upper portion of the cold water pipe.

3. The method of claim 2, further comprising:
    mechanically fixing lifting cables to maintain the sealable contact between the flat surface and the contact pad by mechanically fixing the first longitudinal portion of the cold water pipe to the floating structure by the spar receiving bay.

4. The method of claim 3, further comprising pumping water through the cold water pipe, using a pump of the floating structure.

5. The method of claim 2, wherein walls of the first longitudinal portion of the cold water pipe are thicker than walls of the second longitudinal portion of the cold water pipe.

6. The method of claim 2, wherein the third longitudinal portion of the cold water pipe is longer than the second longitudinal portion of the cold water pipe.

7. The method of claim 6, wherein a clump or weight ballast system is secured to the third longitudinal portion of the cold water pipe.

8. The method of claim 1, wherein the cold water pipe has a smaller diameter than the spar receiving bay.

9. The method of claim 1, wherein the sealable contact forms a watertight seal.

10. The method of claim 1, wherein the cold water pipe is a staved pipe.

11. The method of claim 10, wherein the cold water pipe is an offset staved pipe.

12. The method of claim 1, wherein a first longitudinal portion of the cold water pipe comprises the corresponding flat surface of the cold water pipe.

* * * * *